US012573099B2

(12) United States Patent
Oh

(10) Patent No.: US 12,573,099 B2
(45) Date of Patent: Mar. 10, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventor: Hyunmook Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/698,199

(22) PCT Filed: Oct. 7, 2022

(86) PCT No.: PCT/KR2022/015149
§ 371 (c)(1),
(2) Date: Apr. 3, 2024

(87) PCT Pub. No.: WO2023/059136
PCT Pub. Date: Apr. 13, 2023

(65) Prior Publication Data
US 2024/0331206 A1 Oct. 3, 2024

(30) Foreign Application Priority Data
Oct. 8, 2021 (KR) ........................ 10-2021-0134379

(51) Int. Cl.
*G06T 15/00* (2011.01)
*G06T 9/00* (2006.01)

(52) U.S. Cl.
CPC .................................. *G06T 9/001* (2013.01)

(58) Field of Classification Search
CPC ........................................................ G06T 9/001
USPC ..................................................... 375/240.01
See application file for complete search history.

(56) References Cited

U.S. PATENT DOCUMENTS

| | | | | |
|---|---|---|---|---|
| 10,430,975 B2 * | 10/2019 | Hemmer | ................... | G06T 9/40 |
| 11,216,434 B2 * | 1/2022 | Dalgliesh | .......... | G06F 16/24558 |
| 2019/0355152 A1 | 11/2019 | Li et al. | | |
| 2020/0020154 A1 | 1/2020 | Kerckaert et al. | | |
| 2020/0302632 A1 * | 9/2020 | Oh | ........................... | G06T 7/62 |
| 2021/0004991 A1 | 1/2021 | Zhang et al. | | |
| 2021/0183068 A1 | 6/2021 | Li et al. | | |
| 2021/0217203 A1 * | 7/2021 | Kim | ....................... | G06T 9/001 |
| 2023/0196625 A1 * | 6/2023 | Li | ........................... | G06T 9/004 |
| | | | | 382/232 |

(Continued)

FOREIGN PATENT DOCUMENTS

| | | | | |
|---|---|---|---|---|
| WO | WO 2021/145573 A1 | 7/2021 | | |
| WO | WO-2021207521 A1 * | 10/2021 | ............... | G06T 3/40 |
| WO | WO-2022054358 A1 * | 3/2022 | ............. | G06T 9/001 |

OTHER PUBLICATIONS

[No. Author Listed], "G-PCC codec description," ISO/IEC JTC 1/SC 29/WG 7, N0151, Jul. 2021 152 pages.

(Continued)

*Primary Examiner* — Albert Kir
(74) *Attorney, Agent, or Firm* — Fish & Richardson P.C.

(57) ABSTRACT
A point cloud data transmission method according to embodiments may comprise the steps of: encoding point cloud data; and transmitting a bitstream including the point cloud data. A point cloud data reception method according to embodiments may comprise the steps of: receiving a bitstream including point cloud data; and decoding the point cloud data.

12 Claims, 41 Drawing Sheets

(56) References Cited

U.S. PATENT DOCUMENTS

2023/0239517 A1\*  7/2023  Nishi ........................ G06T 9/00
                                                  375/240.12

OTHER PUBLICATIONS

Extended European Search Report in European Appln. No. 22878957.4, mailed on Dec. 19, 2024, 11 pages.

Oh et al., "[G-PCC][EE13.44 related] On number of points limitation," ISO/IEC JTC 1/SC 29/WG 7, m58125, Online, Oct. 2021, 3 pages.

Oh et al., "[G-PCC][EE13.44] Report on fine granularity slices using layer-group structure," ISO/IEC JTC 1/SC 29/WG 7, m57350, Online Jul. 2021, 12 pages.

Oh et al., "[G-PCC][EE13.44] Report on fine granularity slices using layer-group structure," ISO/IEC JTC 1/SC 29/WG 7, m58119, Oct. 2021, 11 pages.

Shao et al., "G-PCC TMC13 CE13.2 report on point cloud tile and slice based coding," ISO/IEC JTC1/SC29/WG11 MPEG2018/m45867, Marrakech, Morroco, Jan. 2019, 11 pages.

International Appln. No. PCT/KR2022/015259, published on Oct. 11, 2022, 139 pages, (with English Abstract).

International Search Report and Written Opinion in International Appln. No. PCT/KR2022/015149, mailed on Jan. 30, 2023, 15 pages (with English translation).

\* cited by examiner

FIG. 2

FIG. 3
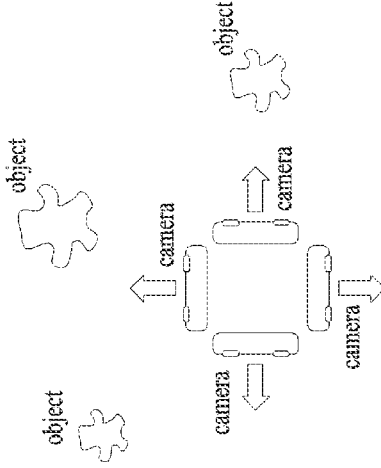
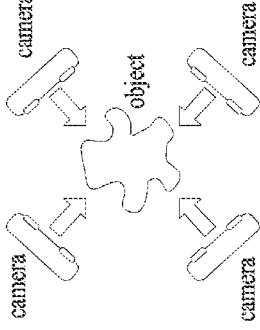

FIG. 7
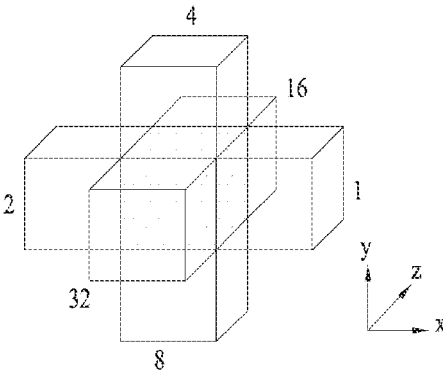
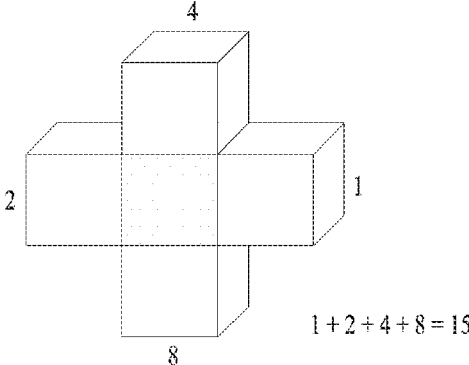

Level of details

FIG. 16
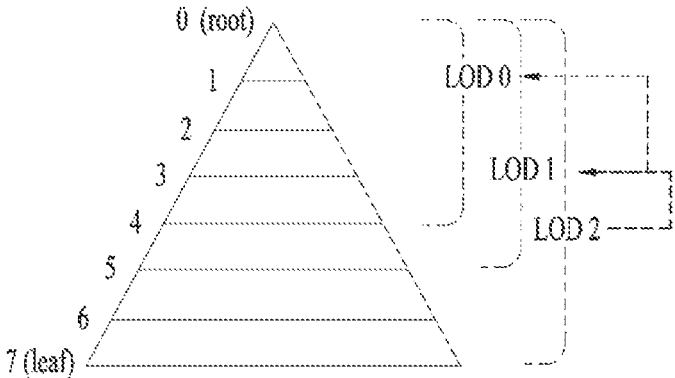
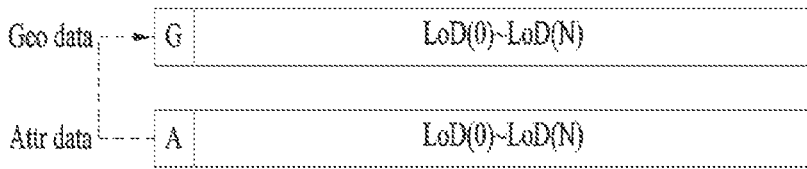
FIG. 17
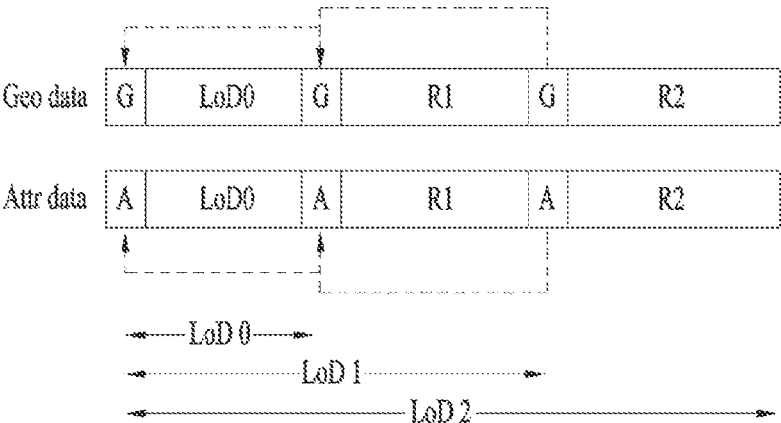

FIG. 18

FIG. 19
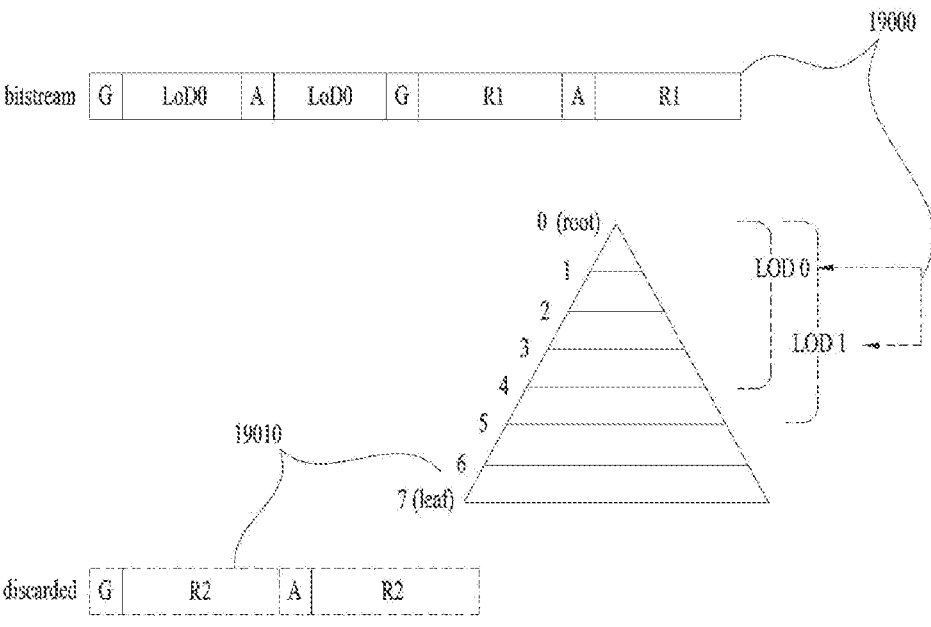
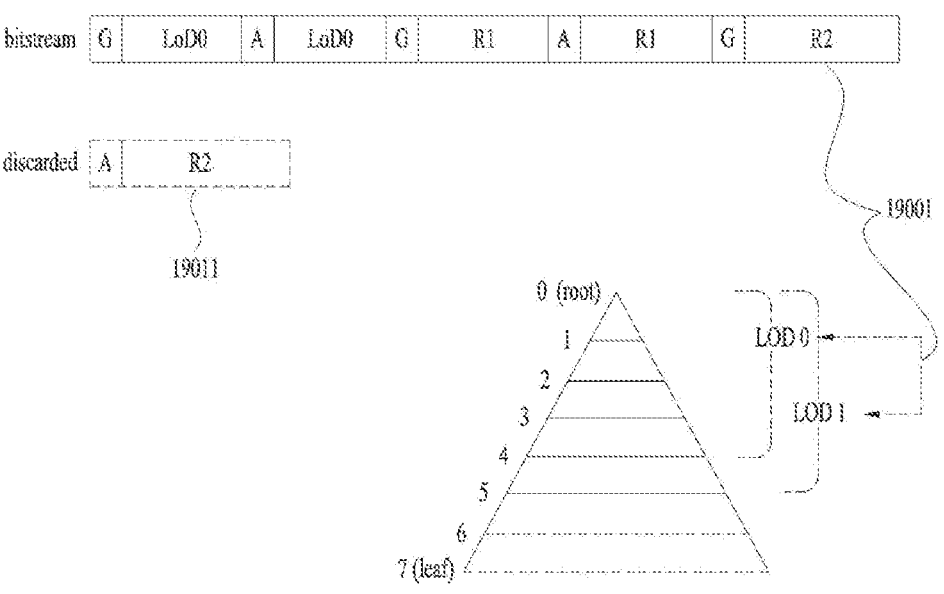

FIG. 21
Geometry tree structure contained in a single slice
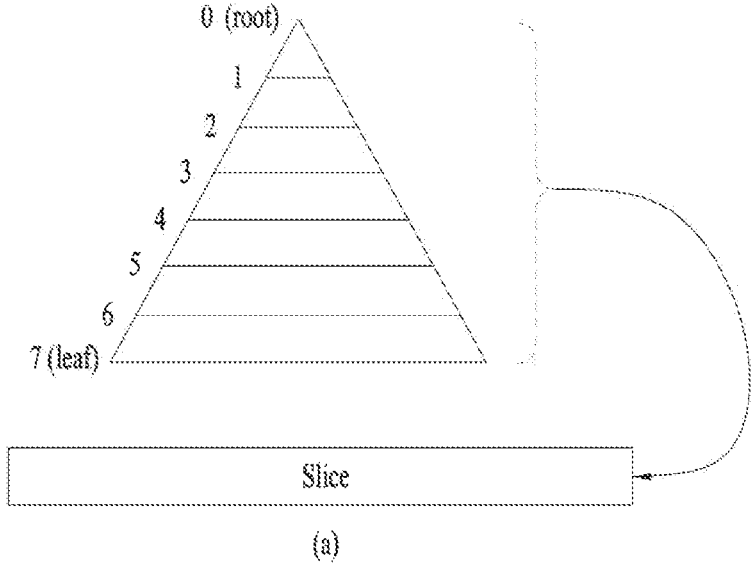
(a)
Geometry tree structure contained in segmented slices
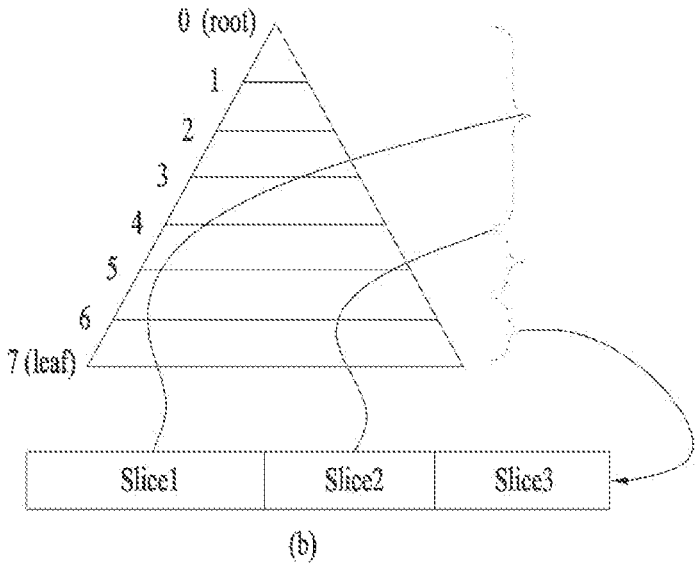
(b)

Cubic bbox          Sub-divided bbox     Sub-divided bbox     Sub-divided bbox
                    (x axis)             (y axis)             (z axis)

| cubic subgroup bbox | | after splitting | |
|---|---|---|---|
| subgroup bbox origin & subgroup bbox size | num points (> level limit) | subgroup bbox origin & subgroup bbox size | num points (< level limit) |
| (0, 0, 8192) (4096, 4096, 4096) | 1,197,362 | (0, 0, 8192) (4096, 4096, 2048) | 682,801 |
| | | (0 0 10240) (4096, 4096, 2048) | 514,561 |
| (0, 8192, 0) (4096, 4096, 4096) | 1,408,913 | (0, 8192, 0) (4096, 2048, 4096) | 642,398 |
| | | (0, 10240, 0) (4096, 2048, 4096) | 766,515 |
| (8192, 12288, 0) (4096, 4096, 4096) | 1,777,764 | (8192, 12288, 0) (2048, 4096, 4096) | 955,402 |
| | | (10240, 12288, 0) (2048, 4096, 4096) | 822,362 |

| C2_ai | End-to-End BD-AttRate [%] lossy geometry, lossy attributes [all intra] | | | | Geom. BD-TotGeomRate [%] | |
|---|---|---|---|---|---|---|
| | Luma | Chroma Cb | Chroma Cr | Reflectance | D1 | D2 |
| Cat1-A average | #VALUE! | #VALUE! | #VALUE! | | 0.1% | 0.1% |
| Cat1-B average | #VALUE! | #VALUE! | #VALUE! | | 0.0% | 0.0% |
| Cat3-fused average | #VALUE! | #VALUE! | #VALUE! | #VALUE! | 0.1% | 0.1% |
| Cat3-frame average | | | | #VALUE! | 0.0% | 0.0% |
| Overall average | #VALUE! | #VALUE! | #VALUE! | #VALUE! | 0.3% | 0.3% |
| Avg. Enc Time [%] | | | 112% | | | |
| Avg. Dec Time [%] | | | 110% | | | |

| CW_ai | lossless geometry, lossless attributes [all intra] bpp ratio [%] | | | |
|---|---|---|---|---|
| | Geometry | Colour | Reflectance | Total |
| Cat1-A average | 100.0% | #DIV/0! | | 100.0% |
| Cat1-B average | 100.0% | #DIV/0! | | 100.0% |
| Cat3-fused average | 100.0% | #DIV/0! | #DIV/0! | 100.0% |
| Cat3-frame average | 100.0% | #DIV/0! | #DIV/0! | 100.0% |
| Overall average | 100.0% | #DIV/0! | #DIV/0! | 100.0% |
| Avg. Enc Time [%] | | 110% | | |
| Avg. Dec Time [%] | | 112% | | |

FIG. 31
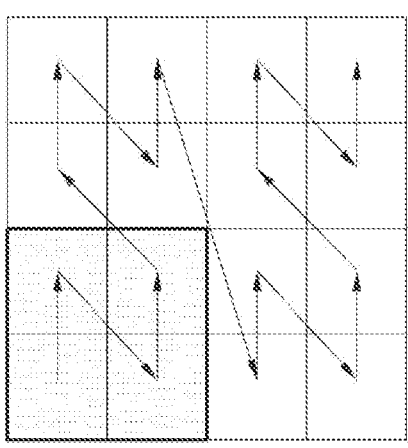
Square bbox
(power of 2)
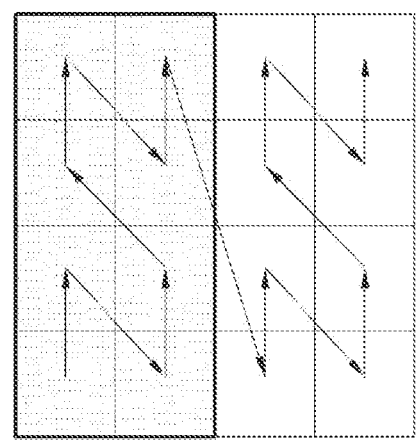
Rectangld bbox
(Morton order)

FIG. 32
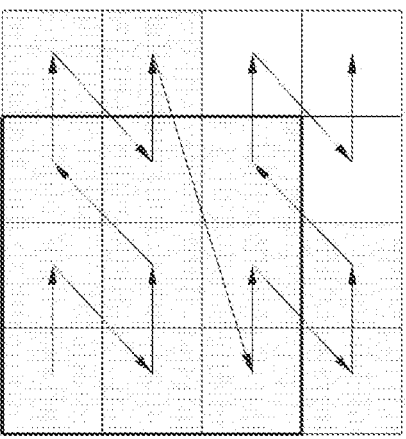
Square bbox
(non power of 2)
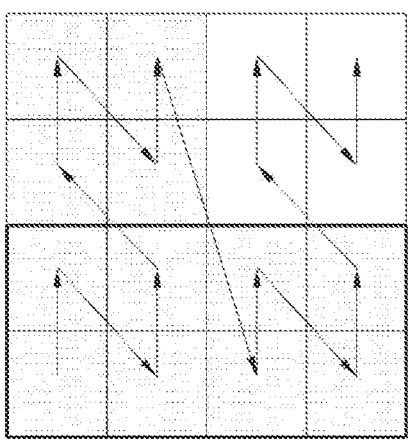
Rectangld bbox
(across Morton order)

FIG. 34a

| seq_parameter_set( ) { | Descriptor |
|---|---|
|     simple_profile_compatibility_flag | u(1) |
|     dense_profile_compatibility_flag | u(1) |
|     predictive_profile_compatibility_flag | u(1) |
|     main_profile_compatibility_flag | u(1) |
|     reserved_profile_compatibility_18bits | u(18) |
|     slice_reordering_constraint_flag | u(1) |
|     unique_point_positions_constraint_flag | u(1) |
|     level_idc | u(8) |
|     sps_seq_parameter_set_id | u(4) |
|     frame_ctr_lsb_bits | u(5) |
|     slice_tag_bits | u(5) |
|     seq_origin_bits | ue(v) |
|     if( seq_origin_bits ) { | |
|        for( k = 0; k < 3; k++ ) | |
|           seq_origin_xyz[ k ] | s(v) |
|        seq_origin_log2_scale | ue(v) |
|     } | |
|     seq_bounding_box_size_bits | ue(v) |
|     if( seq_bounding_box_size_bits ) { | |
|        for( k = 0; k < 3; k++ ) | |
|           seq_bounding_box_size_minus1_xyz[ k ] | u(v) |
|     } | |
|     seq_unit_numerator_minus1 | ue(v) |
|     seq_unit_denominator_minus1 | ue(v) |
|     seq_unit_in_metres_flag | u(1) |
|     seq_global_scale_factor_log2 | ue(v) |
|     seq_global_scale_refinement_num_bits | ue(v) |
|     seq_global_scale_factor_refinement_factor | u(v) |
|     sps_num_attribute_sets | ue(v) |
|     for( attrId = 0; attrId < sps_num_attribute_sets; attrId++ ) { | |
|        attribute_dimension_minus1[ attrId ] | ue(v) |
|        attribute_instance_id[ attrId ] | ue(v) |
|        attribute_bitdepth_minus1[ attrId ] | ue(v) |
|        known_attribute_label_flag[ attrId ] | u(1) |
|        if( known_attribute_label_flag[ attrId ] ) | |
|           known_attribute_label[ attrId ] | ue(v) |
|        else | |
|           attribute_label_oid[ attrId ] | oid(v) |
|        num_attribute_parameters | ue(v) |
|        byte_alignment( ) | |
|        for( j = 0; j < num_attribute_parameters; j++ ) | |
|           attribute_parameters( attrId ) | |
|     } | |
|     axis_coding_order | u(3) |
|     bypass_stream_enabled_flag | u(1) |
|     entropy_continuation_enabled_flag | u(1) |
|     sps_extension_flag | u(1) |
|     if( sps_extension_flag ) { | |

FIG. 34b

| | |
|---|---|
| layer_group_enabled_flag | u(1) |
| if(layer_group_enabled_flag) { | |
| num_layer_groups_minus1 | u(8) |
| for(i=0; i<=num_layer_groups_minus1; i++) { | |
| layer_group_id[i] | u(8) |
| num_layers_minus1[i] | u(8) |
| subgroup_enabled_flag[i] | u(1) |
| } | |
| if(subgroup_enabled_flags()) { | |
| subgroup_bbox_origin_bits_minus1 | ue(v) |
| subgroup_bbox_size_bits_minus1 | ue(v) |
| } | |
| non_cubic_subgroup_enabled_flag | |
| if(non_cubic_subgroup_enabled_flag) { | |
| subgroup_bbox_max_x | |
| subgroup_bbox_max_y | |
| subgroup_bbox_max_z | |
| subgroup_bbox_min_x | |
| subgroup_bbox_min_y | |
| subgroup_bbox_min_z | |
| } | |
| } | |
| while( more_data_in_data_unit()) | |
| sps_extension_data_flag | u(1) |
| } | |
| byte_alignment() | |
| } | |

FIG. 35

| dependent_geometry_data_unit_header( ) { | Descriptor |
|---|---|
| dgsh_geometry_parameter_set_id | u(4) |
| dgsh_slice_id | ue(v) |
| layer_group_id | u(8) |
| if(subgroup_enabled_flag[layer_group_id]) { | |
| subgroup_id | u(8) |
| for(i=0; i<3; i++) | |
| subgroup_bbox_origin[i] | u(v) |
| for(i=0; i<3; i++) | |
| subgroup_bbox_size[i] | u(v) |
| } | |
| ref_layer_group_id | u(8) |
| if(subgroup_enabled_flag[layer_group_id]) | |
| ref_subgroup_id | u(8) |
| subgroup_bbox_rotation_enabled_flag | |
| if(subgroup_bbox_rotation_enabled_flag) | |
| rotation_direction | |
| byte_alignment( ) | |
| } | |

FIG. 36

| layer_group_struture_inventory( ) { | Descriptor |
|---|---|
| lgsi_seq_parameter_set_id | u(4) |
| lgsi_frame_ctr_lsb_bits | u(5) |
| lgsi_frame_ctr_lsb | u(v) |
| lgsi_num_slice_ids_minus1 | u(8) |
| if(lgsi_num_slice_ids_minus1 >= 0 ) { | |
|    for(sId=0; sId<=lgsi_num_slice_ids_minus1; sId++){ | |
|       lgsi_slice_id[sId] | ue(v) |
|       lgsi_num_layer_groups_minus1[sId] | u(8) |
|       lgsi_subgroup_bbox_origin_bits_minus1[sId] | ue(v) |
|       lgsi_subgroup_bbox_size_bits_minus1[sId] | ue(v) |
|       for(i=0; i<=lgsi_num_layer_groups_minus1[sId]; i++){ | |
|          lgsi_layer_group_id[sId][i] | u(8) |
|          lgsi_num_layers_minus1[sId][i] | u(8) |
|          lgsi_num_subgroups_minus1[sId][i] | u(16) |
|          for(j=0; j<=lgsi_num_subgroups_minus1[sId][i]; j++){ | |
|             lgsi_subgroup_id[sId][i][j] | u(16) |
|             lgsi_parent_subgroup_id[sId][i][j] | u(16) |
|             for(k=0; k<3; k++) | |
|                lgsi_subgroup_bbox_origin[sId][i][j][k] | u(v) |
|             for(k=0; k<3; k++) | |
|                lgsi_subgroup_bbox_size[sId][i][j][k] | u(v) |
|            } | |
|          } | |
|       } | |
|    } | |
| lgsi_origin_bits_minus1 | ue(v) |
| for(k=0; k<3; k++) | |
|    lgsi_origin_xyz[k] | se(v) |
| lgsi_origin_log2_scale | ue(v) |
| byte_alignment( ) | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is a National Stage application under 35 U.S.C. § 371 of International Application No. PCT/KR2022/015149, filed on Oct. 7, 2022, which claims the benefit of Korean Application No. 10-2021-0134379, filed on Oct. 8, 2021. The disclosures of the prior applications are incorporated by reference in their entirety.

TECHNICAL FIELD

Embodiments relate to a method and device for processing point cloud content.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

To achieve these objects and other advantages and in accordance with the purpose of the disclosure, as embodied and broadly described herein, a method of transmitting point cloud data may include encoding the point cloud data, and transmitting a bitstream containing the point cloud data. A method of receiving point cloud data according to embodiments may include receiving a bitstream containing point cloud data and decoding the point cloud data.

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

BRIEF DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 2 is a block diagram illustrating a point cloud content providing operation according to embodiments;

FIG. 3 illustrates an exemplary process of capturing a point cloud video according to embodiments;

FIG. 7 shows an example of a neighbor node pattern according to embodiments;

FIG. 16 shows a layer-based point cloud data configuration and a structure of geometry and attribute bitstreams according to embodiments;

FIG. 17 shows a configuration of a bitstream according to embodiments;

FIG. 18 illustrates a bitstream sorting method according to embodiments;

FIG. 19 illustrates a method of selecting geometry data and attribute data according to embodiments;

FIG. 21 illustrates a single slice-based geometry tree structure and a segmented slice-based geometry tree structure according to embodiments;

FIGS. 24, 25, and 26 illustrate multi-resolution and multi-size ROI outputs according to embodiments;

Figure 29:
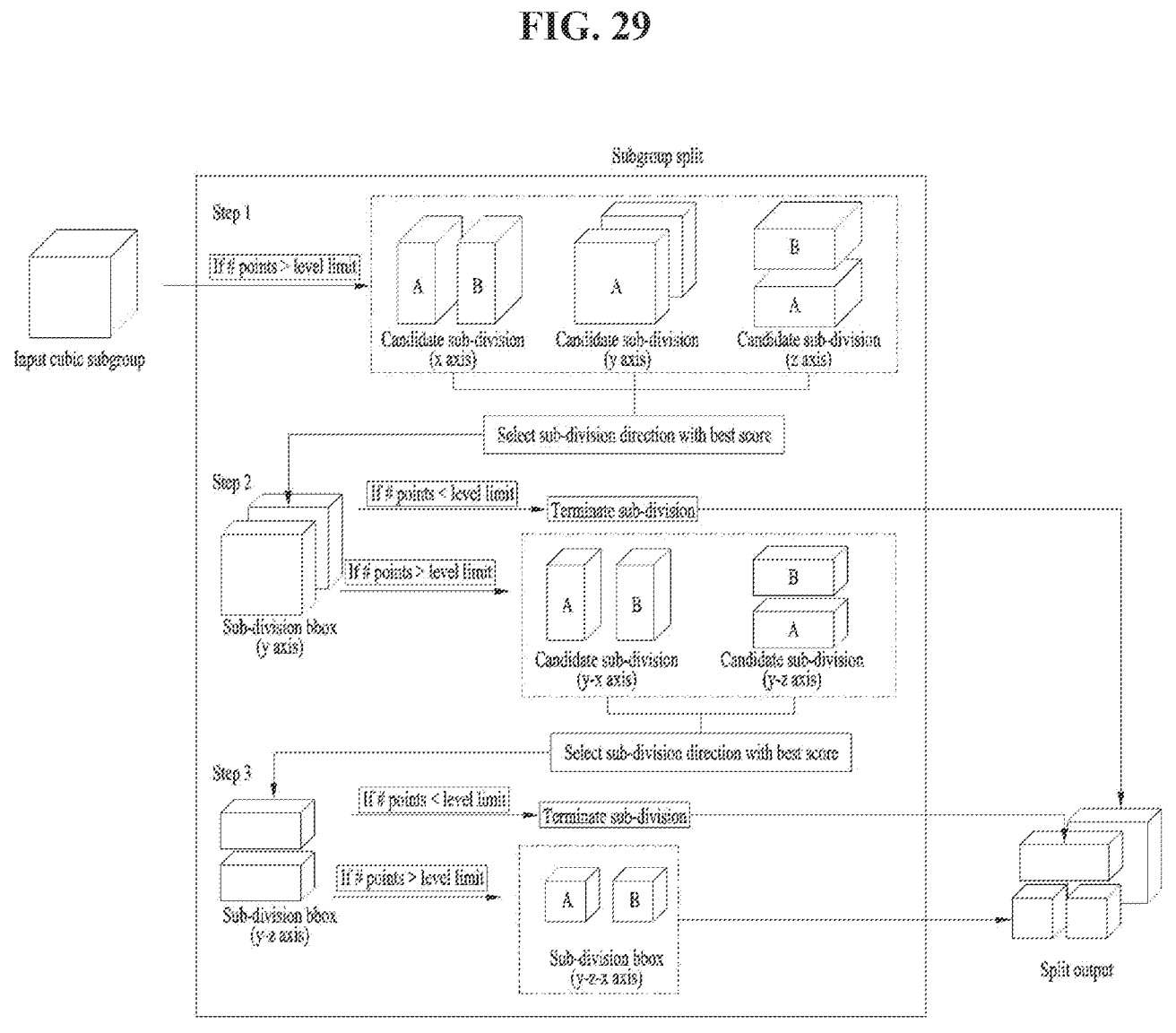

FIG. 29 illustrates a subgroup division process according to embodiments;

FIG. 30 shows a comparison between variable subgroup sizes and fixed subgroup sizes according to embodiments;

FIG. 31 illustrates a subgroup bounding box based on a node scan order according to embodiments;

FIG. 32 illustrates a subgroup bounding box based on a node scan order according to embodiments;

FIG. 34 shows a sequence parameter set according to embodiments;

FIG. 35 shows a dependent geometry data unit header according to embodiments;

FIG. 36 shows a layer-group structure inventory according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
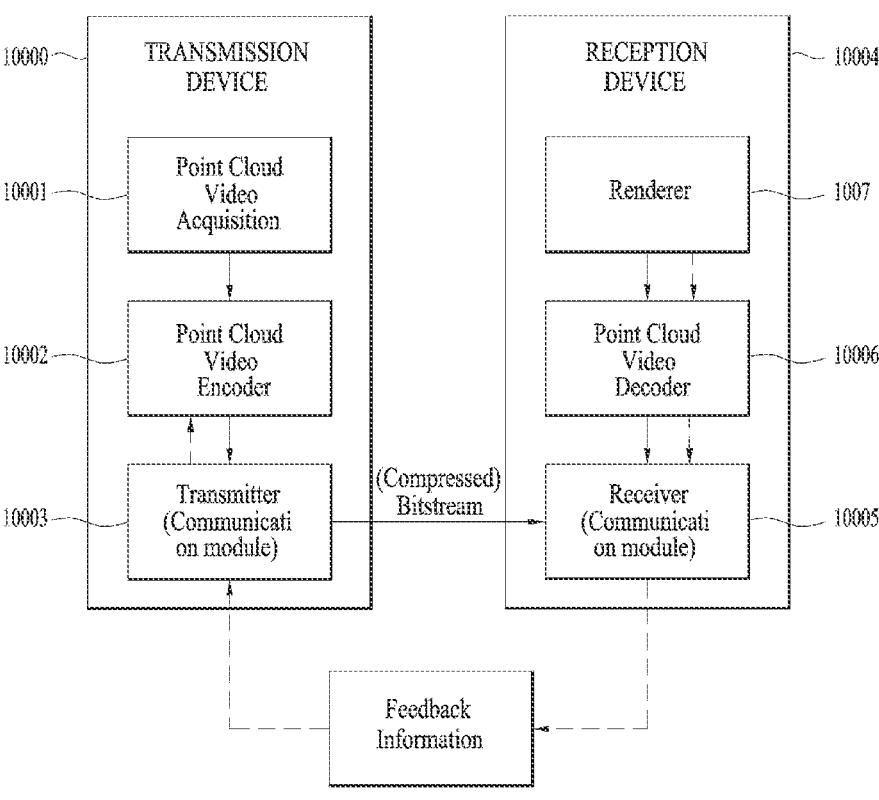
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (e.g., a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (e.g., a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (e.g., in a reverse process of the operation of the point cloud video encoder 10002). Accordingly, the point cloud video decoder 10006 may decode the point cloud video data by performing point cloud decompression coding, which is the reverse process to the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/ or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
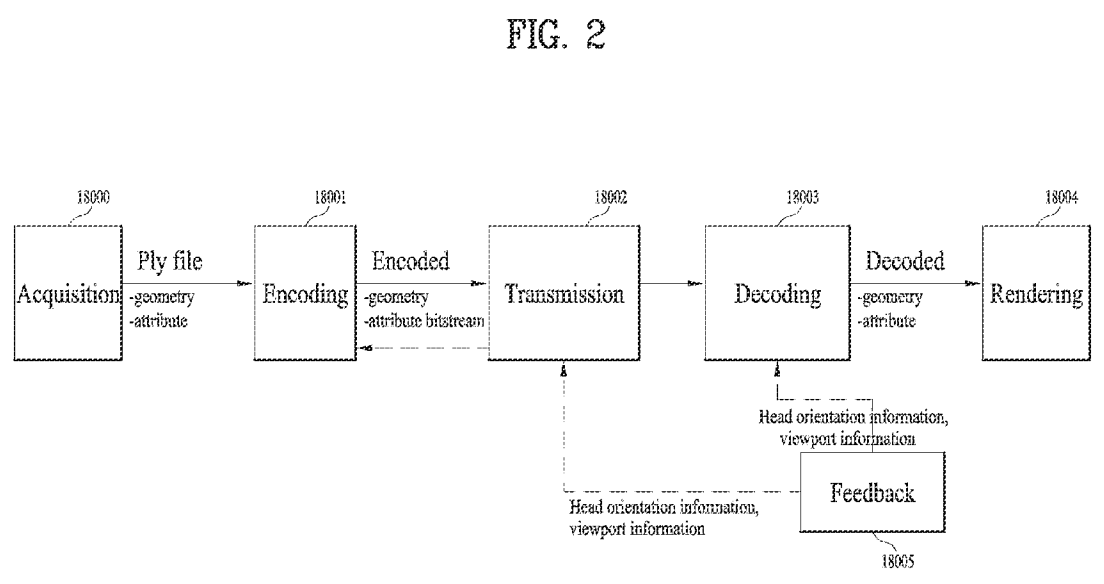

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (e.g., the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (e.g., values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry informa-tion, geometry data, or the like, and the attribute may be called attributes, attribute information, attribute data, or the like. The point cloud content providing system (e.g., the point cloud transmission device 10000 or the point cloud video acquirer 10001) may secure point cloud data from information (e.g., depth information, color information, etc.) related to the acquisition process of the point cloud video.

The point cloud content providing system (e.g., the trans-mission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encod-ing attributes and output an attribute bitstream. According to embodiments, the point cloud content providing system may perform the attribute encoding based on the geometry encoding. The geometry bitstream and the attribute bit-stream according to the embodiments may be multiplexed and output as one bitstream. The bitstream according to the embodiments may further contain signaling information related to the geometry encoding and attribute encoding.

The point cloud content providing system (e.g., the trans-mission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (e.g., signaling information related to the geometry encoding and the attribute encoding). The point cloud con-tent providing system may encapsulate a bitstream that carries the encoded point cloud data and transmit the same in the form of a file or segment.

The point cloud content providing system (e.g., the recep-tion device 10004 or the receiver 10005) according to the embodiments may receive the bitstream containing the encoded point cloud data. In addition, the point cloud content providing system (e.g., the reception device 10004 or the receiver 10005) may demultiplex the bitstream.

The point cloud content providing system (e.g., the recep-tion device 10004 or the point cloud video decoder 10005) may decode the encoded point cloud data (e.g., the geometry bitstream, the attribute bitstream) transmitted in the bit-stream. The point cloud content providing system (e.g., the reception device 10004 or the point cloud video decoder 10005) may decode the point cloud video data based on the signaling information related to encoding of the point cloud video data contained in the bitstream. The point cloud content providing system (e.g., the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (e.g., the reception device 10004 or the point cloud video decoder 10005) may reconstruct the point cloud video based on the positions according to the reconstructed geometry and the decoded attributes.

The point cloud content providing system according to the embodiments (e.g., the reception device 10004 or the ren-derer 10007) may render the decoded point cloud data (20004). The point cloud content providing system (e.g., the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the recep-tion device 10004) according to the embodiments may secure feedback information (20005). The point cloud con-tent providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual envi-ronment, etc.). Accordingly, the point cloud content provid-ing system according to the embodiments may capture a point cloud video using one or more cameras (e.g., an infrared camera capable of securing depth information, an RGB camera capable of extracting color information corre-sponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing tech-nique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a tech-nique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (e.g., a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
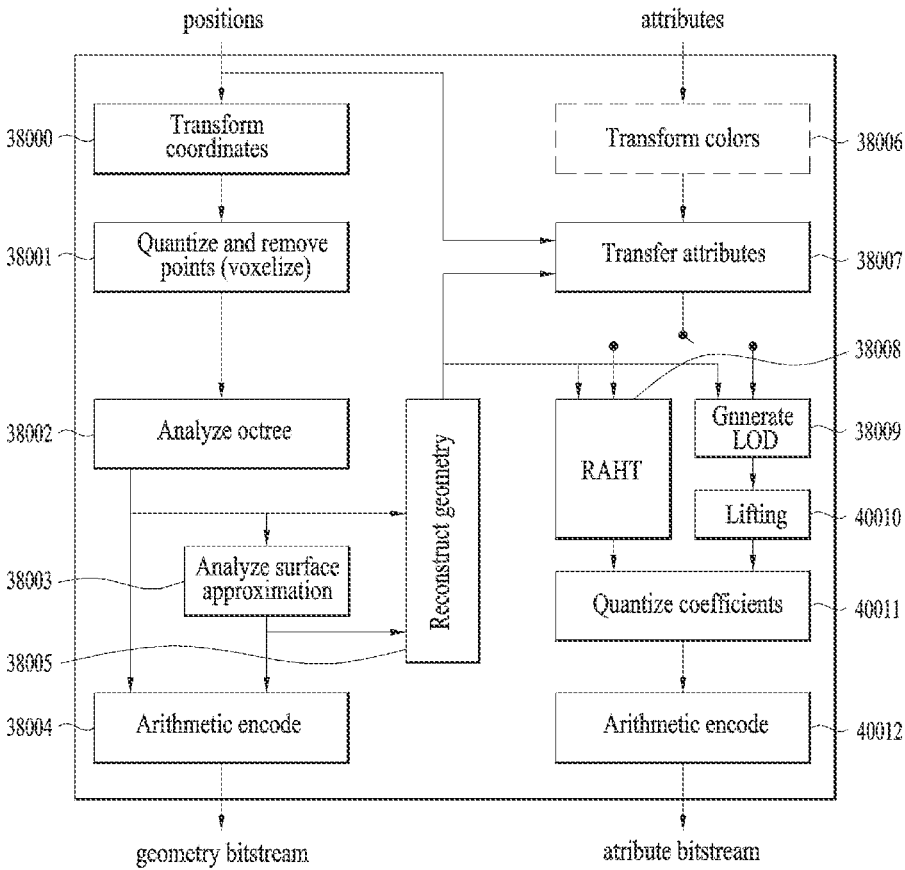
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (e.g., a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (e.g., a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and inter-polation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (re-stored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflec-tance of each point) within a specific position/radius from the position (or position value) of the center of each voxel. The attribute transformer 40007 may apply a weight accord-ing to the distance from the center to each point in calcu-lating the average. Accordingly, each voxel has a position and a calculated attribute (or attribute value).

The attribute transformer 40007 may search for neigh-boring points existing within a specific position/radius from the position of the center of each voxel based on the K-D tree or the Morton code. The K-D tree is a binary search tree and supports a data structure capable of managing points based on the positions such that nearest neighbor search (NNS) may be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodi-ments performs RAHT coding for predicting attribute infor-mation based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodi-ments performs lifting transform coding of transforming the attributes a point cloud based on weights. As described above, lifting transform coding may be optionally applied.

The coefficient quantizer 40011 according to the embodi-ments quantizes the attribute-coded attributes based on coefficients.

The arithmetic encoder 40012 according to the embodi-ments encodes the quantized attributes based on arithmetic coding.

Although not shown in the figure, the elements of the point cloud encoder of FIG. 4 may be implemented by hardware including one or more processors or integrated circuits configured to communicate with one or more memo-ries included in the point cloud providing device, software, firmware, or a combination thereof. The one or more pro-cessors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
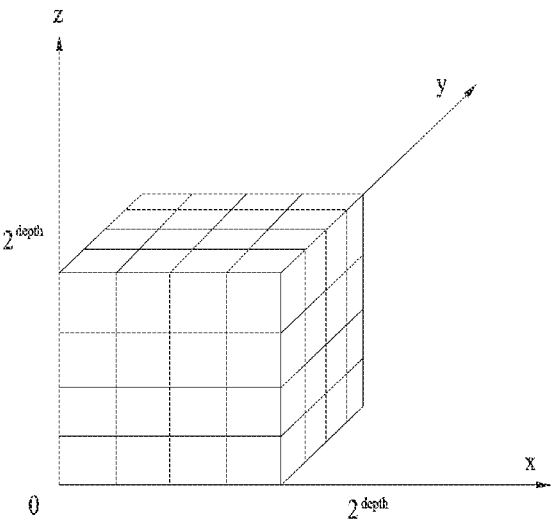
FIG. 5 shows an example of voxels according to embodiments.

FIG. 5 shows an example of voxels according to embodi-ments.

Figure 6:
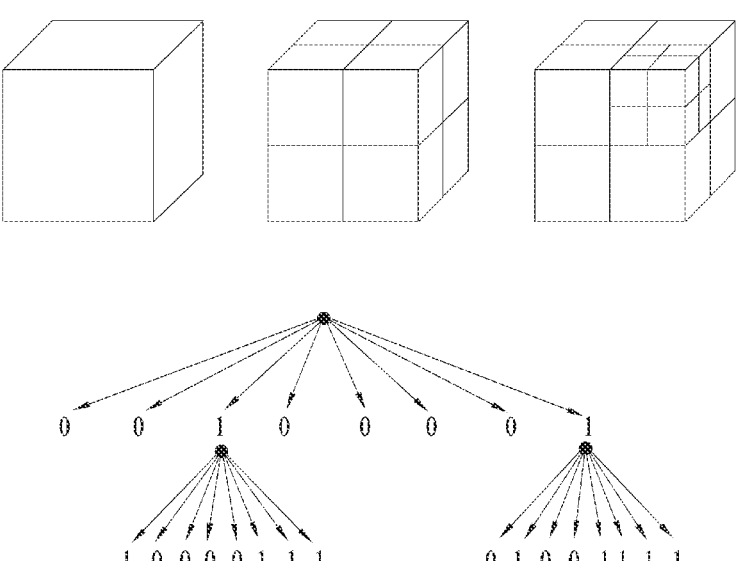
FIG. 6 shows an example of an octree and occupancy code according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted. FIG. 6 shows an example of an octree and occupancy code according to embodiments.

As described with reference to FIGS. 1 to 4, the point cloud content providing system (point cloud video encoder 10002) or the point cloud encoder (e.g., the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, 2d may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d = \mathrm{Ceil}\left(\mathrm{Log2}\left(\mathrm{Max}\left(x^{int}_n, y^{int}_n, z^{int}_n, n = 1, \ldots, N\right) + 1\right)\right)$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (e.g., the arithmetic encoder 40004) according to the embodiments may perform entropy encoding on the occupancy codes. In order to increase the compression efficiency, the point cloud encoder may perform intra/inter-coding on the occupancy codes. The reception device (e.g., the reception device 10004 or the point cloud video decoder 10006) according to the embodiments reconstructs the octree based on the occupancy codes.

The point cloud encoder (e.g., the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (e.g., the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector ($\Delta$x, $\Delta$y, $\Delta$z) of the edge, and the vertex position value (relative position value within the edge). When the trisoup 0. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

| Triangles formed from vertices ordered 1, . . . , n |
| --- |
| n triangles |

3 (1, 2, 3)
4 (1, 2, 3), (3, 4, 1)
5 (1, 2, 3), (3, 4, 5), (5, 1, 3)
6 (1, 2, 3), (3, 4, 5), (5, 6, 1), (1, 3, 5)
7 (1, 2, 3), (3, 4, 5), (5, 6, 7), (7, 1, 3), (3, 5, 7)
8 (1, 2, 3), (3, 4, 5), (5, 6, 7), (7, 8, 1), (1, 3, 5), (5, 7, 1)
9 (1, 2, 3), (3, 4, 5), (5, 6, 7), (7, 8, 9), (9, 1, 3), (3, 5, 7), (7, 9, 3)
10 (1, 2, 3), (3, 4, 5), (5, 6, 7), (7, 8, 9), (9, 10, 1), (1, 3, 5), (5, 7, 9), (9, 1, 5)
11 (1, 2, 3), (3, 4, 5), (5, 6, 7), (7, 8, 9), (9, 10, 11), (11, 1, 3), (3, 5, 7), (7, 9, 11), (11, 3, 7)
12 (1, 2, 3), (3, 4, 5), (5, 6, 7), (7, 8, 9), (9, 10, 11), (11, 12, 1), (1, 3, 5), (5, 7, 9), (9, 11, 1), (1, 5, 9)

geometry encoding is applied, the point cloud encoder according to the embodiments (e.g., the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

i)

$$\begin{bmatrix} \mu_x \\ \mu_y \\ \mu_z \end{bmatrix} = \frac{1}{n}\sum_{i=1}^{n}\begin{bmatrix} x_i \\ y_i \\ z_i \end{bmatrix};$$

ii)

$$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix};$$

iii)

$$\begin{bmatrix} \sigma_x^2 \\ \sigma_y^2 \\ \sigma_z^2 \end{bmatrix} = \sum_{i=1}^{n}\begin{bmatrix} \bar{x}_i^2 \\ \bar{y}_i^2 \\ \bar{z}_i^2 \end{bmatrix}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of $\theta$ is estimated through a tan 2(bi, ai), and the vertices are ordered based on the value of The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (e.g., the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23-8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
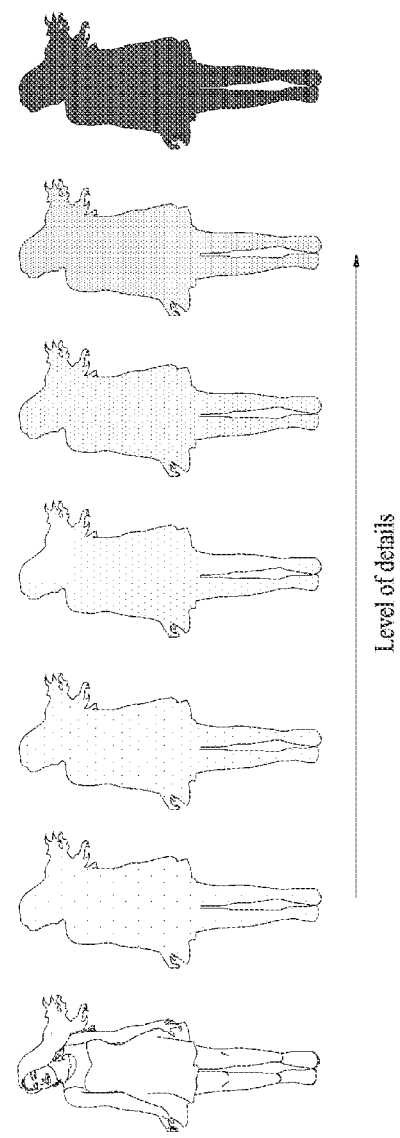
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (e.g., the LOD generator 40009) may classify (reorganize) points by LOD. The figure shows the point cloud content corresponding to LODs. The left-most picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
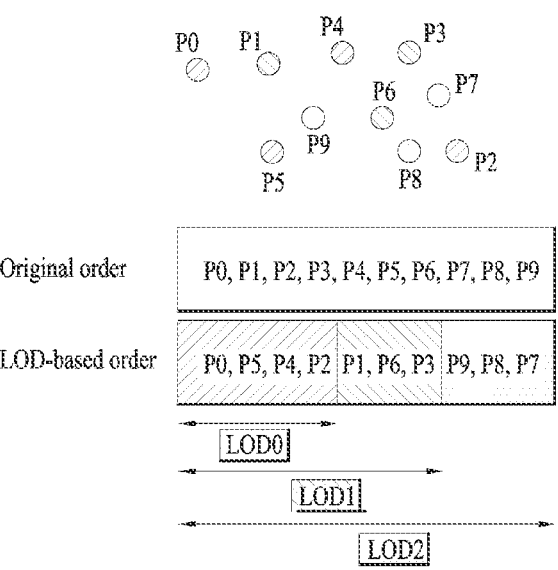
FIG. 9 illustrates another example of point configuration in each LOD according to embodiments.

FIG. 9 illustrates an example of point configuration for each LOD according to embodiments.

As described with reference to FIGS. 1 to 8, the point cloud content providing system, or the point cloud encoder (e.g., the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space.

In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (e.g., the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

```
TABLE Attribute prediction residuals quantization pseudo code
int PCCQuantization(int value, int quantStep) {
if( value >=0) {
return floor(value / quantStep + 1.0 / 3.0);
} else {
return -floor(-value / quantStep + 1.0 / 3.0);
}
}
TABLE Attribute prediction residuals inverse quantization pseudo code
int PCCInverseQuantization(int value, int quantStep) {
if( quantStep ==0) {
return value;
} else {
return value * quantStep;
}
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (e.g., the arithmetic encoder 40012) may perform entropy coding on the attributes of the corresponding point without performing the above-described operation.

The point cloud encoder according to the embodiments (e.g., the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1 = w_{l_{2x,y,z}}$ and $w2 = w_{l_{2x+1,y,z}}$.

$$\begin{bmatrix} g_{l-1_{x,y,z}} \\ h_{l-1_{x,y,z}} \end{bmatrix} = T_{w1\,w2} \begin{bmatrix} g_{l_{2x,y,z}} \\ g_{l_{2x+1,y,z}} \end{bmatrix}, \; T_{w1\,w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (e.g., encoding by the arithmetic encoder 400012). The weights are calculated as $w_{l_{-1_{x,y,z}}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000\,w1001} \begin{bmatrix} g_{1_{0,0,0z}} \\ g_{1_{0,0,1}} \end{bmatrix}$$

Figure 10:
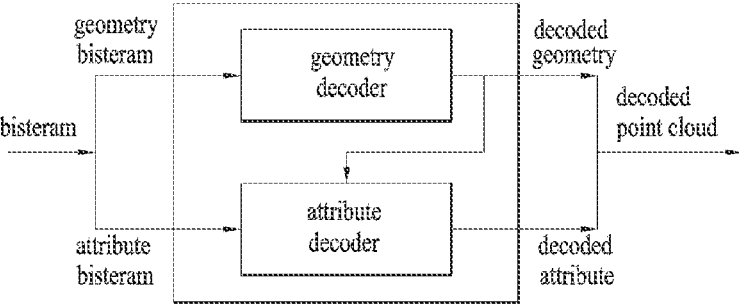
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
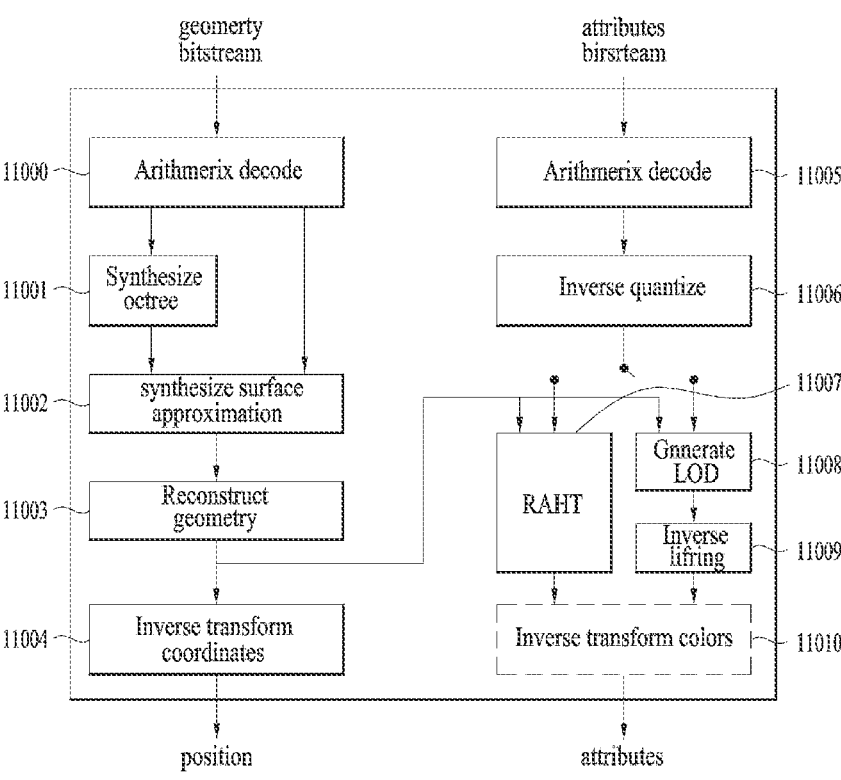
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is a reverse process to the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as a reverse process to the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the reverse process to the operation of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
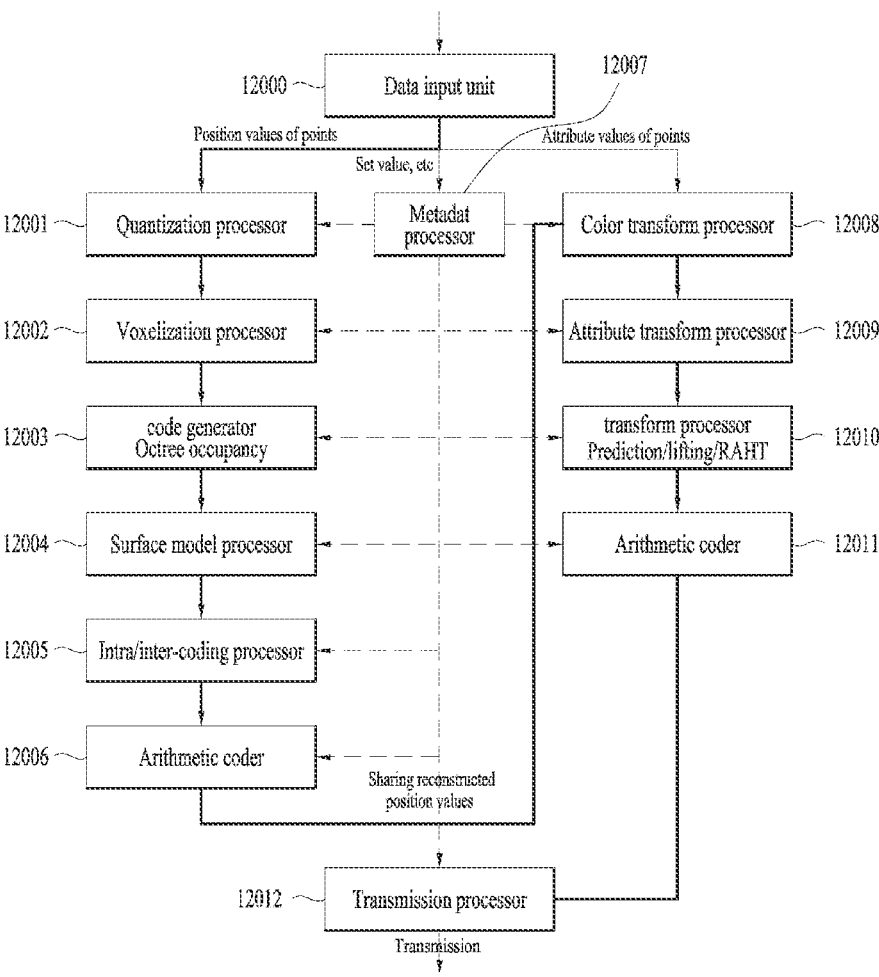
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud encoder (e.g., the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (e.g., coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
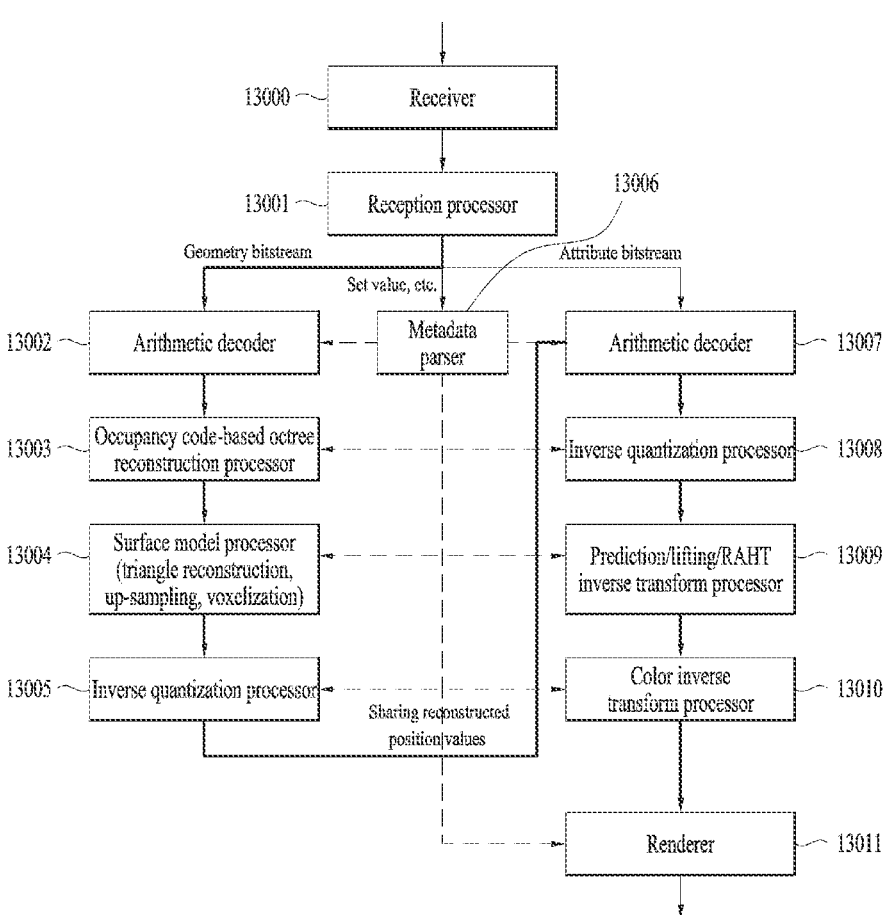
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment may include a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform a reverse process to the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (e.g., triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
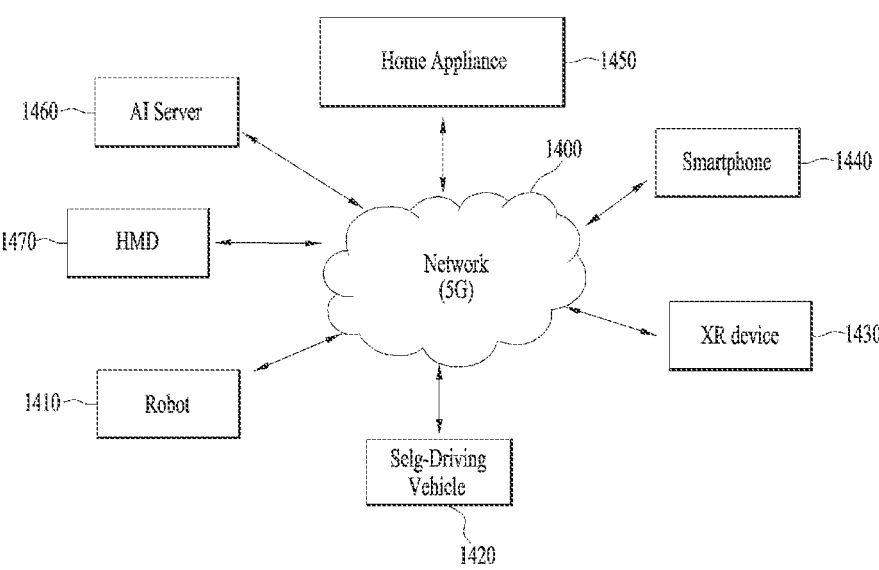
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figures 27, 28:
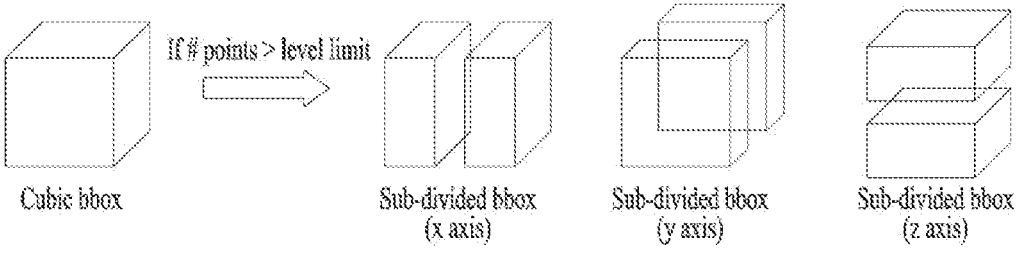
FIG. 27 illustrates a slice generation method that takes cloud density into account according to embodiments.
FIG. 28 illustrates an example of splitting of a non-cubic subgroup bounding box across the z-axis, y-axis, and x-axis according to embodiments.
Figure 41:
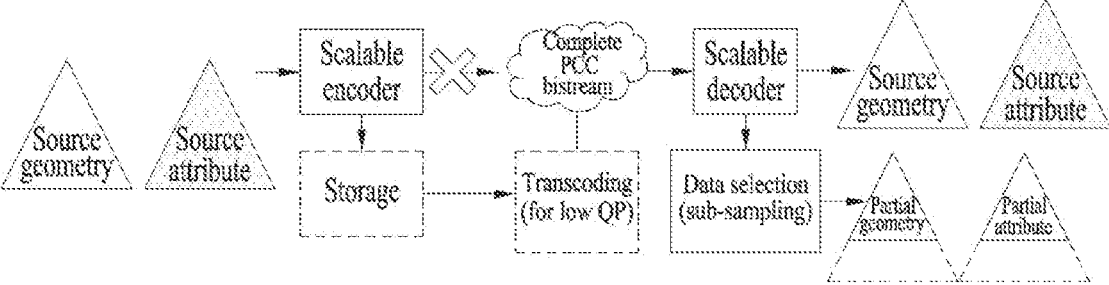
FIG. 41 illustrates a point cloud data transmission/reception method according to embodiments.
Figure 42:
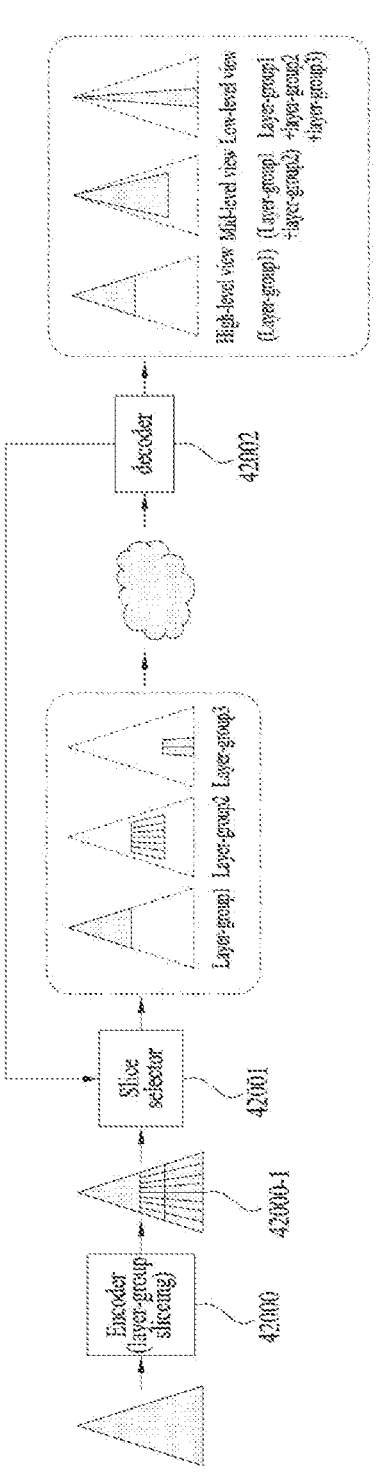
FIG. 42 illustrates a layer group slice according to embodiments.
Figure 43:
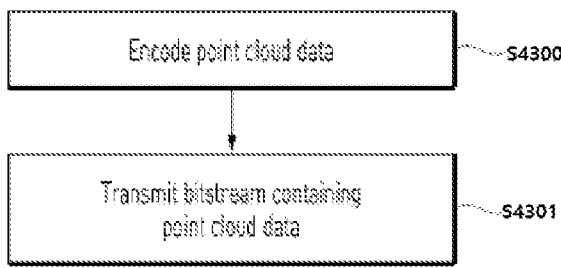
FIG. 43 illustrates a method of transmitting point cloud data according to embodiments.

The point cloud data transmission method/device according to embodiments is construed as a term referring to the transmission device 10000, point cloud video encoder 10002, and transmitter 10003 in FIG. 1, the acquisition 20000/encoding 20001/transmission 20002 in FIG. 2, the encoder in FIG. 4, the transmission device in FIG. 12, the device in FIG. 14, the encoding in FIGS. 15 to 23, the encoding in FIGS. 27 to 29, the bitstream and parameter generation in FIGS. 33 to 36, the encoding in FIGS. 37 and 40 to 42, the transmission method in FIG. 43, and the like.

Figure 38:
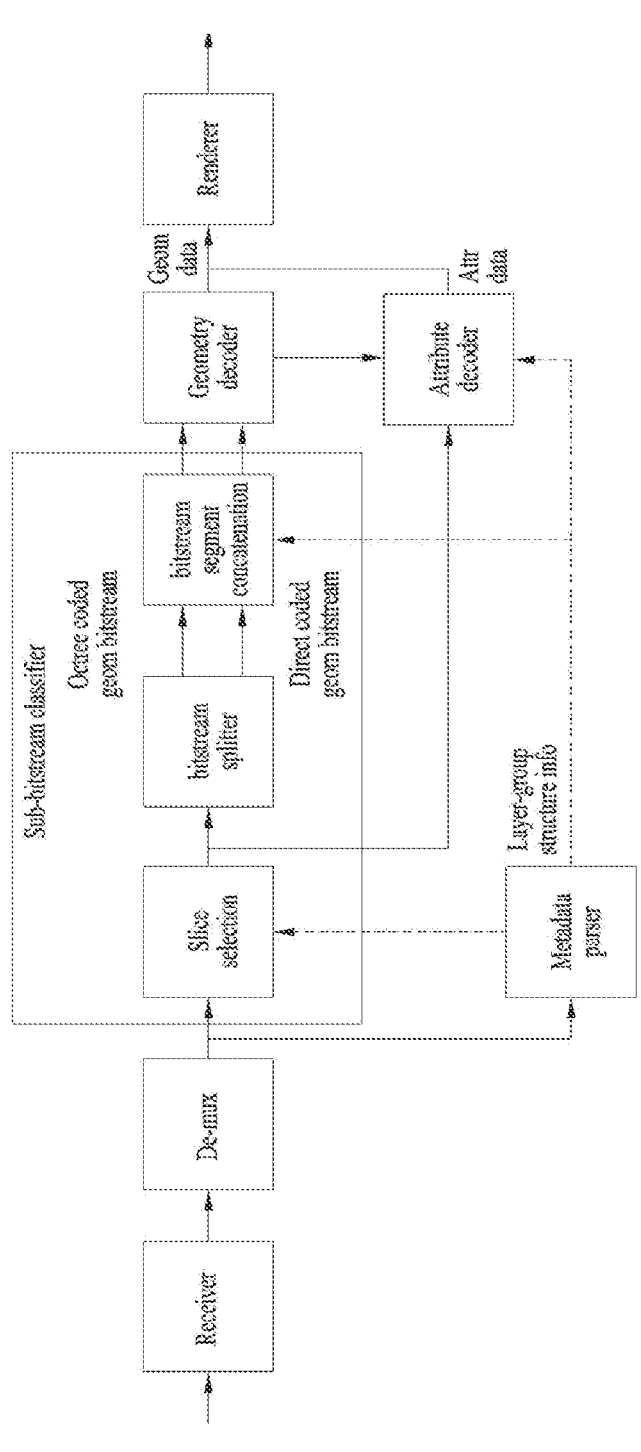
FIG. 38 illustrates a point cloud data reception device according to embodiments.
Figure 40:
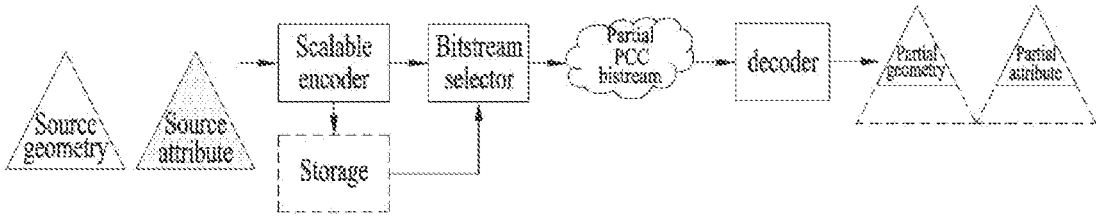
FIG. 40 illustrates a point cloud data transmission/reception method according to embodiments.
Figure 44:
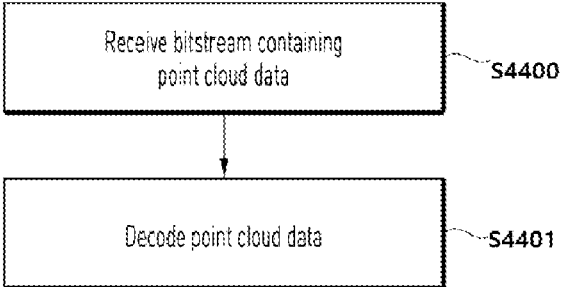
FIG. 44 illustrates a method of receiving point cloud data according to embodiments.

The point cloud data reception method/device according to embodiments is construed as a term referring to the reception device 10004, receiver 10005, and point cloud video decoder 10006 in FIG. 1, the transmission 20002/decoding 20003/rendering 20004 in FIG. 2, the decoder in FIGS. 10 and 11, the reception device in FIG. 13, the device in FIG. 14, the decoding in FIGS. 15 to 23, the decoding in FIGS. 27 to 29, the bitstream parsing in FIGS. 33 to 36, the decoding in FIG. 38, the decoding in FIGS. 40 to 42, the reception method in FIG. 44, and the like.

The method/device for transmitting/receiving point cloud data according to the embodiments may be referred to as a method/device according to the embodiments.

According to embodiments, geometry data, geometry information, position information, and the like constituting the point cloud data are construed as having the same meaning. Attribute data, attribute information, and the like constituting point cloud data are construed as having the same meaning.

Methods/devices according to embodiments may provide a method for controlling point cloud density in a slice.

Embodiments provide a method for efficiently supporting selective decoding of a part of data due to a receiver performance or a transmission speed in transmitting and receiving point cloud data, when necessary. In the proposed method, necessary information may be selected or unnecessary information may be removed in a bitstream unit by dividing geometry and attribute data delivered in data units into semantic units such as geometry octree and Level of Detail (LoD).

Embodiments relate to a technique for configuring a data structure composed of a point cloud. Specifically, embodiments disclose a packing and signaling method for effectively transferring PCC data configured based on a layer, and propose a method of applying the packing and signaling method to a scalable PCC based service. In particular, embodiments propose a method of configuring a slice segment and transmitting and receiving the same to be more suitable for a scalable PCC service when a direct compression mode is used for position compression. In particular, embodiments propose a compression structure for efficiently storing and transmitting mass point cloud data having a wide distribution and high point density.

Referring to FIGS. 4 and 11, point cloud data is composed of a position (e.g., XYZ coordinates) and attributes (e.g., color, reflectance, intensity, grayscale, opacity, etc.) of each datum. In point cloud compression (PCC), octree-based compression is performed to efficiently compress distribution characteristics of uneven distribution in three-dimensional space, and attribute information is compressed based thereon. FIGS. 4 and 11 are flowcharts for the transmitting and receiving ends of the PCC. Operations according to embodiments may be processed by each component at the transmitting and receiving sides of the PCC.

Figure 15:
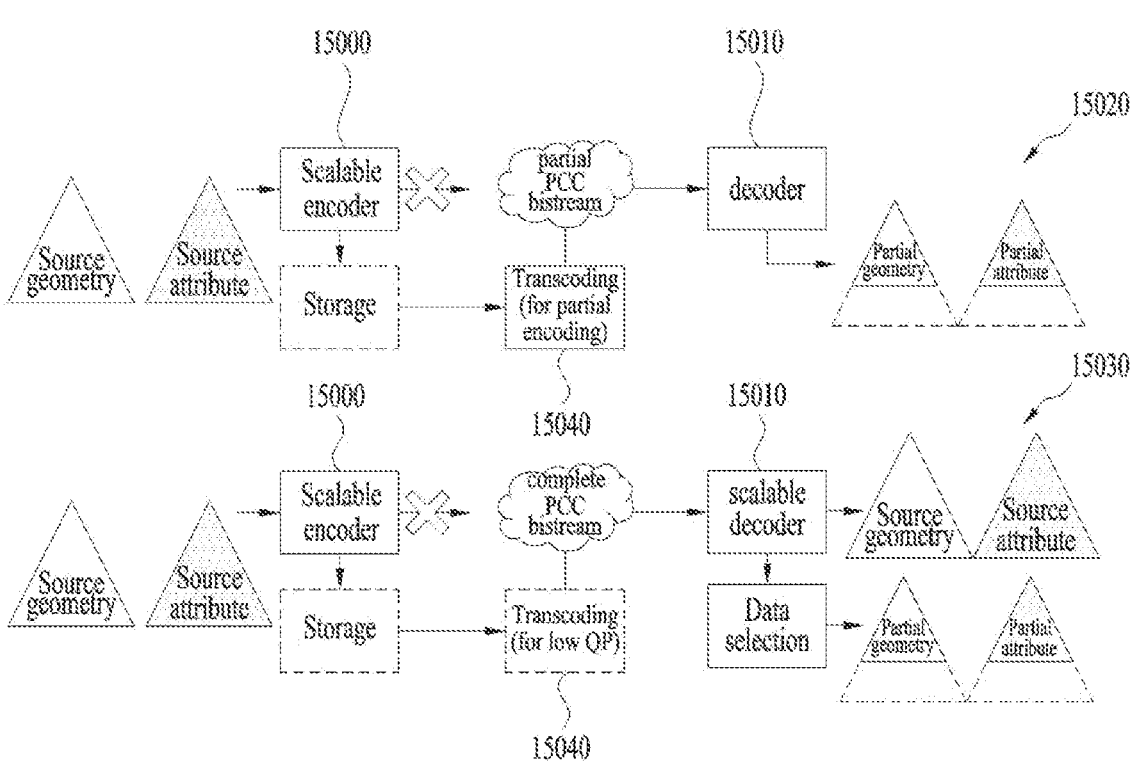
FIG. 15 illustrates a process of encoding, transmission, and decoding point cloud data according to embodiments.

FIG. 15 illustrates a process of encoding, transmission, and decoding point cloud data according to embodiments.

Each component of FIG. 15 may correspond to hardware, software, a processor, and/or a combination thereof.

A point cloud encoder 15000 is a transmission device carrying out a transmission method according to embodiments, and may scalably encode and transmit point cloud data.

A point cloud decoder 15010 is a reception device carrying out a reception method according to embodiments, and may scalably decode the point cloud data.

Source data received by the encoder 15000 may include geometry data and/or attribute data.

The encoder 15000 scalably encodes the point cloud data, but does not immediately generate a partial PCC bitstream. Instead, when it receives full geometry data and full attribute data, it may store the data in a storage connected to the encoder. Then, the encoder may perform transcoding for partial encoding, and generate and transmit a partial PCC bitstream. The decoder 15010 may receive and decode the partial PCC bitstream to reconstruct partial geometry and/or partial attributes.

Upon receiving the full geometry and full attributes, the encoder 15000 may store the data in the storage connected to the encoder, and transcode the point cloud data with a low quantization parameter (QP) to generate and transmit a complete PCC bitstream. The decoder 15010 may receive and decode the complete PCC bitstream to reconstruct full geometry and/or full attributes. The decoder 15010 may select a partial geometry and/or a partial attribute from the complete PCC bitstream through data selection.

The method/device according to the embodiment compresses and transmits the point cloud data by dividing the position information about data points and feature information such as color/brightness/reflectance, which are the point cloud data, into geometry information and attribute information. In this case, an octree structure having layers may be configured according to the degree of detail or PCC data may be configured according to levels of detail (LoDs). Then, scalable point cloud data coding and representation may be performed based the configured structure or data. In this case, only a part of the point cloud data may be decoded or represented due to the performance of the receiver or the transfer rate.

In this process, the method/device according to the embodiments may remove unnecessary data in advance. In other words, when only a part of the scalable PCC bitstream needs to be transmitted (i.e., only some layers are decoded in scalable decoding), there is no way to select and send only the necessary part. Therefore, 1) the necessary part needs to be re-encoded (15020) after decoding, or 2) the receiver must selectively apply an operation after the whole data is transferred thereto (15030). However, in case 1), delay may occur due to the time for decoding and re-encoding (15020). In case 2), bandwidth efficiency may be degraded due to transmission of unnecessary data. Further, when a fixed bandwidth is used, data quality may need to be lowered for transmission (15030).

Accordingly, the method/device according to the embodiments may define a slice segmentation structure of point cloud data, and signal a scalable layer and slice structure for scalable transmission.

In embodiments, to ensure efficient bitstream delivery and decoding, the bitstream may be divided into specific units to be processed.

For octree-based geometry compression, the method/device according to the embodiments may use entropy-based coding and direct coding together. In this case, a slice configuration for efficiently utilization of scalability is needed.

The unit according to the embodiments may be referred to as an LOD, a layer, a slice, or the like. LOD is the same term as LOD in attribute data coding, but may mean a data unit for a layered structure of a bitstream. It may be a concept corresponding to one depth or a bundle of two or more depths based on the hierarchical structure of point cloud data, for example, depths (levels) of an octree or multiple trees. Similarly, a layer is provided to generate a unit of a sub-bitstream, and is a concept that corresponds to one depth or a bundle of two or more depths, and may correspond to one LOD or two or more LODs. Also, a slice is a unit for configuring a unit of a sub-bitstream, and may correspond to one depth, a part of one depth, or two or more depths. Also, it may corresponds one LOD, a part of one LOD, or two or more LODs. According to embodiments, the LOD, the layer, and the slice may correspond to each other or one of the LOD, the layer, and the slice may be included in another one. Also, a unit according to embodiments may include an LOD, a layer, a slice, a layer group, or a subgroup, and may be referred to as being complementary to each other.

In addition, large point clouds with a wide distribution and high density of points may cause latency issues due to a large number of bitstreams that should be processed to access a region of interest. Embodiments may address these issues. For example, embodiments may include a method of selectively coding and transmitting slices based on a region of interest, a methods of generating slices in consideration of the density of the cloud data, a method of signaling Fixed subgroupSize, Fixed subgroupSize plus subgroup division, a rotation-based subgroup division, and the like.

FIG. 16 shows a layer-based point cloud data configuration and a structure of geometry and attribute bitstreams according to embodiments.

The transmission method/device according to the embodiments may configure layer-based point cloud data as shown in FIG. 16 to encode and decode the point cloud data.

Embodiments are directed to efficient transmission and decoding by selectively transmitting and decoding data in a bitstream unit for point cloud data configured in layers.

Layering of point cloud data may have a layer structure in terms of SNR, spatial resolution, color, temporal frequency, bit depth, or the like depending on the application field, and may construct layers in a direction in which data density increases based on the octree structure or LoD structure.

The method/device according to the embodiments may configure, encode, and decode a geometry bitstream and an attribute bitstream based on the layering as shown in FIG. 16.

A bitstream acquired through point cloud compression by the transmission device/encoder according to the embodiments may be divided into a geometry data bitstream and an attribute data bitstream according to the type of data and transmitted.

Each bitstream according to the embodiments may be composed of slices. Regardless of layer information or LoD information, the geometry data bitstream and the attribute data bitstream may each be configured as one slice and delivered. In this case, when only a part of the layer or LoD is to be used, operations of 1) decoding the bitstream, 2) selecting only a desired part and removing unnecessary parts, and 3) performing encoding again based on only the necessary information should be performed.

FIG. 17 shows a bitstream configuration according to embodiments.

The transmission method/device according to the embodiments may generate a bitstream as shown in FIG. 17, and the reception method/device according to the embodiments may decode point cloud data included in the bitstream as shown in FIG. 17.
Bitstream Configuration According to Embodiments In embodiments, in order to avoid unnecessary intermediate processes, a bitstream may be divided into layers (or LoDs) and transmitted.

For example, in the LoD-based PCC structure, a lower LoD is included in a higher LoD. Information included in the current LoD but not included in the previous LoD, that is, information newly included in each LoD may be referred to as R (Rest). As shown in FIG. 17, the initial LoD information and the information R newly included in each LoD may be divided and transmitted in each independent unit.

The transmission method/device according to the embodiments may encode geometry data and generate a geometry bitstream. The geometry bitstream may be configured for each LOD or layer. The geometry bitstream may include a header (geometry header) for each LOD or layer. The header may include reference information for the next LOD or the next layer. The current LOD (layer) may further include information R (geometry data) not included in the previous LOD (layer).

The reception method/device according to the embodiments may encode attribute data and generate an attribute bitstream. The attribute bitstream may be configured for each LOD or layer, and the attribute bitstream may include a header (attribute header) for each LOD or layer. The header may include reference information for the next LOD or the next layer. The current LOD (layer) may further include information R (attribute data) not included in the previous LOD (layer).

The reception method/device according to the embodiments may receive a bitstream composed of LODs or layers and efficiently decode only necessary data without a complicated intermediate process.

Figure 18:
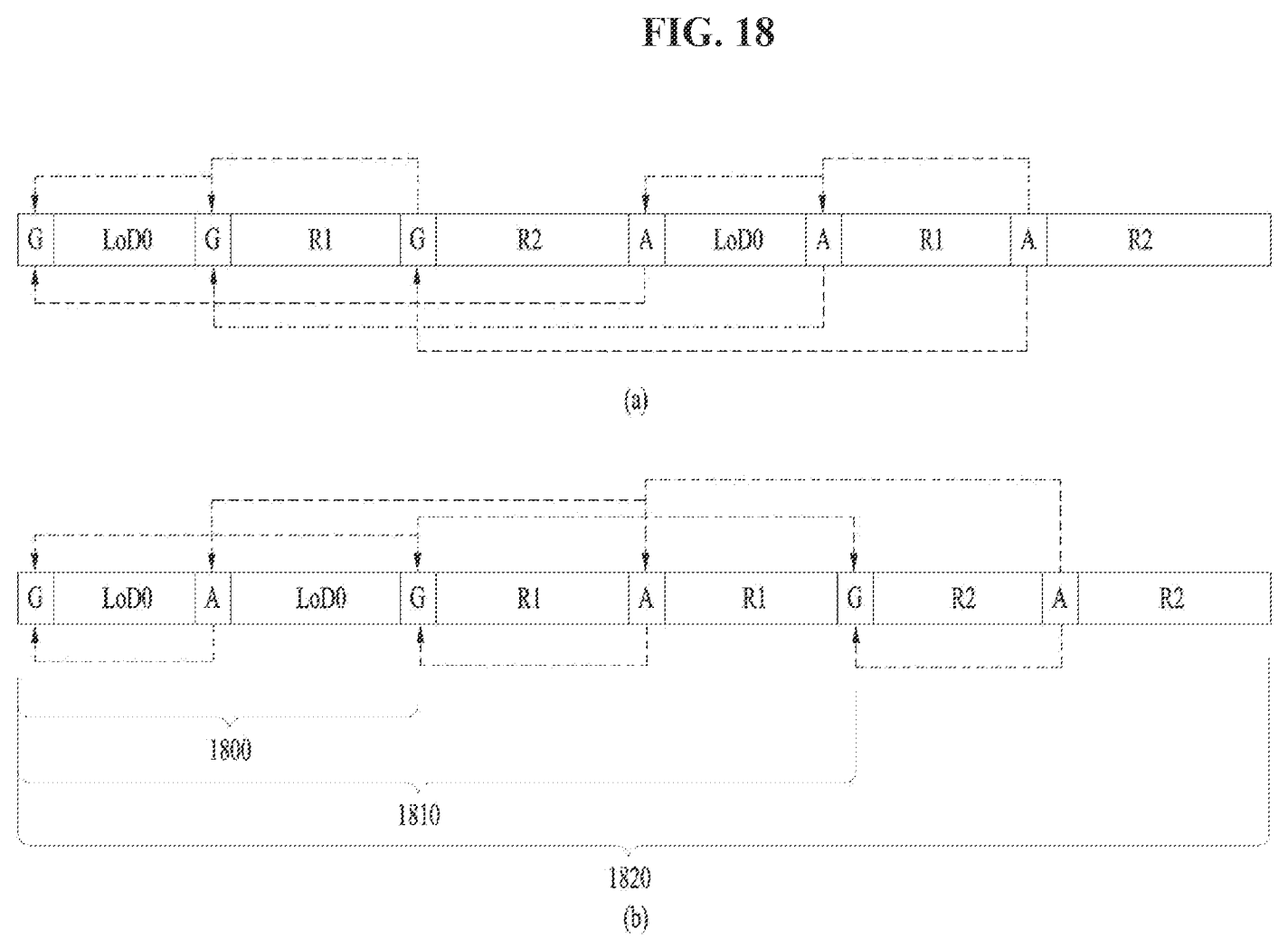

FIG. 18 illustrates a bitstream sorting method according to embodiments.

The method/device according to the embodiments may sort the bitstreams of FIG. 17 as shown in FIG. 18.
Bitstream Sorting Method According to Embodiments In transmitting a bitstream, the transmission method/device according to the embodiments may serially transmit geometry and attributes as shown in FIG. 18. In this case, depending on the type of data, the whole geometry information (geometry data) may be transmitted first, and then the attribute information (attribute data) may be transmitted. In this case, the geometry information may be quickly reconstructed based on the transmitted bitstream information.

In FIG. 18-(*a*), for example, layers (LODs) containing geometry data may be positioned first in the bitstream, and layers (LODs) containing attribute data may be positioned after the geometry layers. Since the attribute data is dependent on the geometry data, the geometry layer may be placed first. In addition, the positions may be changed differently according to embodiments. Reference may also be made between geometry headers and between an attribute header and a geometry header.

Referring to FIG. 18-(*b*), bitstreams constituting the same layer including geometry data and attribute data may be collected and delivered. In this case, by using a compression technique capable of parallel decoding of geometry and attributes, the decoding execution time may be shortened. In this case, information that needs to be processed first (lower LoD, wherein geometry must precede attribute) may be placed first.

A first layer 1800 includes geometry data and attribute data corresponding to the lowest LOD 0 (layer 0) together with each header. A second layer 1810 includes LOD 0 (layer 0), and also includes the geometry data and attribute data of points for a new and more detailed layer 1 (LOD 1), which are not included in LOD 0 (layer 0), as information R1. A third layer 1820 may be subsequently placed in a similar manner.

The transmission/reception method/device according to the embodiments may efficiently select a layer (or LoD) desired in an application field at a bitstream level when a bitstream is transmitted and received. In the bitstream sorting method according to the embodiments, collecting and transmitting geometry information (FIG. 18) may produce an empty part in the middle after bitstream level selection. In this case, the bitstream may need to be rearranged. In the case where geometry and attributes are bundled and delivered according to each layer (FIG. 18), unnecessary information may be selectively removed according to the application field as follows.

FIG. 19 illustrates a method of selecting geometry data and attribute data according to embodiments.
Bitstream Selection According to Embodiments When a bitstream needs to be selected as described above, the method/device according to the embodiments may select data at the bitstream level as shown in FIG. 21: 1) symmetric selection of geometry and attributes; 2) asymmetrical selection of geometry and attributes; or 3) A combination of the above two methods.

1) Symmetric Selection of Geometry and Attributes

Referring to FIG. 19, which illustrates a case where LoDs only up to LoD1 (LOD 0+R1) are selected (19000) and transmitted or decoded, information corresponding to R2 (new portion in LOD 2) corresponding to an upper layer is removed for transmission/decoding.

2) Asymmetric Selection of Geometry and Attributes

A method/device according to embodiments may transmit geometry and attributes asymmetrically. Only the attribute of the upper layer (Attribute R2) is removed (19001), and the full geometry (from level 0 (root level) to level 7 (leaf level) in the triangular octree structure) may be selected and transmitted/decoded (19011).

Referring to FIG. 16, when point cloud data is represented in an octree structure and hierarchically divided into LODs (or layers), scalable encoding/decoding (scalability) may be supported.

The scalability function according to the embodiments may include slice level scalability and/or octree level scalability.

The LoD (level of detail) according to the embodiments may be used as a unit for representing a set of one or more octree layers. In addition, it may mean a bundle of octree layers to be configured as a slice.

In attribute encoding/decoding, the LOD according to the embodiments may be extended and used as a unit for dividing data in detail in a broader sense.

That is, spatial scalability by an actual octree layer (or scalable attribute layer) may be provided for each octree layer. However, when scalability is configured in slices before bitstream parsing, selection may be made in LoDs according to embodiments.

In the octree structure, LOD0 may correspond to the root level to level 4, LOD1 may correspond to the root level to level 5, and LOD2 may correspond to the root level to level 7, which is the leaf level.

That is, as shown in FIG. 16, when scalability is utilized in slices, as in the case of scalable transmission, the provided scalable step may correspond to three steps of LoD0, LoD1, and LoD2, and the scalable step that may be provided by the octree structure in the decoding operation may correspond to eight steps from the root to the leaf.

According to embodiments, for example, in FIG. 16, when LoD0 to LoD2 are configured as respective slices, a transcoder (the transcoder 15040 of FIG. 15) of the receiver or the transmitter may select 1) LoD0 only, select 2) LoD0 and LoD1, or select 3) LoD0, LoD1, and LoD2 for scalable processing.

Example 1: When only LoD0 is selected, the maximum octree level may be 4, and one scalable layer may be selected from among octree layers 0 to 4 in the decoding process. In this case, the receiver may consider a node size obtainable through the maximum octree depth as a leaf node, and may transmit the node size through signaling information.

Example 2: When LoD0 and LoD1 are selected, layer 5 may be added. Thus, the maximum octree level may be 5, and one scalable layer may be selected from among octree layers 0 to 5 in the decoding process. In this case, the receiver may consider a node size obtainable through the maximum octree depth as a leaf node, and may transmit the node size through signaling information.

According to embodiments, an octree depth, an octree layer, and an octree level may be a unit in which data is divided in detail.

Example 3: When LoD0, LoD1, and LoD2 are selected, layers 6 and 7 may be added. Thus, the maximum octree level may be 7, and one scalable layer may be selected from among octree layers 0 to 7 in the decoding process. In this case, the receiver may consider a node size obtainable through the maximum octree depth as a leaf node, and may transmit the node size through signaling information.

Figure 20:
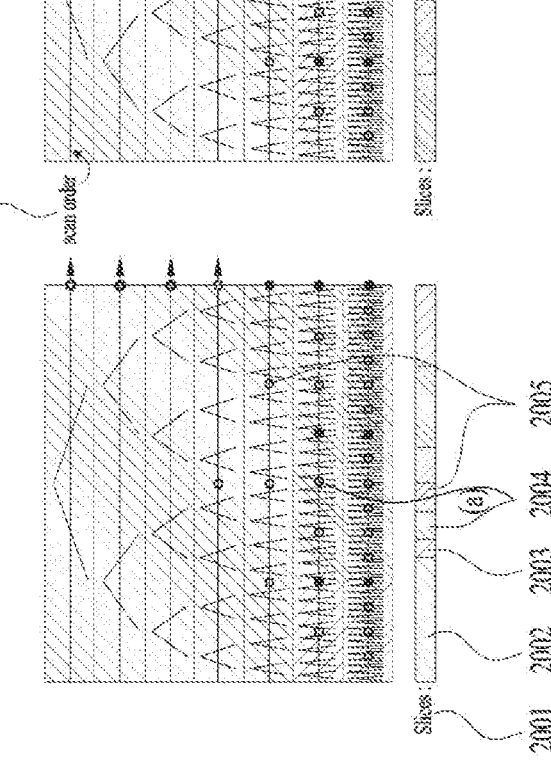
FIG. 20 illustrates a method of configuring a slice including point cloud data according to embodiments.

FIG. 20 illustrates a method of configuring a slice including point cloud data according to embodiments.

Slice Configuration According to Embodiments

The transmission method/device/encoder according to the embodiments may configure a G-PCC bitstream by segmenting the bitstream in a slice structure. A data unit for detailed data representation may be a slice.

A slice according to embodiments may mean a data unit for partitioning point cloud data. That is, a slice represents a portion of the point cloud data. The slice may be referred to as terms representing a certain portion or unit.

For example, one or more octree layers may be matched to one slice.

The transmission method/device according to the embodiments, for example, the encoder, may configure a slice 2001-based bitstream by scanning a node (point) included in an octree in the direction of scan order 2000.

In FIG. 20-(*a*), some nodes in an octree layer may be included in one slice.

The octree layer (e.g., level 0 to level 4) may constitute one slice 2002.

Partial data of an octree layer, for example, level 5 may constitute each slice 2003, 2004, 2005.

Partial data of an octree layer, for example, level 6 may constitute each slice.

In FIGS. 20-(*b*) and 20-(*c*), when multiple octree layers are matched to one slice, only some nodes of each layer may be included. In this way, when multiple slices constitute one geometry/attribute frame, information necessary to configure a layer may be delivered for the receiver. The information may include information about layers included in each slice and information about nodes included in each layer.

In FIG. 20-(*b*), octree layers, for example, level 0 to level 3 and partial data of level 4 may be configured as one slice.

Octree layers, for example, partial data of level 4 and partial data of level 5 may be configured as one slice.

Octree layers, for example, partial data of level 5 and partial data of level 6 may be configured as one slice.

An octree layer, for example, partial data of level 6 may be configured as one slice.

In FIG. 20-(*c*), octree layers, for example, data of level 0 to level 4 may be configured as one slice.

Partial data from each of octree layer level 5, level 6, and level 7 may be configured as one slice.

The encoder and the device corresponding to the encoder according to the embodiments may encode the point cloud data, and may generate and transmit a bitstream containing the encoded data and parameter information related to the point cloud data.

Furthermore, in generating the bitstream, the bitstream may be generated based on the bitstream structure according to embodiments (see, for example, FIGS. 16 to 20). Accordingly, the reception device, the decoder, and a corresponding device according to the embodiments may receive and parse a bitstream configured to be suitable for selective partial data decoding, and partially decode and efficiently provide the point cloud data (see FIG. 15).

Scalable Transmission According to Embodiments

The point cloud data transmission method/device according to the embodiments may scalably transmit a bitstream including point cloud data, and the point cloud data reception method/device according to the embodiments may scalably receive and decode the bitstream.

When the bitstream according to embodiments shown in FIGS. 16 to 20 is used for scalable transmission, information needed to select a slice required by the receiver may be transmitted to the receiver. Scalable transmission may mean transmitting or decoding only a part of a bitstream, rather than decoding the entire bitstream, and the result thereof may be low resolution point cloud data.

When scalable transmission is applied to the octree-based geometry bitstream, point cloud data may need to be configured with information ranging only up to a specific octree layer for the bitstream of each octree layer (FIG. 16) from a root node to a leaf node.

To this end, the target octree layer should have no dependency on information about the lower octree layer. This may be a constraint applied to geometry coding and attribute coding in common.

Figure 23:
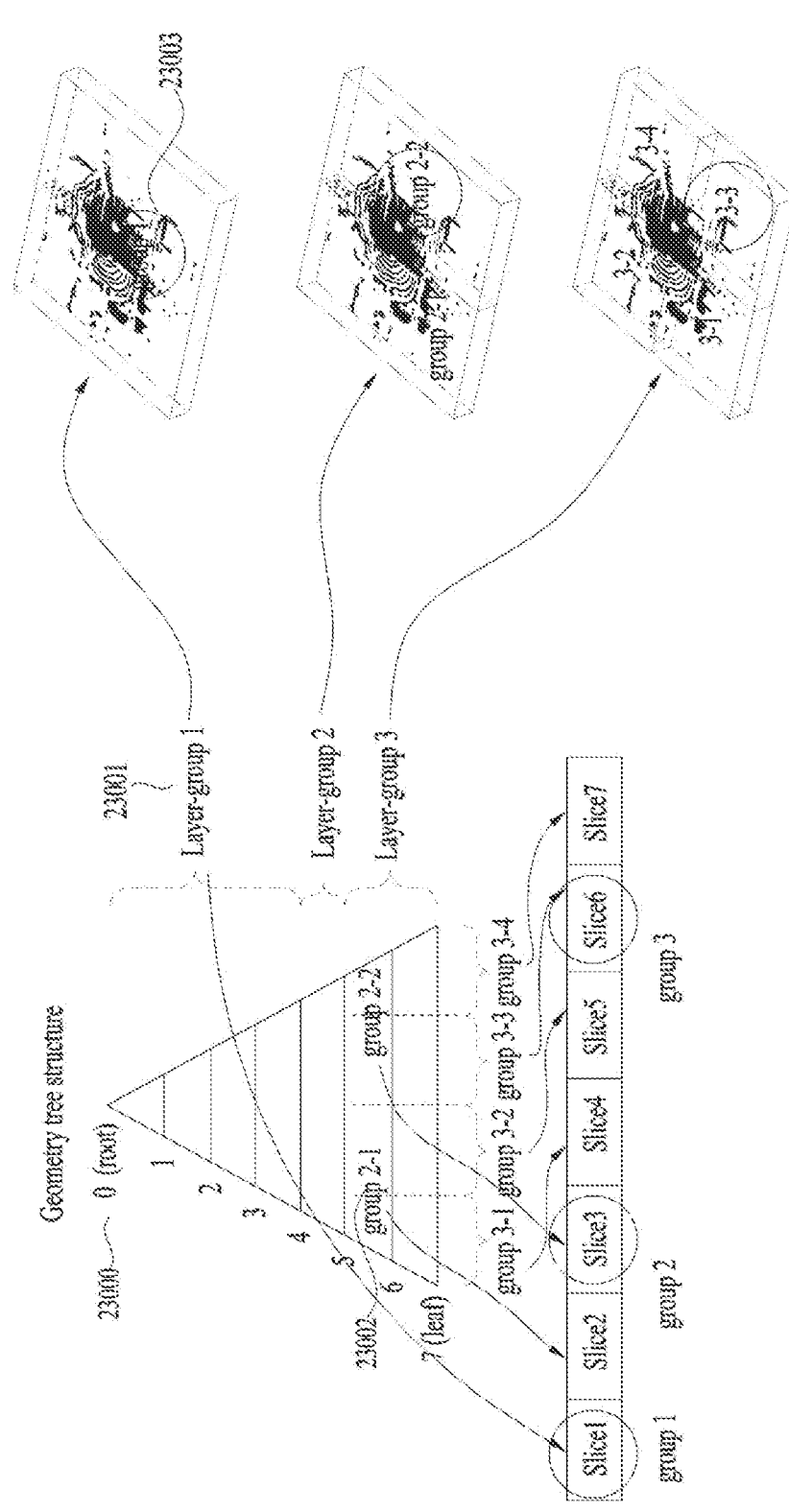
FIG. 23 illustrates a structure of a layer group and subgroups according to embodiments.

In addition, in scalable transmission, a scalable structure used for the transmitter/receiver to select a scalable layer needs to be delivered. Considering the octree structure according to the embodiments, all octree layers may support the scalable transmission, or the scalable transmission may be allowed only for a specific octree layer or lower layers. When a slice includes some of the octree layers, a scalable layer in which the slice is included may be indicated. Thereby, it may be determined whether the slice is necessary/not necessary in the bitstream stage. In the example of FIG. 20-(*a*), the part indicated by 2002 starting from the root node constitutes one scalable layer without supporting scalable transmission. Following octree layers may be matched to scalable layers in a one-to-one correspondence. In general, scalability may be supported for a part corresponding to the leaf node. As shown in FIG. 23-(*c*), when multiple octree layers are included in a slice, it may be defined that one scalable layer shall be configured for the layers.

In this case, scalable transmission and scalable decoding may be used separately according to the purpose. The scalable transmission may be used at the transmitting/receiving side for the purpose of selecting information up to a specific layer without involving a decoder. The scalable decoding is used to select a specific layer during coding. That is, the scalable transmission may support selection of necessary information without involving a decoder in a compressed state (in the bitstream stage), such that the information may be transmitted or determined by the receiver. On the other hand, the scalable decoding may support encoding/decoding data only up to a required part in the encoding/decoding process, and may thus be used in such a case as scalable representation.

In this case, the layer configuration for scalable transmission may be different from the layer configuration for scalable decoding. For example, the three bottom octree layers including leaf nodes may constitute one layer in terms of scalable transmission. However, when all layer information is included in terms of scalable decoding, scalable decoding may be performed for each of leaf node layer n, leaf node layer n-1, leaf node layer n-2.

Hereinafter, a slice structure for the layer configuration described above and a signaling method for scalable transmission will be described.

FIG. 21 illustrates a single slice-based geometry tree structure and a segmented slice-based geometry tree structure according to embodiments.

A method/device according to embodiments may configure slices for delivering point cloud data as shown in FIG. 21.

FIG. 21 shows a geometry tree structure contained in different slice structures. According to G-PCC technology, the entire coded bitstream may be included in a single slice. For multiple slices, each slice may contain a sub-bitstream. The order of the slices may be the same as the order of the sub-bitstreams. The bitstreams may be accumulated in breadth-first order of the geometry tree, and each slice may be matched to a group of tree layers (see FIG. 21). The segmented slices may inherit the layering structure of the G-PCC bitstream.

Slices may not affect previous slices, just as higher layers of the geometry tree do not affect lower layers.

The segmented slices according to the embodiments are effective in terms of error robustness, effective transmission, support of region of interest, and the like.

1) Error Resilience

Compared to a single slice structure, segmented slices may be more resilient to errors. When a slice contains the entire bitstream of a frame, data loss may affect the entire frame data. On the other hand, when the bitstream is segmented into multiple slices, slices that are not affected by the loss may be decoded even when some other slices are lost.

2) Scalable Transmission

Multiple decoders having different capabilities may be supported. When coded data is in a single slice, the LOD of the coded point cloud may be determined prior to encoding.

Accordingly, multiple pre-encoded bitstreams having different resolutions of the point cloud data may be independently transmitted, which may be inefficient in terms of large bandwidth or storage space.

When a PCC bitstream is generated and included in segmented slices, the single bitstream may support decoders of different levels. From the decoder perspective, the receiver may select target layers and may deliver the partially selected bitstream to the decoder. Similarly, by using a single PCC bitstream without partitioning the entire bitstream, a partial PCC bitstream may be efficiently generated at the transmitting side.

3) Region Based Spatial Scalability

Regarding the G-PCC requirement, region-based spatial scalability may be defined as follows. A compressed bitstream may be configured to have one or more layers. A particular region of interest may have additional layers and a higher density, and the layers may be predicted from lower layers.

To support this requirement, it is necessary to support different detailed representations of a region. For example, in a VR/AR application, an object at a distant position may be represented with low accuracy, while an object at a close position may be represented with high accuracy. Alternatively, the decoder may increase the resolution of the region of interest according to a request. This operation may be implemented using the geometry octree and the scalable structure of G-PCC such as the scalable attribute coding scheme. Decoders should access the entire bitstream based on the current slice structure containing the entire geometry or attributes, which may result in inefficiency in terms of bandwidth, memory, and decoder. On the other hand, when the bitstream is segmented into multiple slices, and each slice contains sub-bitstreams according to scalable layers, the decoder according to the embodiments may select slices as needed before efficiently parsing the bitstream.

Figure 22:
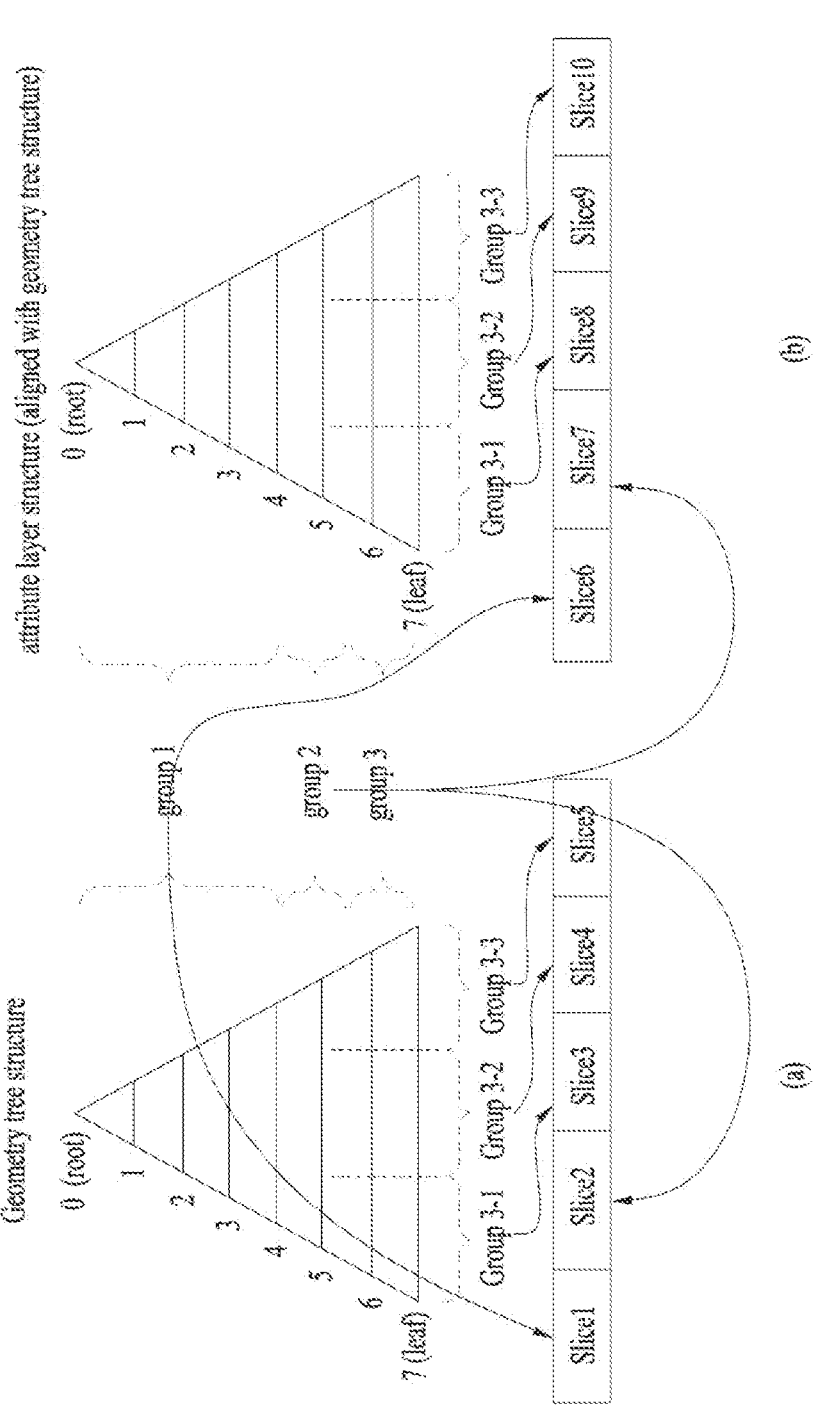
FIG. 22 illustrates a layer group structure of a geometry coding tree and an aligned layer group structure of an attribute coding tree according to embodiments.

FIG. 22 shows a layer group structure of a geometry coding tree and an aligned layer group structure of an attribute coding tree according to embodiments.

A method/device according to embodiments may generate slice layer groups using the hierarchical structure of the point cloud data, as shown in FIG. 22.

The method/device according to the embodiments may apply segmentation of geometry and attribute bitstreams included in different slices. In addition, in terms of tree depth, a coding tree structure of geometry and attribute coding and each slice included in the partial tree information may be used.

FIG. 22-(a) shows an example of a geometry tree structure and proposed slice segments.

For example, there may be 8 layers configured in an octree, and 5 slices may be used to contain sub-bitstreams of one or more layers. A group represents a group of geometry tree layers. For example, group 1 includes layers 0 to 4, group 2 includes layer 5, and group 3 includes layers 6 and 7. Also, a group may be divided into three subgroups. Parent and child pairs are present in each subgroup. Groups 3-1 to 3-3 are subgroups of group 3. When scalable attribute coding is used, the tree structure is identical to the geometry tree structure. The same octree-slice mapping may be used to create attribute slice segments (FIG. 22-(b)).

Layer group: Represents a bundle of layer structure units that occur in G-PCC coding, such as octree layers and LoD layers.

A subgroup may be represented as a set of neighbor nodes based on position information for one layer group. Alternatively, a bundle may be configured based on the lowest layer (which may be a layer closest to the root, and may be layer 6 in the case of group 3 in FIG. 22). A subgroup may be configured as a bundle of nodes neighboring each other according to Morton code order, as a bundle of distance-based neighbor nodes, or as a bundle of nodes neighboring each other according to coding order. Additionally, nodes in a parent-child relationship may be specified to be present in the same subgroup.

When a subgroup is defined, a boundary occurs in the middle of a layer, and information such as sps_entropy_continuation_enabled_flag or gsh_entropy_continuation_flag may be signaled to indicate whether continuity is maintained at the boundary. Also, the signaling information may be used to indicate whether entropy is used continuously, and ref_slice_id may be indicated. Thereby, continuity with the previous slice may be maintained.

FIG. 23 illustrates a structure of a layer group and subgroups according to embodiments.

Point cloud data and bitstreams based on the layer structures shown in FIGS. 21 and 22 may represent bounding boxes as shown in FIG. 23.

The figure shows the subgroup structure and the bounding box corresponding to the subgroup. Layer group 2 is divided into two subgroups (group2-1 and group2-2) and layer group 3 is divided into four subgroups (group3-1, group3-2, group3-3, and group3-4). The subgroups of layer group 2 and the subgroups of layer group 3 are included in different slices. When slices of a layer group and subgroups with bounding box information are given, 1) the bounding box of each slice may be compared with the ROI, and 2) the slice whose subgroup bounding box correlates with the ROI may be selected and spatial access may be performed. Then, 3) the selected slice is selected. When the ROI is considered in region 3-3, slices 1, 3, and 6 are selected as subgroup bounding boxes of layer group 1 and subgroups 2-2 and 3-3 to cover the ROI region. For effective spatial access, it is assumed that there is no dependency between the subgroups of the same layer group. In live streaming or low-latency use cases, when each slice segment is received, the selection and decoding operations may be performed to increase temporal efficiency.

The method/device according to the embodiments may represent data as layers (which may be referred to as depths or levels) as a layer tree 23000 during geometry and/or attribute encoding. Point cloud data corresponding to layers (depths/levels) may be grouped into a layer group (or group) 2301, as in the case of FIGS. 21 and 22. Each layer group may be further divided (segmented) into subgroups 2302. A bitstream may be generated by configuring each subgroup in a slice. The reception device according to the embodiments may receive the bitstream, select a specific slice, decode a subgroup included in the slice, and decode a bounding box corresponding to the subgroup. For example, when slice 1 is selected, a bounding box 2303 corresponding to group 1 may be decoded. Group 1 may be data corresponding to the largest region. When the user wants to additionally view a detailed region for group 1, the method/device according to the embodiments may select slice 3 and/or slice 6, and may partially and hierarchically access the bounding box (point cloud data) of group 2-2 and/or group 3-3 for the detailed regions included in the region of group 1.

Referring now to FIG. 23, an example of a slice selection operation based on subgroup bounding box information is shown. The method/device according to the embodiments determines and selects a slice that matches the ROI based on the subgroup bounding box information.

By dividing a compressed bitstream into slices for delivery with the proposed method for the full coding layer, receivers with different performances may be supported. In the case of selective decoding of slices based on ROI or receiver performance, selection may be performed either directly by the receiver or by the transcoder. In the case of selection by the transcoder, there is no information about the full decoding (e.g., the entire coding layer depth, the total number of layer-groups, the total number of subgroups, etc.). The receiver may need this information during the decoding. In this case, this information may be provided directly or the number of skipped layer groups (num_skipped_layer_groups) and the number of skipped layers (num_skipped_layers) may be delivered as information for inferring the aforementioned information.

An example method of generating ROI according to embodiments is shown below.

```
// The following is the process of ROI setting for slice selection:
Vec3<int> ROI_origin, ROI_size;
gbh.layer_group_enabled_flag = _sps->layer_group_enabled_flag;
if (gbh.layer_group_enabled_flag) {
gbh.num_layer_groups_minus1 = _sps->num_layer_groups_minus1;
gbh.num_layers_per_layer_group = _sps->num_layers_minus1;
for (int i = 0; i <= gbh.num_layer_groups_minus1; i++) {
gbh.num_layers_per_layer_group[i] = _sps->num_layers_minus1[i] + 1;
}
if (params->roiEnabledFlag) {
ROI_size = params->roiSize;
for (int i = 0; i < 3; i++) {
```

-continued

```
int Width = 1 << gbh.rootNodeSizeLog2[i];
double positionScale = params->roiPointScale[i];
if (positionScale < 0)
positionScale = 0;
else if (positionScale > 1)
positionScale = 1;
ROI_origin[i] = int(Width * positionScale + 0.5);
if (ROI_origin[i] >= Width)
```

-continued

```
ROI_origin[i] = Width – 1 – ROI_size[i];
}
}
}
}
```

An example method for ROI-based slice selection by the encoder is shown below.

Slice selection supports scalability and spatial random access (// slice selection: scalability and spatial random access).

```
if (gbh.layer_group_enabled_flag) {
int numOutputSlices = totalNumSlices;
int numSkipLayerGroup = params->numSkipLayerGroups;
if (params->numSkipLayerGroups >= gbh.num_layer_groups_minus1)
numSkipLayerGroup = gbh.num_layer_groups_minus1;
int curLayerGroupId = 0;
int curSubgroupId = 0;
int bufIdx = 0;
for (int i = 0; i < numOutputSlices; i++) {
bool selectSlice = true;
auto curBboxMin = gbh.vec_bboxOrigin[curLayerGroupId][curSubgroupId];
auto curBboxMax = gbh.vec_bboxOrigin[curLayerGroupId][curSubgroupId] +
gbh.vec_bboxSize[curLayerGroupId][curSubgroupId];
auto roiMin = ROI_origin;
auto roiMax = ROI_origin + ROI_size;
if (params->roiEnabledFlag && i > 0) {
for (int i = 0; i < 3; i++) {
if ((roiMin[i] < curBboxMax[i] && roiMax[i] >= curBboxMin[i])) {
continue;
}
else {
selectSlice = false;
break;
}
}
}
if (curLayerGroupId > gbh.num_layer_groups_minus1 – numSkipLayerGroup) {
selectSlice = false;
}
auto dataLen = arithmeticEncoders[i]->stop( );
int num_points = gbh.numNodes[curLayerGroupId][curSubgroupId] +
gbh.numNodesDcm[curLayerGroupId][curSubgroupId];
if (selectSlice && num_points) {
PayloadBuffer& buf = bufs->at(bufIdx++);
// write header
if (i == 0)
write(*_sps, *_gps, gbh, &buf);
else {
DependentGeometryDataUnitHeader dep_gbh;
dep_gbh.geom_parameter_set_id = _gps->gps_geom_parameter_set_id;
dep_gbh.geom_slice_id = gbh.geom_slice_id;
dep_gbh.layer_group_id = curLayerGroupId;
dep_gbh.subgroup_id = curSubgroupId;
dep_gbh.subgroupBboxOrigin=gbh.vec_bboxOrigin[curLayerGroupId][curSubgroupId];
dep_gbh.subgroupBboxSize = gbh.vec_bboxSize[curLayerGroupId][curSubgroupId];
dep_gbh.ref_layer_group_id= gbh.ref_layerGroup[curLayerGroupId][curSubgroupId];
dep_gbh.ref_subgroup_id = gbh.ref_subgroup[curLayerGroupId][curSubgroupId];
if (!params->root_layer_group_context_ref_flag&& curLayerGroupId <
gbh.num_layer_groups_minus1)
dep_gbh.context_reuse_flag = true;
else
dep_gbh.context_reuse_flag = false;
write(*_sps, *_gps, dep_gbh, &buf);
}
// write bitstream
auto& aec = arithmeticEncoders[i];
std::copy_n(aec->buffer( ), dataLen, std::back_inserter(buf));
// signal the actual number of points coded
gbh.footer.geom_num_points_minus1 = num_points – 1;
// append the footer
write(*_gps, gbh, gbh.footer, &buf);
}
if (curSubgroupId == gbh.num_sub_groups_minus1[curLayerGroupId]) {
curLayerGroupId++;
curSubgroupId = 0;
}
```

-continued

```
else
curSubgroupId++;
}
if (bufIdx)
bufs->resize(bufIdx);
}
An example method for ROI-based slice selection by the decoder is shown below.
int PCCTMC3Decoder3::decodeDependentGeometryBrick(const PayloadBuffer& buf)
{
...
bool selectedSlice = true;
auto curBboxMin = _dep_gbh.subgroupBboxOrigin;
auto curBboxMa = _dep_gbh.subgroupBboxOrigin + _dep_gbh.subgroupBboxSize;
auto roiMin = _params.roiOrigin;
auto roiMax = _params.roiOrigin + _params.roiSize;
if (_sps->subgroup_enabled_flag[_dep_gbh.layer_group_id]) {
if (_params.roiEnabledFlag) {
for (int i = 0; i < 3; i++) {
if ((roiMin[i] < curBboxMax[i] && roiMax[i] >= curBboxMin[i])) {
continue;
}
else {
selectedSlice = false;
break;
}
}
}
}
if (!selectedSlice) {
return 0;
}
}
...
}
```

Figure 24:
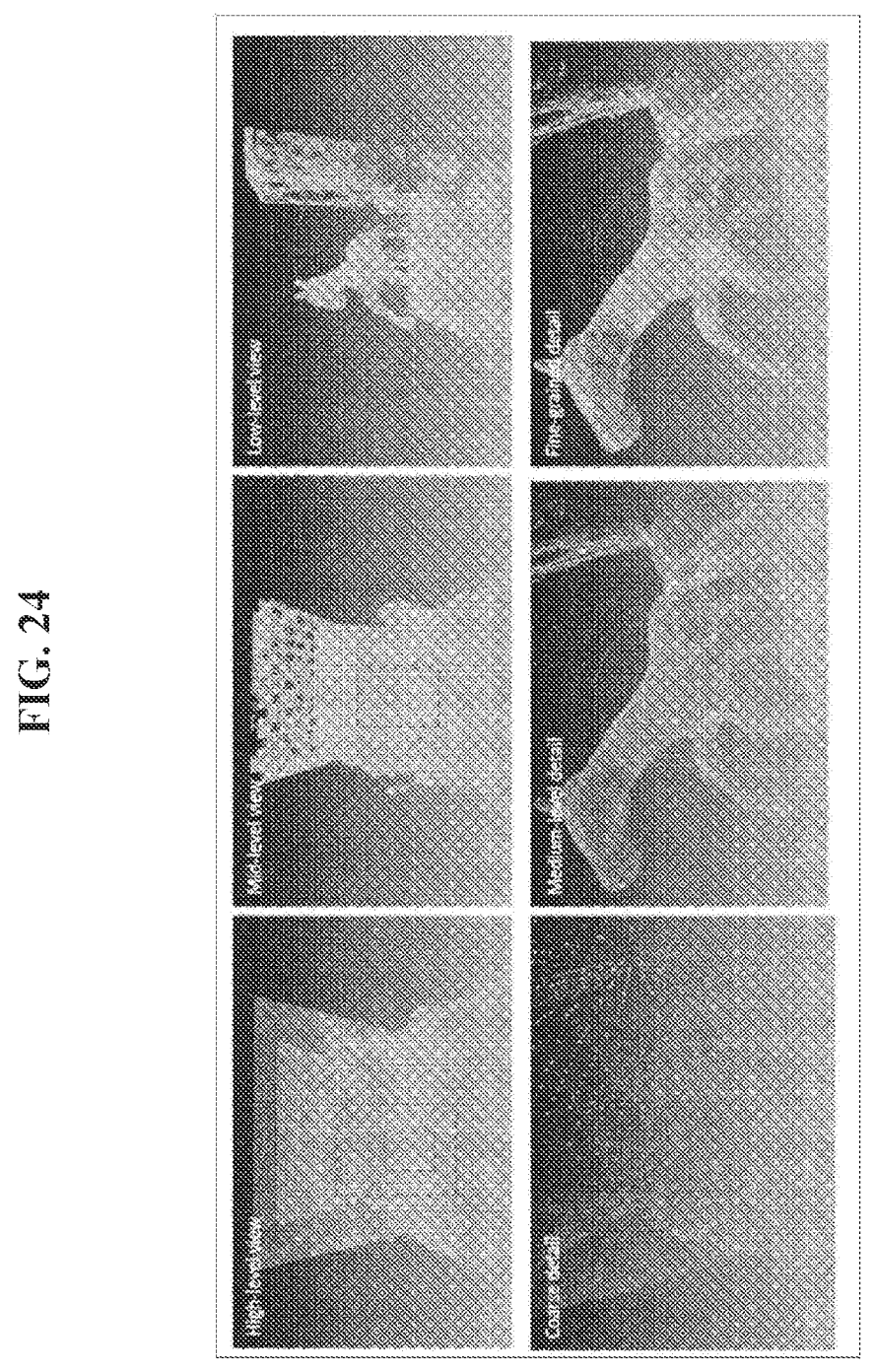
Figure 25:
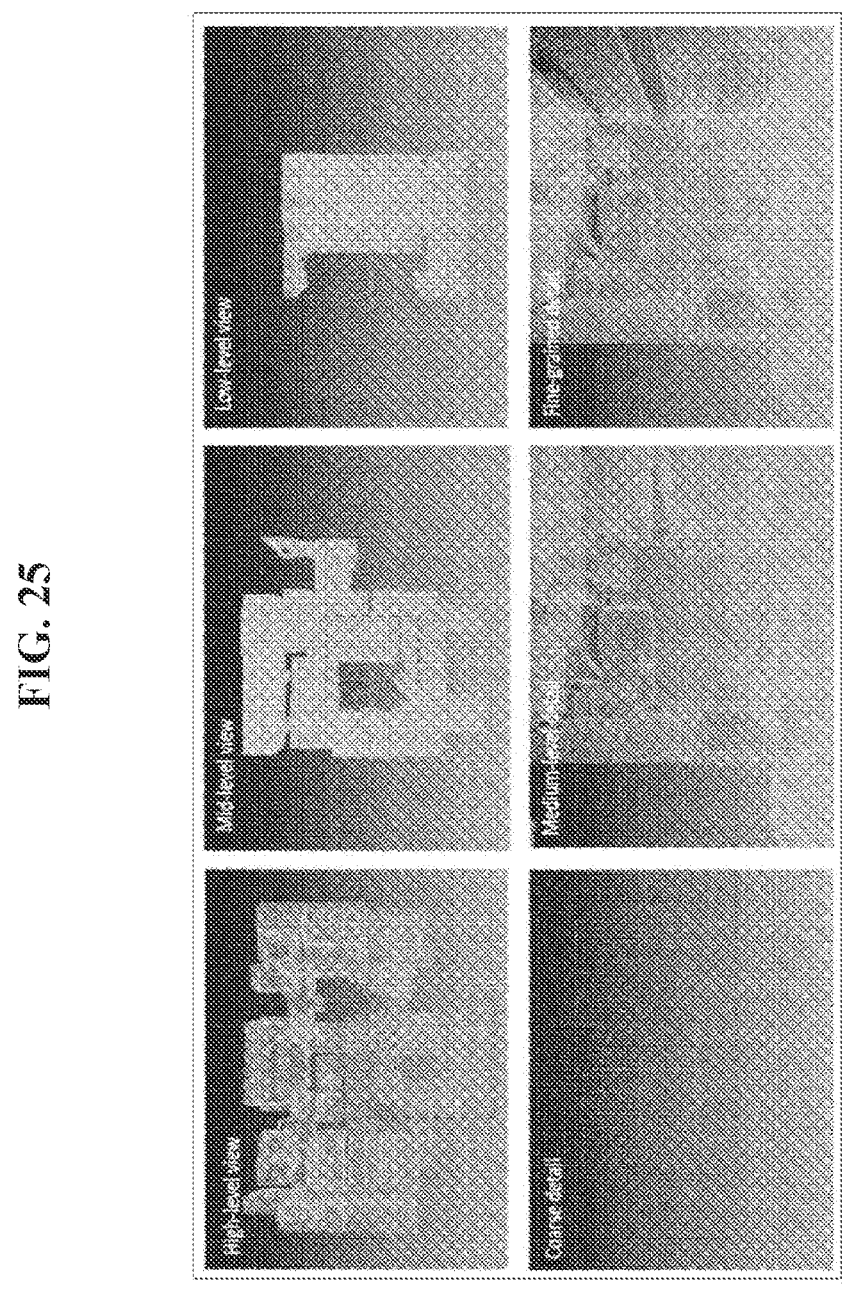
Figure 26:
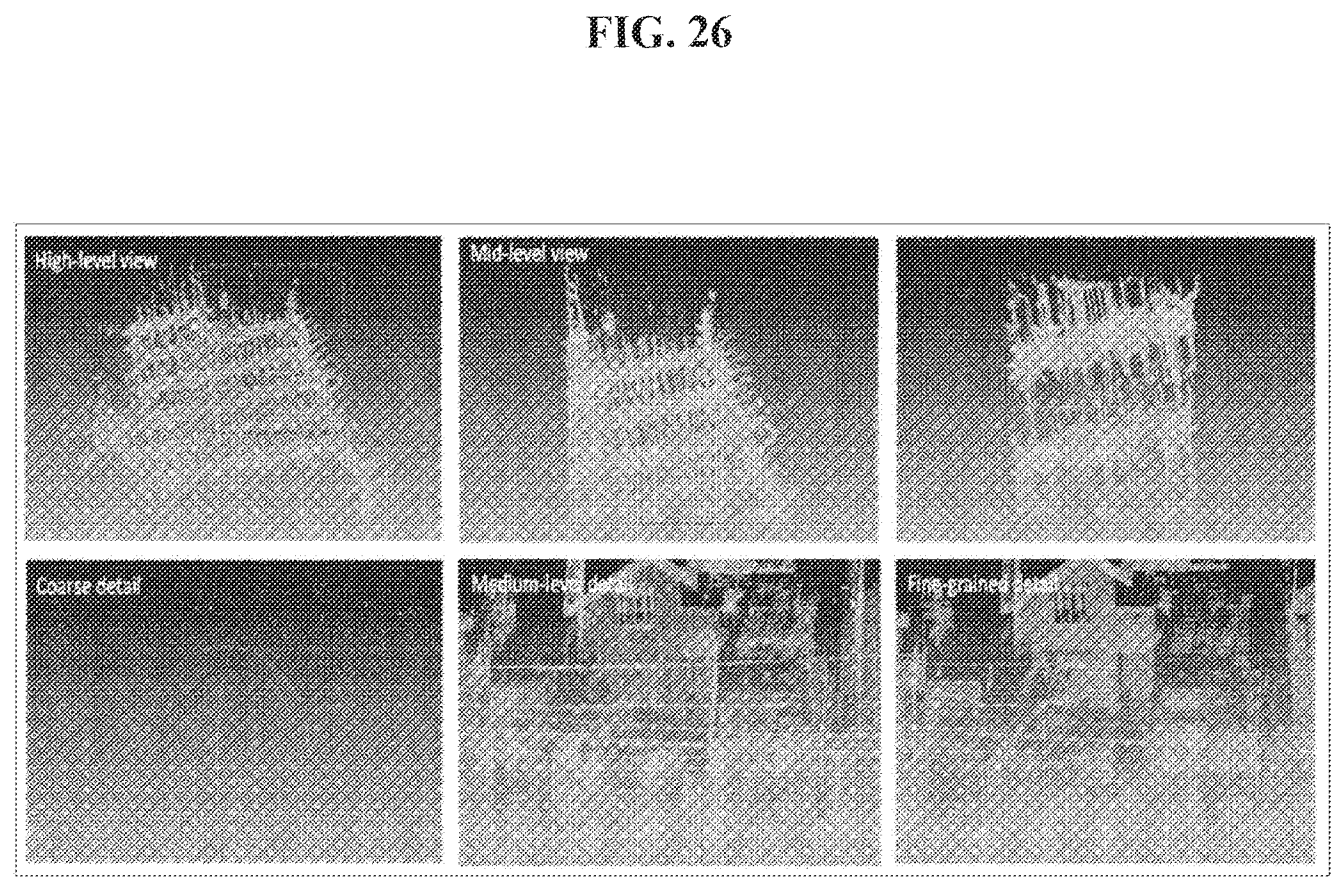

FIGS. 24 to 26 shows examples of resultant images according to the slice selection described above.

FIGS. 24, 25, and 26 illustrate multi-resolution and multi-size ROI outputs according to embodiments.

The structure shown in FIGS. 16 to 23 and 42 allows for multi-resolution and multi-size ROI outputs.

Example Comparison for Multi-Resolution Multi-Size ROIs:

For a detailed comparison, results from the viewing distance adaptive resolution use cases of the three approaches may be obtained. Based on the assumptions described above, three different levels of viewing distance may be considered as the output of the receiver: 1) a high-level view with coarse detail, 2) a mid-level view with medium-level detail, and 3) a low-level view with fine detail.

Referring to FIGS. 24 to 26, three different resolutions of the ULB_unicorn_HiRes_vox15_n.ply and Stanford_Area_4_vox16.ply data are shown, which represent three target outputs. From the high-level to the low-level, the volume decreases while the resolution (or point density) increases.

FIG. 27 illustrates a slice generation method that takes cloud density into account according to embodiments.

The method/device for transmitting point cloud data according to the embodiments (i.e., the transmission device 10000, point cloud video encoder 10002, and transmitter 10003 in FIG. 1, the acquisition 20000-encoding 20001-transmission 20002 in FIG. 2, the encoder in FIG. 4, the transmission device in FIG. 12, the device in FIG. 14, the encoding in FIGS. 15 to 23, the encoding in FIGS. 27 to 29, the encoding in FIGS. 37 and 40 to 42, and the transmission method in FIG. 43) may generate and encode slices considering the density of the point cloud data, as shown in FIG. 27.

The method/device for receiving point cloud data according to the embodiments (i.e., the reception device 10004, receiver 10005, and point cloud video decoder 10006 in FIG. 1, the transmission 20002-decoding 20003-rendering 20004 in FIG. 2, the decoder in FIGS. 10 and 11, the reception device in FIG. 13, the device in FIG. 14, the decoding in FIGS. 15 to 23, the decoding in FIGS. 27 to 29, the decoding in FIG. 38, the decoding in FIGS. 40 to 42, and the reception method in FIG. 44) may decode the point cloud data based on slices generated in consideration of the density of the point cloud data.

Regarding the method of generating slices considering the density of the cloud data according to the embodiments, the method/device according to the embodiments may use an adaptive subgroup bounding box.

The concept of an adaptive subgroup bounding box is disclosed below.

As an example of use of a non-cubic bounding box, subgroup splitting may limit the number of nodes in each subgroup. In the case of subgroup splitting, cubic subgroups with a fixed subgroup size within the input sequence are used. Since the splitting (partitioning) is based on spatial regions, the range of the number of nodes in each slice is not guaranteed. To make the number of points in a subgroup be in the level limit, the cubic bounding box may be subdivided as shown in FIG. 27. In this example, the original bounding box is split into two by dividing the cubic center on one axis. Splitting across the y and z axes among the three axes results in a Morton order. If the position where the splitting is performed is not the center, then the sub-divided bounding boxes may be present over the Morton order for all three cases.

To illustrate the use of non-cubic subgroup bounding boxes over the Morton order, the results of subgroup splitting on the CTC test content are examined. In this example, the splitting process may be applied to test content with a large number of points. For example, the number of points in the data (ulb_unicorn_hires_vox15.ply) is 63,787,119 and the number of subgroups in the last layer group generated is 105 (applying the conditions described above). Because of the non-uniform distribution of points in the point cloud data, there may be subgroups with points the number of which exceeds 1,100,000 according to TMC13. To adjust the number of points in such subgroups, the cubic subgroup may be split into multiple subgroups. An example of non-cubic subgroups generated by the splitting is shown in FIG. 28. In the table in FIG. 28, each row represents an example of splitting across the z-axis, y-axis, and x-axis. Each column represents the subgroup origin, size, and number of points before and after the splitting. In this example, the direction of the splitting is determined to produce two sub-divided results that have as similar a number of points as possible. As shown in the table, the number of points after the splitting may be lower than the level limit to produce coder-friendly slices. In this example, the number of slices in the last layer group may change to 121 after the splitting.

FIG. 28 illustrates an example of splitting of a non-cubic subgroup bounding box across the z-axis, y-axis, and x-axis according to embodiments.

An example of dividing the cubic bounding box into subgroup boxes described in FIG. 27 is shown in FIG. 28.

For example, when there is a cubic bounding box positioned at (0, 0, 8192) on the axis, the size of the bounding box is (4096, 4096, 4096), and the number of points in the box is 1,197,362, splitting may be performed. Subdivision may be applied along the z-axis, and two subgroups may be created. The number of points in each box may decrease. Similarly, the subdivision may be applied along the y-axis and/or x-axis to fit the number of points in each box (subgroup).

In layer group slicing, subgroups are split based on subgroupSize, a parameter that determines the length of the cube. A cubic subgroup may be considered a unit of spatial random access, as the bounding box of the content is divided by a uniform distance on all axes.

However, this simple approach cannot take into account the number of points in the subgroup, and thus the number of points in the subgroup may exceed the limit used in TMC13. Since one of the purposes of the limit is to ensure the performance of the receiver, it is required to create subgroups such that they have points below the limit.

To this end, a smaller subgroupSize may be used. However, this may create more discontinuities between neighbor nodes and cause a header and parameters to be added to the inventory, thereby increasing the number of subgroups which may cause inefficiencies. Additionally, constraints on the number of subgroups may be necessary in consideration of decoding capabilities. Accordingly, the following constraints for generating subgroups may be considered in the embodiments.

1) The number of points in a subgroup is lower than the level limitation.

2) Less number of additional subgroups.

Methods of generating subgroups according to embodiments may include 1) using a fixed subgroup size, and/or 2) using both a fixed subgroup size and subgroup splitting.

1. Using a Fixed Subgroup Size

In generating subgroups, all subgroups may be generated based on a fixed subgroup size. The following is an implementation embodiment of the process for generating layergroups and subgroups based on the subgroup origin, subgroup size, point number measurement, and layer-group structure parameter, and storing related parameters in the sequence parameter set (SPS) and layer-group structure inventory.

```
if (params->layer_group_enabled_flag) {
Vec3<int> bound;
for (int k = 0; k < 3; k++) {
auto min_k = inputPointCloud.computeBoundingBox( ).min[k];
auto max_k = inputPointCloud.computeBoundingBox( ).max[k];
// The SPS bounding box is not the source scale in relation to the conforming scale, and
the range may be transformed.
min_k= std::round(inputPointCloud.computeBoundingBox( ).min[k] * params-
>seqGeomScale);
max_k= std::round(inputPointCloud.computeBoundingBox( ).max[k] * params-
>seqGeomScale);
bound[k] = max_k - min_k + 1;
}
GeometryBrickHeader gbh_temp;
for (int k = 0; k < 3; k++) {
gbh_temp.rootNodeSizeLog2[k] = ceillog2(std::max(2, bound[k]));
}
if (!params->gps.qtbt_enabled_flag) {
gbh_temp.rootNodeSizeLog2 = gbh_temp.rootNodeSizeLog2.max( );
}
auto lvlNodeSizeLog2 = mkQtBtNodeSizeList(params->gps, params->geom.qtbt,
gbh_temp);
int minNodeSizeLog2 = gbh_temp.trisoupNodeSizeLog2(params->gps);
lvlNodeSizeLog2.erase(
std::remove_if(
lvlNodeSizeLog2.begin( ), lvlNodeSizeLog2.end( ),
[&](Vec3<int>& size) { return size < minNodeSizeLog2; }),
vlNodeSizeLog2.end( ));
assert(lvlNodeSizeLog2.back( ) == minNodeSizeLog2);
lvlNodeSizeLog2.emplace_back(lvlNodeSizeLog2.back( ));
int maxDepth = lvlNodeSizeLog2.size( ) - 2;
params->subgroupBboxSize_Cubic = (params->subgroupBboxSize_Cubic < (1 <<
gbh_temp.rootNodeSizeLog2.max( )))
? params->subgroupBboxSize_Cubic : 1 << gbh_temp.rootNodeSizeLog2.max( );
if (params->subgroupBboxSize_Cubic < 0)
params->subgroupBboxSize_Cubic = 1 << (int)(gbh_temp.rootNodeSizeLog2.max( ) - 3);
Vec3<int> initSubgroupBboxSize = params->subgroupBboxSize_Cubic;
```

-continued

```
params->sps.layer_group_enabled_flag = params->layer_group_enabled_flag;
params->sps.num_layer_groups_minus1 = params->num_layer_groups_minus1;
params->sps.layer_group_id.resize(params->num_layer_groups_minus1 + 1);
params->sps.num_layers_minus1.resize(params->num_layer_groups_minus1 + 1);
params->sps.subgroup_enabled_flag.resize(params->num_layer_groups_minus1 + 1);
int depthRemained = maxDepth;
for (int i = 0; i <= params->sps.num_layer_groups_minus1; i++) {
if (params->numLayersInLayerGroup0 && depthRemained > 0) {
params->sps.layer_group_id[i] = i;
if (i == 0)
params->sps.num_layers_minus1[i] = params->numLayersInLayerGroup0 – 1;
else if (i < params->sps.num_layer_groups_minus1)
params->sps.num_layers_minus1[i] = (params->num_layers_per_layer_group[i – 1] <=
depthRemained)
? params->num_layers_per_layer_group[i – 1] – 1 : depthRemained – 1;
else
params->sps.num_layers_minus1[i] = depthRemained – 1;
if (i < params->sps.num_layer_groups_minus1) {
depthRemained -= (params->sps.num_layers_minus1[i] + 1);
if (depthRemained <= 0) {
params->sps.num_layer_groups_minus1 = i;
params->sps.layer_group_id.resize(params->num_layer_groups_minus1 + 1);
params->sps.num_layers_minus1.resize(params->num_layer_groups_minus1 + 1);
params->sps.subgroup_enabled_flag.resize(params->num_layer_groups_minus1 + 1,
false);
break;
}
}
}
else {
params->sps.layer_group_id[i] = i;
if (i == 0) {
params->sps.num_layers_minus1[i] = maxDepth;
for (int j = 0; j < params->sps.num_layer_groups_minus1; j++)
params->sps.num_layers_minus1[i] -= params->num_layers_per_layer_group[j – 1];
}
else
params->sps.num_layers_minus1[i] = params->num_layers per layer group[i – 1];
}
}
if (params->subgroupBboxSize_Cubic > 0) {
for (int i = 0; i <= params->sps.num_layer_groups_minus1; i++) {
if (i == 0)
params->sps.subgroup_enabled_flag[i] = false;
else
params->sps.subgroup_enabled_flag[i] = true;
}
Vec3<int> numPerAxis = 1;
int numMaxSubgroups = 1;
for (int k = 0; k < 3; k++) {
numPerAxis[k] = std::ceil(double(1 << gbh_temp.rootNodeSizeLog2[k]) /
initSubgroupBboxSize[k]);
numMaxSubgroups *= numPerAxis[k];
}
std::vector<std::vector<Vec3<int>>> subgrpPointCloud;
subgrpPointCloud.resize(numMaxSubgroups);
auto minInput = inputPointCloud.computeBoundingBox( ).min;
for (int i = 0; i < inputPointCloud.getPointCount( ); i++) {
Vec3<int> subgroupIdx, pos;
for (int k = 0; k < 3; k++) {
if (i == 0)
minInput[k] = std::round(minInput[k] * params->seqGeomScale);
pos[k] = std::round(inputPointCloud[i][k] * params->seqGeomScale) – minInput[k];
subgroupIdx[k] = (int)(pos[k] / initSubgroupBboxSize[k]);
}
int currentIdx = (subgroupIdx[0] * numPerAxis[1] + subgroupIdx[1]) * numPerAxis[2] +
subgroupIdx[2];
subgrpPointCloud[currentIdx].push_back(pos);
}
params->refLayerGroupId.resize(params->num_layer_groups_minus1 + 1);
params->refSubgroupId.resize(params->num_layer_groups_minus1 + 1);
params->subgrpBboxOrigin.resize(params->num_layer_groups_minus1 + 1);
params->subgrpBboxSize.resize(params->num_layer_groups_minus1 + 1);
int maxXYZ = 0;
int numMaxPointsInSubgroup = 1100000;
for (int lyrGrpIdx = 0; lyrGrpIdx < params->num_layer_groups_minus1 + 1;
lyrGrpIdx++) {
if (lyrGrpIdx == 0) {
params->refLayerGroupId[lyrGrpIdx].push_back(0);
```

```
    params->refSubgroupId[lyrGrpIdx].push_back(0);
    params->subgrpBboxOrigin[lyrGrpIdx].push_back({ 0, 0, 0 });
    params->subgrpBboxSize[lyrGrpIdx].push_back({ 1 << gbh_temp.rootNodeSizeLog2[0],
1 << gbh_temp.rootNodeSizeLog2[1], 1 << gbh_temp.rootNodeSizeLog2[2] });
    }
    else {
    int idx = 0;
    for (int i = 0; i < subgrpPointCloud.size ( ); i++) {
    if (subgrpPointCloud[i].size( ) > 0) {
    Vec3<int> curIdx;
    curIdx[2] = i % numPerAxis[2];
    curIdx[1] = (int)(i / numPerAxis[2]) % numPerAxis[1];
    curIdx[0] = (int)((int)(i / numPerAxis[2]) / numPerAxis[1]);
    Vec3<int> curBboxOrigin;
    for (int m = 0; m < 3; m++)
    curBboxOrigin[m] = initSubgroupBboxSize[m] * curIdx[m];
    if (lyrGrpIdx > 1 && !params->root_layer_group_context_ref_flag) {
    params->refLayerGroupId[lyrGrpIdx].push_back(lyrGrpIdx − 1);
    params->refSubgroupId[lyrGrpIdx].push_back(idx);
    }
    else {
    params->refLayerGroupId[lyrGrpIdx].push_back(0);
    params->refSubgroupId[lyrGrpIdx].push_back(0);
    }
    params->subgrpBboxOrigin[lyrGrpIdx].push_back(curBboxOrigin);
    params->subgrpBboxSize[lyrGrpIdx].push_back(initSubgroupBboxSize);
    if (maxXYZ < curBboxOrigin.max( ))
    maxXYZ = curBboxOrigin.max( );
    idx++;
    }
    }
    }
    }
    params->sps.subgroupBboxOrigin_bits_minus1 = numBits(maxXYZ) − 1;
    params->sps.subgroupBboxSize_bits_minus1 = numBits(initSubgroupBboxSize.max( )) −
1;
    }
    else {
    params->sps.subgroupBboxOrigin_bits_minus1 = 0;
    params->sps.subgroupBboxSize_bits_minus1 = numBits((int)(1 <<
gbh_temp.rootNodeSizeLog2.max( ))) − 1;
    params->refLayerGroupId.resize(params->num_layer_groups_minus1 + 1);
    params->refSubgroupId.resize(params->num_layer_groups_minus1 + 1);
    params->subgrpBboxOrigin.resize(params->num_layer_groups_minus1 + 1);
    params->subgrpBboxSize.resize(params->num_layer_groups_minus1 + 1);
    for (int lyrGrpIdx = 0; lyrGrpIdx < params->num_layer_groups_minus1 + 1;
lyrGrpIdx++) {
    params->subgrpBboxOrigin[lyrGrpIdx].push_back({ 0, 0, 0 });
    params->subgrpBboxSize[lyrGrpIdx].push_back({ 1 << gbh_temp.rootNodeSizeLog2[0],
1 << gbh_temp.rootNodeSizeLog2[1], 1 << gbh_temp.rootNodeSizeLog2[2] });
    params->refSubgroupId[lyrGrpIdx].push_back(0);
    if (lyrGrpIdx > 1 && !params->root_layer_group_context_ref_flag)
    params->refLayerGroupId[lyrGrpIdx].push_back(lyrGrpIdx − 1);
    else
    params->refLayerGroupId[lyrGrpIdx].push_back(0);
    }
    }
    // The layer-group structure inventory parameter may be set.
    LayerGroupStructureInventory layerGroupStructureInventory;
    layerGroupStructureInventory.lgsi_seq_parameter_set_id = params-
>sps.sps_seq_parameter_set_id;
    layerGroupStructureInventory.lgsi_frame_idx_bits = params->sps.frame_ctr_bits;
    layerGroupStructureInventory.lgsi_frame_idx = _frameCounter & ((1 << params-
>sps.frame_ctr_bits) − 1);
    layerGroupStructureInventory.lgsi_num_slice_ids_minus1 = 0;
    layerGroupStructureInventory.slice_ids.clear( );
    layerGroupStructureInventory.slice_ids.resize(layerGroupStructure-
Inventory.lgsi_num_slice_ids_minus1 + 1);
    for (auto& slice : layerGroupStructureInventory.slice_ids) {
    slice.lgsi_slice_id = 0;
    slice.lgsi_num_layer_groups_minus1 = params->sps.num_layer_groups_minus1;
    slice.lgsi_subgroupBboxOrigin_bits_minus1 = params-
>sps.subgroupBboxOrigin_bits_minus1;
    slice.lgsi_subgroupBboxSize_bits_minus1 = numBits(1 <<
gbh_temp.rootNodeSizeLog2.max( )) − 1;
    slice.layerGroups.clear( );
    slice.layerGroups.resize(slice.lgsi_num_layer_groups_minus1 + 1);
    int idx = 0;
    for (auto& entry : slice.layerGroups) {
```

-continued

```
    entry.lgsi_layer_group_id = idx;
    entry.lgsi_num_layers_minus1 = params->sps.num_layers_minus1[idx];
    entry.lgsi_num_subgroups_minus1 = params->subgrpBboxOrigin[idx].size( ) − 1;
    entry.subgroups.clear( );
    entry.subgroups.resize(entry.lgsi_num_subgroups_minus1 + 1);
    for (int i = 0; i < entry.lgsi_num_subgroups_minus1 + 1; i++) {
    auto& subentry = entry.subgroups[i];
    subentry.lgsi_subgroup_id = i;
    subentry.lgsi_subgroupBboxOrigin = params->subgrpBboxOrigin[idx][i];
    subentry.lgsi_subgroupBboxSize = params->subgrpBboxSize[idx][i];
    if (idx > 1)
    subentry.lgsi_parent_subgroup_id = subentry.lgsi_subgroup_id;
    else
    subentry.lgsi_parent_subgroup_id = 0;
    }
    idx++;
    }
    }
    layerGroupStructureInventory.lgsi_origin = _originInCodingCoords;
    layerGroupStructureInventory.lgsi_origin_bits_minus1 =
numBits(_originInCodingCoords.max( )) − 1;
    callback->onOutputBuffer(write(params->sps, layerGroupStructureInventory));
    }
    // Storage may be allocated for attribute contexts.
    _ctxtMemAttrs.resize(params->sps.attributeSets.size( ));
    }
```

2. Using Both the Fixed Subgroup Size and Subgroup Division

Using a fixed subgroup size may make it easier to determine the range of a required region from a spatial random access perspective, but may not allow the points to be evenly divided. This may result in some subgroups having more points than the number of points that are processible by the decoder (i.e., the level limit). To avoid this issue, a method to divide the points into subgroups is needed. When the number of subgroups increases, it may exceed the number of subgroups that the decoder may handle. Therefore, a splitting method that does significantly increase the number of subgroups is needed.

Considering the second constraint (number of subgroups), the method/device according to the embodiments may split the cubic subgroup bounding box in steps. In other words, the splitting is terminated when the first constraint (number of points) is met. This may reduce the number of additional subgroups compared to splitting in all three directions.

FIG. 29 illustrates a subgroup division process according to embodiments.

The method/device for transmitting point cloud data according to the embodiments (i.e., the transmission device 10000, point cloud video encoder 10002, and transmitter 10003 in FIG. 1, the acquisition 20000-encoding 20001-transmission 20002 in FIG. 2, the encoder in FIG. 4, the transmission device in FIG. 12, the device in FIG. 14, the encoding in FIGS. 15 to 23, the encoding in FIGS. 27 to 29, the encoding in FIGS. 40 to 42, and the transmission method in FIG. 43) may split a cubic subgroup containing point cloud data, as shown in FIG. 29.

The method/device for receiving point cloud data according to the embodiments (i.e., the reception device 10004, receiver 10005, and point cloud video decoder 10006 in FIG. 1, the transmission 20002-decoding 20003-rendering 20004 in FIG. 2, the decoder in FIGS. 10 and 11, the reception device in FIG. 13, the device in FIG. 14, the decoding in FIGS. 15 to 23, the decoding in FIGS. 27 to 29, the decoding in FIG. 38, the decoding in FIGS. 40 to 42, and the reception method in FIG. 44) may split a cubic subgroup containing point cloud data as shown in FIG. 29, or decode the subgroup split at the transmitting side.

An example of proposed subgroup splitting is shown in FIG. 29. In each step (e.g., step 1 to step 3), one of the splitting directions is selected. In the first step, when the number of points is greater than the level limit, the number of points in the subgroup bounding box is calculated and split into two subblocks. In determining the split direction, the costs of the splits are calculated and compared. To create fewer subgroup splits, the cost of the split is considered to be the difference in the number of points between subdivisions A and B.

$$\text{Cost} = |\text{Number of points in subdivision } A - \text{Number of points in subdivision } B|$$

By comparing the three costs of splitting along the x, y, and z axes, the direction with the lowest cost is selected as the direction for subgroup splitting. In the example in FIG. 29, the direction of y is selected.

If the number of points in subdivisions A and B is less than the level limit, the process is terminated. On the other hand, if one or two subgroups do not satisfy constraint 1 (number of points), the subgroup bounding box is split in the direction selected in the rest of the previous step. The same cost function is used for the selection as for the criterion. After the secondary splitting, the score of each sub-range is estimated and compared with the level limit. Depending on the result, the splitting is either terminated in step 2 or further splitting is performed.

If the number of points in subdivision A or B is greater than or equal to the level limit, third subgroup splitting is performed. Since there is only one direction of splitting, the subgroup splitting is performed without selection. The final output of the subgroup splitting is bounding boxes that are all subdivided in each step where the number of points in the bounding boxes is less than the level limit.

Referring to FIG. 29, the following operations are performed by a subgroup splitter or processor responsible for subgroup splitting in the encoder (or decoder).

The device receives a cubic subgroup containing the point cloud data and detects, as step 1, whether the number of points in the subgroup is greater than a threshold (level limit). If the number of points is large, the subgroup splitting is performed. For example, subdivision may be performed on three axes, and candidate subdivisions (or subgroups) A and B may be generated for each axis according to the subdivision. The subdivision with the best score may be selected from among the three candidate subdivisions. For example, when the difference in the number of points between the subdivisions is smaller in the y-axis division than in the x-axis division, the subdivision on the y-axis may be performed. in step 2, when the subdivision with the best score is selected, if the number of points is less than the threshold, no further splitting is required and thus the subgroup split process is terminated. Otherwise, additional subdivision may be performed. For example, since the y-axis subdivision has been applied first, a y-axis-x-axis subdivision and a y-axis-z-axis subdivision may be considered. The scores according to the number of points may be compared between the two candidates and the subdivision with the best score may be selected. In step 3, after the second subdivision, when the number of points in a subgroup is less than a threshold, the subdivision may be terminated as no further division is needed. Otherwise, a third subdivision may be performed. For example, the subgroup may be split along the y-axis-z-axis-x-axis. Through steps 1 to 3, subdivisions of the subgroups (which may be referred to as subgroups for simplicity) of different sizes may be generated.

In FIG. 29, division in up to three directions (x, y, z) is considered in performing subgroup division. However, if necessary, the division may be performed in one direction after another (e.g., x, x, y, z), or it may be applied recursively by reducing the subgroup size (e.g., x, y, z, x, y, z, . . . ).

While the embodiments consider generating subgroups with fixed subgroupSize and then performing subgroup division on some of the subgroups, subgroups may be generated by incrementally dividing the subgroups based on the number of points if the initial subgroup size is determined as a root bounding box containing the entire point cloud data.

FIG. 30 shows a comparison between variable subgroup sizes and fixed subgroup sizes according to embodiments;

FIG. 30 shows the overall division result. The results show that subgroup division has a small impact on compression efficiency, and the number of points in a subgroup remains below the level limit.

Implementation Example of Unidirectional Subdivision

```
int splitOneDirection(std::vector<Vec3<int>>& splitBboxOrigin,
std::vector<Vec3<int>>& splitBboxSize, const std::vector<int> numPointsInSplitedSubgroups,
    const Vec3<int> subOrigin_in, const Vec3<int> subSize_in, const Vec3<int>
BestDirection, const int numDivMinus1, Vec3<int> posHigh, const int maxNumPoint)
    {
    int divAxis = BestDirection[numDivMinus1];
    Vec3<int> subOrigin = subOrigin_in;
    Vec3<int> subSize = subSize_in;
    subSize[divAxis] /= 2;
    if (posHigh[numDivMinus1])
    subOrigin[divAxis] += subSize[divAxis];
    // The number of points are calculated.
    int mask = 0, mask_base = 0;
    for (int m = 0; m <= numDivMinus1; m++) {
    mask_base += 1 << (2 − BestDirection[m]);
    if (posHigh[m])
    mask += 1 << (2 − BestDirection[m]);
    }
    std::cout << "\t\mask_base = " << mask_base << "\tmask = " << mask << std::endl;
    std::cout << "\t\tList of selected points : ";
    int numPoints = 0;
    for (int k = 0; k < 8; k++) {
    if ((k & mask_base) == mask) {
    numPoints += numPointsInSplitedSubgroups[k];
    std::cout << k << " (" << numPoints << ")\t";
    }
    }
    std::cout << std::endl;
    if (numPoints <= maxNumPoint || numDivMinus1 >= 2) {
    if (numPoints) {
    splitBboxOrigin.push_back(subOrigin);
    splitBboxSize.push_back(subSize);
    }
    else
    return numPoints;
    }
    else{
    posHigh[numDivMinus1 + 1] = 0;
    splitOneDirection(splitBboxOrigin, splitBboxSize, numPointsInSplitedSubgroups,
    subOrigin, subSize, BestDirection, numDivMinus1 + 1, posHigh, maxNumPoint);
    posHigh[numDivMinus1 + 1] = 1;
    splitOneDirection(splitBboxOrigin, splitBboxSize, numPointsInSplitedSubgroups,
    subOrigin, subSize, BestDirection, numDivMinus1 + 1, posHigh, maxNumPoint);
    return 0;
    }
    }
    Implementation example of a 3-step based subgroup division
    void splitSubgroup(std::vector<Vec3<int>>& splitBboxOrigin,
std::vector<Vec3<int>>& splitBboxSize, const std::vector<Vec3<int>> subgrpPointCloud,
    const Vec3<int> curBboxOrigin, const Vec3<int> initSubgroupBboxSize, const int
maxNumPoint) {
```

-continued

```
Vec3<int> center;
for (int m = 0; m < 3; m++)
center[m] = curBboxOrigin[m] + initSubgroupBboxSize[m] / 2;
std::vector<std::vector<Vec3<int>>> splitSubgroupPointCloud;
splitSubgroupPointCloud.resize(8);
for (int k = 0; k < subgrpPointCloud.size( ); k++) {
auto pos = subgrpPointCloud[k];
int splitIdx = 0;
for (int m = 0; m < 3; m++)
if (pos[m] >= center[m])
splitIdx += 1 << (2 – m);
splitSubgroupPointCloud[splitIdx].push_back(pos);
}
Vec3<int> score, sumLow, sumHigh;
std::vector<int> numPointsInSplitedSubgroups;
for (int m = 0; m < 3; m++) {
int low = 0, high = 0;
int mask = 1 << (2 – m);
for (int k = 0; k < 8; k++)
{numPointsInSplitedSubgroups.push_back(splitSubgroupPointCloud[k].size( ));
if (!!(k & mask))
high += numPointsInSplitedSubgroups[k];
else
low += numPointsInSplitedSubgroups[k];
if(m == 0)
std::cout << "\tsplitSubgroupPointCloud[" << k << "].size( ) =" <<
numPointsInSplitedSubgroups[k] << std::endl;
}
sumLow[m] = low;
sumHigh[m] = high;
score[m] = abs(high – low);
}
Vec3<int> bestScore, BestDirection;
for (int m = 0; m < 3; m++) {
if (m == 0 || score[m] < bestScore[0]) {
for (int k = m; k > 0; k--) {
bestScore[k] = bestScore[k–1];
BestDirection[k] = BestDirection[k–1];
}
bestScore[0] = score[m];
BestDirection[0] = m;
}
else if (score[m] < bestScore[1]) {
bestScore[2] = bestScore[1];
BestDirection[2] = BestDirection[1];
bestScore[1] = score[m];
BestDirection[1] = m;
}
else {
bestScore[m] = score[m];
BestDirection[m] = m;
}
}
Vec3<int> posHigh = –1;
posHigh[0] = 0;
splitOneDirection(splitBboxOrigin, splitBboxSize, numPointsInSplitedSubgroups,
curBboxOrigin, initSubgroupBboxSize, BestDirection, 0, posHigh, maxNumPoint);
posHigh[0] = 1;
splitOneDirection(splitBboxOrigin, splitBboxSize, numPointsInSplitedSubgroups,
curBboxOrigin, initSubgroupBboxSize, BestDirection, 0, posHigh, maxNumPoint);
}
Embodiment of subgroup division
int maxXYZ = 0;
int numMaxPointsInSubgroup = 1100000;
for (int lyrGrpIdx = 0; lyrGrpIdx < params->num_layer_groups_minus1 + 1;
lyrGrpIdx++) {
if (lyrGrpIdx == 0) {
params->refLayerGroupId[lyrGrpIdx].push_back(0);
params->refSubgroupId[lyrGrpIdx].push_back(0);
params->subgrpBboxOrigin[lyrGrpIdx].push_back({ 0, 0, 0 });
params->subgrpBboxSize[lyrGrpIdx].push_back({ 1 << gbh_temp.rootNodeSizeLog2[0],
1 << gbh_temp.rootNodeSizeLog2[1], 1 << gbh_temp.rootNodeSizeLog2[2] });
}
else {
int idx = 0;
for (int i = 0; i < subgrpPointCloud.size( ); i++) {
if (subgrpPointCloud[i].size( ) > 0) {
Vec3<int> curIdx;
curIdx[2] = i % numPerAxis[2];
```

```
curIdx[1] = (int)(i / numPerAxis[2]) % numPerAxis[1];
curIdx[0] = (int)((int)(i / numPerAxis[2]) / numPerAxis[1]);
Vec3<int> curBboxOrigin;
for (int m = 0; m < 3; m++)
curBboxOrigin[m] = initSubgroupBboxSize[m] * curIdx[m];
//////////////
// Subgroup division
std::vector<Vec3<int>> splitBboxOrigin, splitBboxSize;
if (subgrpPointCloud[i].size( ) > numMaxPointsInSubgroup) {
splitSubgroup(splitBboxOrigin, splitBboxSize, subgrpPointCloud[i],
curBboxOrigin, initSubgroupBboxSize, numMaxPointsInSubgroup);
}
else {
splitBboxOrigin.push_back(curBboxOrigin);
splitBboxSize.push_back(initSubgroupBboxSize);
}
for (int k = 0; k < splitBboxOrigin.size( ); k++) {
if (lyrGrpIdx > 1 && !params->root_layer_group_context_ref_flag) {
params->refLayerGroupId[lyrGrpIdx].push_back(lyrGrpIdx − 1);
params->refSubgroupId[lyrGrpIdx].push_back(idx);
}
else {
params->refLayerGroupId[lyrGrpIdx].push_back(0);
params->refSubgroupId[lyrGrpIdx].push_back(0);
}
params->subgrpBboxOrigin[lyrGrpIdx].push_back(splitBboxOrigin[k]);
params->subgrpBboxSize[lyrGrpIdx].push_back(splitBboxSize[k]);
if (maxXYZ < splitBboxOrigin[k].max( ))
maxXYZ = splitBboxOrigin[k].max( );
idx++;
}
}
}
}
}
params->sps.subgroupBboxOrigin_bits_minus1 = numBits(maxXYZ) − 1;
params->sps.subgroupBboxSize_bits_minus1 = numBits(initSubgroupBboxSize.max( )) −
1;
}
```

Subgroup division according to the embodiments may not be available if the subgroup decoding is dependent on the coding order. For example, consider a case where the nodes included in a subgroup are taken from a parent, and the parent subgroup includes a plurality of child subgroups.

First, the subgroup may be truncated considering the coding order. In this case, nodes that are included in the child subgroup may be selected based on the information about the first point of the subgroup (including the xyz position or the index on the parent output node) and the information about the last node (including the xyz position or the index on the parent output node or index from the first point of the child subgroup). With this method, necessary points may be selected with less computation, but there are limitations on the coding order.

FIG. 31 illustrates a subgroup bounding box based on a node scan order according to embodiments.

FIG. 31 illustrates different types of subgroup bounding boxes in a 2D domain. Each 4×4 region represents a parent subgroup. The smallest quadrangle represents a node, the arrows represent the node scan order (Morton order). The quadrangles are indicated by bold solid lines. Lines indicate bounding boxes. An example of a subgroup in which bounding boxes are restricted by the node scan order is illustrated in FIG. 31. The square and rectangular subgroup bounding boxes include all shaded contiguous nodes.

Referring to FIG. 31, a method/device according to the embodiments may code the subgroup bounding box in a specific order. The points coded by the scan order may all be included in the bounding box.

FIG. 32 illustrates a subgroup bounding box based on a node scan order according to embodiments.

FIG. 32 shows an example of a subgroup where some shaded nodes are outside the bounding box. This may occur when the size of the boundary is not a power of two, or when a child (sub) group is created by dividing the parent subgroup in a Morton order.

When a subgroup is split by the aforementioned subdivision, there may be case where a position of a point accessed according to the coding order is outside the subgroup (bounding box). In this case, the coding may be performed using any of the following method according to embodiments.

For example, a parent subgroup output point that is contained in the bounding box of the child subgroup may be selected. In other words, since the parent subgroup is contained in the scan order and boundary, the points within the boundary may be coded according to the scan order. In this case, the necessary points may be selected regardless of the scan order, according to an implementation embodiment disclosed below.

```
if (startDepth > 0) {
ringBufferSize = numPoints;
```

-continued

```
fifo = pcc::ringbuf<PCCOctree3Node>(ringBufferSize + 1);
std::cout << "nodesSaved->size( ) = " << nodesSaved->size( );
auto nodeSizeLog2 = lvlNodeSizeLog2[startDepth];
int count = 0;
for (auto nodeIt = nodesSaved->begin( ); nodeIt != nodesSaved->end( ); nodeIt++) {
PCCOctree3Node& node0 = *(nodeIt);
Vec3<int32_t> nodePos;
for (int m = 0; m < 3; m++)
nodePos[m] = node0.pos[m] << nodeSizeLog2[m];
if ((nodePos.x( ) >= bbox_min.x( ) && nodePos.x( ) < bbox_max.x( )
&& nodePos.y( ) >= bbox_min.y( ) && nodePos.y( ) < bbox_max.y( )
&& nodePos.z( ) >= bbox_min.z( ) && nodePos.z( ) < bbox_max.z( ))) {
fifo.emplace_back(node0);
count++;
}
else
continue;
}
}
```

When subgroup division according to the embodiments is used, a subgroup bounding box may be generated across the scan order. Accordingly, it is common to assume that there is no dependency on scan order. However, considering that each subgroup is delivered while constituting an independent slice, the axis of each slice may be rotated to support the same decoding even when there is a dependency on the scan order. In other words, a cubic bounding box may be divided once in a direction perpendicular to one of the xyz axes. The division in a direction perpendicular to the x-axis is independent of the scan order is not affected by the scan order. In the case of the division in a direction perpendicular to the y-axis or z-axis, rotation (e.g., rotation by 90 degrees in the xy plane and 90 degrees in the xz plane) may be performed such that the same shape as in the division in the direction perpendicular to the x-axis is obtained. The decoder may signal that an inverse rotation (e.g., rotation by −90 degrees in the xy plane and −90 degrees in the xz plane) should be performed in the original direction after decoding.

In this case, the encoder may be further required to reorder the points (in, for example, Morton code order) within the rotated subgroup space.

Figure 33:
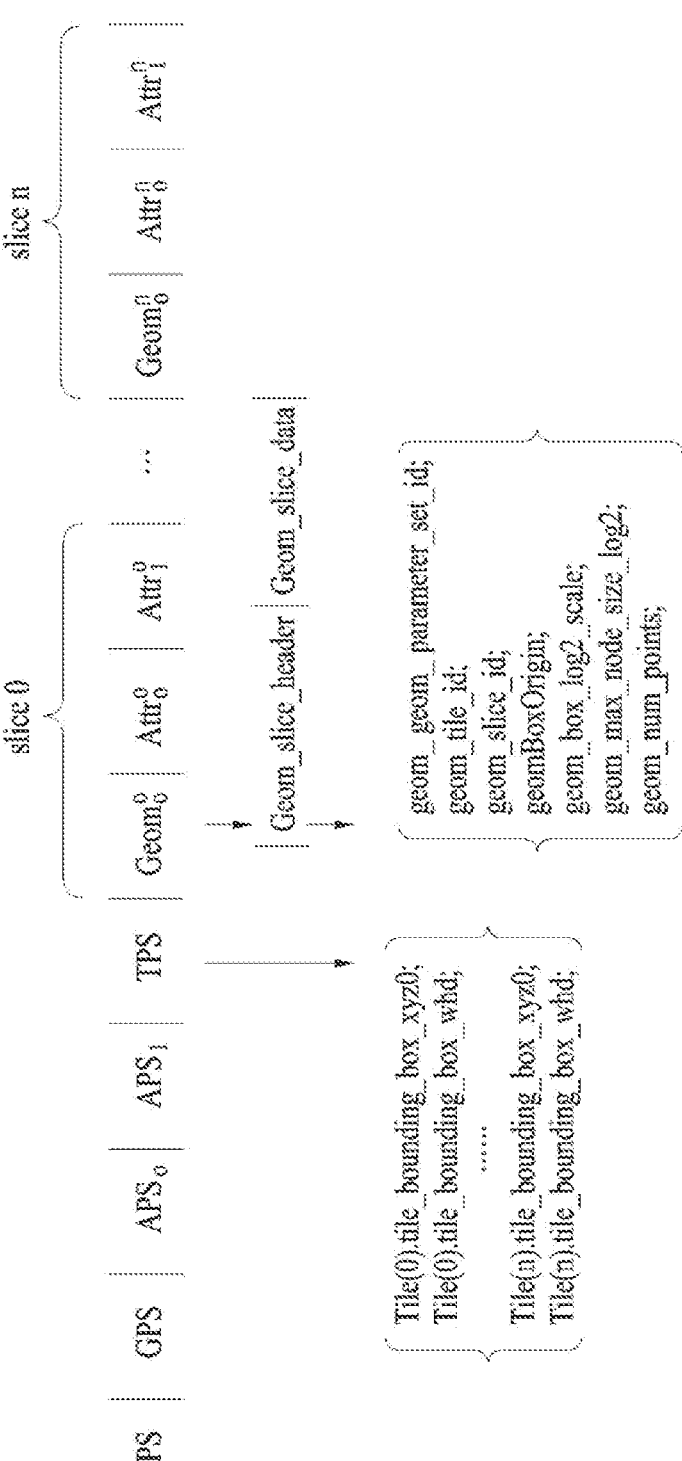
FIG. 33 illustrates a bitstream containing point cloud data and parameters according to embodiments.

FIG. 33 illustrates a bitstream containing point cloud data and parameters according to embodiments.

The method/device for transmitting point cloud data according to the embodiments may compress point cloud data and generate related parameters to generate and transmit a bitstream as shown in FIG. 22. The method/device for receiving point cloud data according to the embodiments may receive a bitstream as shown in FIG. 33 and reconstruct the point cloud data based on the parameter information.

The method/device according to the embodiments may generate signaling information related to a radius inter prediction method in the predictive geometry according to embodiments.

Information for radius prediction may be defined in the inter-frame prediction in the predictive geometry. The sequence parameter set may indicate that the inter-frame prediction and radius prediction of the predictive geometry node have been applied (included), and all or part of the related information required for the indication may be carried in the sequence parameter set, depending on the implementation method. The respective pieces of information may also be carried in a geometry parameter set, a slice header (which may also be referred to as a data unit), an SEI message, or the like. The information may be defined in corresponding or separate positions depending on the application, system, or the like to provide different scopes and methods of application. If information containing similar functions is signaled in a higher level, it may be applicable even if signaling is omitted in a parameter set of a lower level. Additionally, when the syntax elements defined below are applicable not only to the current point cloud data stream but also to multiple point cloud data streams, the information may be carried in a higher-level parameter set or the like.

Relevant information may be signaled in order to add/carry out embodiments. Hereinafter, parameters (which may be referred to as metadata, signaling information, etc.) according to embodiments may be generated by a process of a transmitter according to embodiments described below and delivered to a receiver according to embodiments for use in the reconstruction operation. For example, the parameters according to the embodiments may be generated in a metadata processor (or metadata generator) of the transmission device according to the embodiments described below and acquired by a metadata parser of the reception device according to the embodiments. The configuration of the encoded point cloud is described with reference to FIGS. 22 to 26.

Abbreviations used herein are: SPS: Sequence Parameter Set; GPS: Geometry Parameter Set; APS: Attribute Parameter Set; TPS: Tile Parameter Set; Geom: Geometry bitstream=geometry slice header (=geometry data unit header)+geometry slice data (=geometry data unit data); Attr: Attribute bitstream=attribute slice header (attribute data unit header)+attribute slice data (=attribute data unit data).

Tiles or slices are provided such that the point cloud may be divided into regions for processing. When the point cloud is divided into regions, each region may have a different importance. By providing regions such that different filters and different filter units may be applied according to the importance, a filtering method having high complexity but good result quality may be used in an important region. By applying different filtering to the respective regions (regions partitioned into tiles or slices) according to the receiver capacity, rather than applying a complex filtering method to the entire point cloud data. Therefore, better image quality may be ensured in a region important to the user and an appropriate latency may be ensured in the system. Accordingly, when a point cloud is partitioned into tiles, different filters or different filter units may be applied to the respective tiles. When the point cloud is divided into slices, different filters or different filter units may be applied to the respective slices.

Referring to FIG. 33, the bitstream may include SPS, GPS, APS, TPS, and TPS. There may be a plurality of APSs. The TPS may include information about tile bounding boxes for a plurality of tiles. For example, it may include position (coordinate) information, size information (width, depth, height), etc. about the bounding box of a tile. The bitstream may contain geometry information (data) and attribute information (data) on a per-slice (data unit) basis. Because point cloud data is encoded on a per-slice (data unit) basis, the bitstream may contain a plurality of slices (data units). A slice (data unit) may include geometry information (position) and one or more pieces of attribute information (color, reflectance, etc.) about one point. For example, slice (data unit) 0 may include geometry data, and the geometry data may include a geometry slice header and geometry slice data. The geometry slice header may contain information about the geometry. For example, it may contain information such as geometry parameter set ID, geometry tile ID, geometry slice ID, the origin of a box (bounding box) containing the geometry, logarithmic scale of the box, the maximum node size, and the number of points.

While it has been described that the information is defined independently of the coding technique according to embodiments, the information may be defined in connection with the coding method. In order to support regionally different scalability, the information may be defined in the tile parameter set. Also, when the syntax elements defined below is applicable not only to the current point cloud data stream but also to multiple point cloud data streams, they may be delivered through a superordinate parameter set, etc.

Alternatively, a network abstract layer (NAL) unit may be defined and relevant information for selecting a layer, such as layer_id, may be delivered. Thereby, a bitstream may be selected at a system level.

Parameters (which may be referred to as metadata, signaling information, or the like) according to embodiments may be generated in the process of the transmitter according to the embodiments described below and delivered to the receiver according to the embodiments for use in the reconstruction operation.

For example, the parameters may be generated by a metadata processor (or metadata generator) of the transmission device according to the embodiments, which will be described later, and may be acquired by a metadata parser of the reception device according to the embodiments.

A syntax of parameters contained in the bitstream is described below.

FIG. 34 shows a sequence parameter set according to embodiments.

FIG. 34 shows the sequence parameters set contained in the bitstream in FIG. 33.

layer_group_enabled_flag equal to 1 indicates that the geometry bitstream of a frame or a tile is contained in multiple slices which is matched to a coding layer group or a subgroup thereof. layer_group_enabled_flag equal to 0 indicates that the geometry bitstream of a frame or a tile is contained in a single slice.

num_layer_groups_minus1 plus 1 indicates that the number of layer groups, wherein a layer group represents a contiguous tree layer group that is part of a geometry coding tree structure. num_layer_groups_minus1 may be in the range of 0 to the number of coding tree layers.

layer_group_id specifies the identifier of a layer-group of a frame or a tile. layer_group_id may be in the range of 0 to num_layer_groups_minus1.

num_layers_minus1 plus 1 specifies the number of coding layers contained in the i-th layer-group. The total number of layer groups may be derived by adding all (num_layers_minus1[i]+1) for i equal to 0 to num_layer_groups_minus1.

subgroup_enabled_flag equal to 1 specifies that the current layer-group consists of subgroups which may be contained in multiple slices. subgroup_enabled_flag equal to 0 specifies that the current layer-group is contained in a single slice. The subgroups are mutually exclusive and the sum of subgroups is identical to the layer-group.

subgroup_bbox_origin_bits_minus1 plus 1 indicates the length in bits of the syntax element subgroup_bbox_origin.

subgroup_bbox_size_bits_minus1 plus 1 indicates the length in bits of the syntax element subgroup_bbox_size.

non_cubic_subgroup_enabled_flag equal to 1 indicates that a non-cubic subgroup bounding box is used.

In this case, the range of the maximum and minimum values of the subgroup bounding box may be indicated by the values of subgroup_bbox_max_x, subgroup_bbox_max_y, subgroup_bbox_max_z, subgroup_bbox_min_x, subgroup_bbox_min_y, and subgroup_bbox_min_z, which may represent the maximum and minimum values for each axis of the bounding box along the x-y-z axes.

The sequence parameter set may further contain the following elements:

simple_profile_compatibility_flag: simple_profile_compatibility_flag equal to 1 specifies that the bitstream conforms to a simple profile. simple_profile_compatibility_flag equal to 0 specifies that the bitstream conforms to a profile other than the simple profile.

dense_profile_compatibility_flag: When equal to 1, it specifies that the bitstream conforms to a Dense profile. density_profile_compatibility_flag equal to 0 specifies that the bitstream conforms to a profile other than the Dense profile.

predictive_profile_compatibility_flag: When equal to 1, it specifies that the bitstream conforms to a predictive profile. predictive_profile_compatibility_flag equal to 0 specifies that the bitstream conforms to a profile other than the predictive profile.

main_profile_compatibility_flag: When equal to 1, it specifies that the bitstream conforms to the main profile. main_profile_compatibility_flag equal to 0 specifies that the bitstream conforms to a profile other than the main profile.

reserved_profile_compatibility_18bits: Shall be equal to 0 in bitstreams conforming to this version of this document. Other values for reserved profile_compatibility_18bits are reserved for future use by ISO/IEC. The decoder shall ignore the value of reserved_profile_compatibility_18bits.

slice_reordering_constraint_flag: When equal to 1, it indicates that the bitstream is sensitive to reordering and removal of data units. slice_reordering_constraint_flag equal to 0 indicates that the bitstream is insensitive to reordering and removal of data units.

unique_point_positions_constraint_flag: When equal to 1, it indicates that all output points have unique positions in each point cloud frame that references the current SPS. unique_point_positions_constraint_flag equal to 0 indicates that two or more output points may have the same position in any point cloud frame that references the current SPS.

level_idc: Indicates the level to which the bitstream conforms as specified in Annex A. The bitstream shall not contain any value of level_idc other than the values specified in Annex A. Other values of level_idc are reserved for future use by ISO/IEC.

sps_seq_parameter_set_id: Provides an identifier for the SPS such that it may be referenced by other syntax elements. sps_seq_parameter_set_id shall be 0 in bitstreams that conform to this version of this document. Other values of sps_seq_parameter_set_id are reserved for future use by ISO/IEC.

frame_ctr_lsb_bits: Specifies the length of the syntax element frame_ctr_lsb in bits.

slice_tag_bits: Specifies the length of the syntax element slice_tag in bits.

seq_origin_bits: Specifies the length of the syntax element seq_origin_xyz[k] in bits.

seq_origin_xyz[k] and seq_origin_log 2_scale: Specify the origin of the sequence local coordinate system. The index k is the k-th X, Y, or Z component of the origin coordinates. When not present, the values of seq_origin_xyz [k] and seq_origin_log 2_scale are inferred to be 0.

The array SeqOrigin is the origin of the sequence local coordinate system:

SeqOrigin[k]=seq_origin_xyz[k]<<seq_origin_log 2_scale seq_bounding_box_size_bits: The length of the syntax element seq_bounding_box_size_minus1_xyz[k] in bits.

seq_bounding_box_size_xyz_minus1[k] plus 1 specifies the k-th component of the width, height, and depth of the coded volume dimensions in the output coordinate system, respectively. When not present, the coded volume dimensions are undefined.

seq_unit_numerator_minus1, seq_unit_denominator_minus1, and seq_unit_in_metres_flag: Specify the lengths of the X, Y, and Z unit vectors in the output coordinate system.

seq_global_scale_factor_log 2, seq_global_scale_refinement_num_bits, and seq_global_scale_refinement_factor: Specify a fixed decimal scale factor used to derive output point positions from positions in the sequence local coordinate system.

seq_global_scale_factor_log 2: Used to derive a global scale factor to apply to the positions in the point cloud.

seq_global_scale_refinement_num_bits: The length of the syntax element seq_global_scale_refinement_factor in bits. When seq_global_scale_refinement_num bits is equal to 0, no segmentation is applied.

seq_global_scale_refinement_factor: Specifies the refinement for the global scale value. When not present, seq_global_scale_refinement_factor is inferred to be equal to 0.

sps_num_attributes: Specifies the number of attributes in the coded point cloud. It is a requirement of bitstream conformance that every slice has an attribute data unit corresponding to every attribute component listed in the SPS.

attribute_dimension_minus1[attrId] plus 1 specifies the number of components of the attrId-th attribute.

attribute_instance_id[attrId]: Specifies the instance identifier for the attrId-th attribute.

attribute_bitdepth_minus1[attrId] plus 1 specifies the bit depth of each component of the attrId-th attribute signal(s).

known_attribute_label_flag[attrId], known_attribute_label[attrId], and attribute_label_oid[attrId]: Identify the type of data passed in the attrId-th attribute. known_attribute_label_flag[attrId] indicates whether the attribute is identified by the value of known_attribute_label[attrId] or by the object identifier attribute_label_oid[attrId].

The attribute type identified by known_attribute_label may be specified. When the value of known_attribute_label is unspecified, it is reserved for future use by ISO/IEC.

The attribute type may indicate Colour, Reflectance, Opacity, Frame index, Frame number, Material identifier, Normal vector, etc.

num_attribute_parameters: Specifies the number of attribute parameter sets in the bitstream. The attribute parameters that are signaled in the sequence parameter set are applied to all data units in the coded point cloud sequence.

axis_coding_order: Specifies the correspondence between the X, Y, and Z output axis labels and the three position components of all points in the reconstructed point cloud.

bypass_stream_enabled_flag equal to 1 specifies that bypass coding mode may be used when reading the bitstream. bypass_stream_enabled_flag equal to 0 specifies that bypass coding mode is not used when reading the bitstream.

entropy_continuation_enabled_flag equal to 1 indicates that the initial entropy context state of a slice may depend on the final entropy context state of the preceding slice. entropy_continuation_enabled_flag equal to 0 specifies that the initial entropy context state of each slice is independent. entropy_continuation_enabled_flag being equal to 0 when slice_reordering_constaint_flag is equal to 0 is a requirement of bitstream conformance.

sps_extension_flag equal to 0 specifies that the syntax element sps_extension_data_flag is not present in the SPS syntax structure. sps_extension_flag shall be equal to 0 in bitstreams that conform to this version of this document. The value 1 for sps_extension_flag is reserved for future use by ISO/IEC. The decoder shall ignore any syntax elements sps_extension_data_flag that follow the value of 1 for sps_extension_flag in the SPS syntax structure.

sps_extension_data_flag may have any value. Its presence and value does not affect decoder conformance to the profiles specified in Annex A. Decoders conforming to this version of this document shall ignore all syntax elements sps_extension_data_flag.

FIG. 35 shows a dependent geometry data unit header according to embodiments.

FIG. 35 shows the geometry data unit header contained in the bitstream in FIG. 33.

dgsh_slice_id: Indicates the ID of the slice for the dependent geometry data unit.

layer_group_id specifies the identifier of a layer-group of a frame or a tile. layer_group_id may be in the range of 0 to num_layer_groups_minus1.

subgroup_id specifies the identifier of the subgroup of the layer group indicated by layer_group_id. subgroup_id may be in the range of 0 to num_subgroups_minus1[layer_group_id]. subgroup_id may represent the order of the slices in the same layer_group_id. When not present, subgroup_id may be inferred to be 0.

subgroup_bbox_origin specifies the origin of the subgroup bounding box of the subgroup indicated by subgroup_id of the layer-group indicated by layer_group_id.

subgroup_bbox_origin specifies the origin of the subgroup bounding box of the subgroup indicated by subgroup_id of the layer-group indicated by layer_group_id.

subgroup_bbox_size indicates the size of the subgroup bounding box of the subgroup indicated by subgroup_id of the layer-group indicated by layer_group_id.

ref_layer_group_id specifies the indicator of the reference layer-group. ref_layer_group_id may be in the range of 0 to num_layer_group_minus1 of the current frame or the current tile.

ref_subgroup_id specifies the indicator of the reference subgroup of the layer-group indicated by ref_layer_group_id. ref_subgroup_id may be in the range of 0 to num_subgroup_id_minus1 of the current layer-group. When not present, subgroup_id may be inferred to be 0.

subgroup_bbox_rotation_enabled_flag equal to 1 may indicate that the subgroup bounding box has been rotated.

rotation_direction: May indicates the rotation direction of the subgroup bounding box. For example, from the encoder perspective, a type may be signaled to indicate that the subgroup bounding box has been rotated 90 degrees in the xy plane (such that a division perpendicular to the y-axis becomes a division perpendicular to the x-axis) or 90 degrees in the xz plane (such that a division perpendicular to the z-axis becomes a division perpendicular to the x-axis). Alternatively, from the decoder perspective, a direction in which rotation should be performed after decoding may be signaled. It may be signaled that rotation has been performed by −90 degrees in the xy plane (such that a division perpendicular to the x-axis becomes a division perpendicular to the y-axis) or −90 degrees in the xz plane (such that a division perpendicular to the x-axis becomes a division perpendicular to the z-axis).

FIG. 36 shows a layer-group structure inventory according to embodiments.

FIG. 36 shows the layer-group structure inventory contained in the bitstream in FIG. 33. lgsi_seq_parameter_set_id indicates the value of sps_seq_parameter_set_id. It is the requirement of bitstream conformance that lgsi_seq_parameter_set_id is equal to 0.

lgsi_frame_ctr_lsb_bits indicates the length in bits of the syntax element lgsi_frame_ctr_lsb.

lgsi_frame_ctr_lsb specifies the least significant bits of lgsi_frame_ctr_lsb_bits of FrameCtr for which the group structure inventory is valid. The layer-group structure inventory is valid until it is replaced with another layer-group structure inventory.

lgsi_num_slice_ids_minus1 plus 1 may indicate the number of slices in the layer-group structure inventory.

gi_slice_id specifies the slice id of the sid-th slice within the layer-group structure inventory. It is a requirement of bitstream conformance that all values of lgsi_slice_id are unique within a layer-group structure inventory.

gi_slice_id specifies the slice id of the sid-th slice within the layer-group structure inventory. It is a requirement of bitstream conformance that all values of lgsi_slice_id should be unique within a layer-group structure inventory.

lgsi_num_layer groups_minus1 plus 1 indicates the number of layer groups.

lgsi_layer_group_id specifies the indicator of the layer group. lgsi_layer_group_id is in the range of 0 to lgsi_num_layer_groups_minus1.

lgsi_num_layers_minus1 plus 1 indicates the number of coded layers in the slices of the i-th layer-group in the sid-th slice. The total number of coded layers required to decode the n-th layer-group is equal to the sum of lgsi_num_layers_minus1[sid][i]+1 for i from 0 to n.

lgsi_num_subgroups_minus1 plus 1 indicates the number of subgroups of the i-th layer-group in the sid-th slice.

lgsi_subgroup_id specifies the identifier of the layer-group. lgsi_subgroup_id is in the range of 0 to lgsi_num_subgroups_minus1.

lgsi_parent_subgroup_id specifies the identifier of a sub-group in the layer-group indicated by lgsi_subgroup_id. lgsi_parent_subgroup_id is in the range of 0 to gi_num_subgroups_minus1 in the layer group indicated by lgsi_subgroup_id.

lgsi_subgroup_bbox_origin and lgsi_subgroup_bbox_size indicate the bounding box of the current subgroup.

lgsi_subgroup_bbox_origin indicates the origin of the subgroup bounding box of the subgroup indicated by lgsi_subgroup_id of the layer group indicated by lgsi_layer_group_id.

lgsi_subgroup_bbox_size indicates the size of the sub-group bounding box of the subgroup indicated by lgsi_subgroup_id of the layer group indicated by lgsi_layer_group_id.

lgsi_origin_bits_minus plus 1 indicates the length in bits of the shintax element lgsi_origin_xyz.

lgsi_origin_xyz indicates the origin of all partitions. The value of lgsi_origin_xyz[k] may be equal to sps_bounding_box_offset[k].

lgsi_origin_log 2_scale indicates the scaling factor for scaling the components of lgsi_origin_xyz. The value of lgsi_origin_log 2_scale may be equal to sps_bounding_box_offset_log 2_scale.

Figure 37:
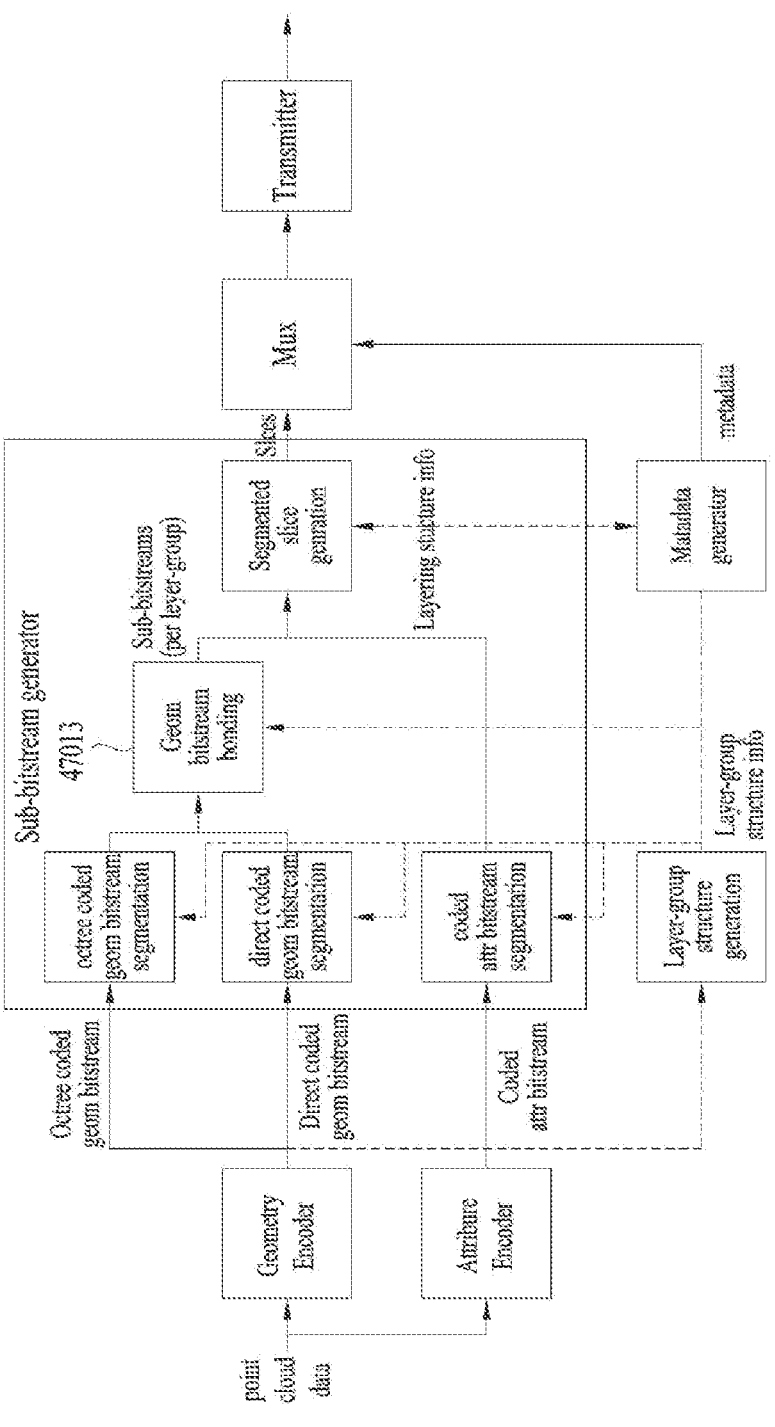
FIG. 37 illustrates a point cloud data transmission device according to embodiments.

FIG. 37 illustrates a point cloud data transmission device according to embodiments.

FIG. 37 is a block diagram illustrates a device corresponding to the point cloud data transmission method/device according to the embodiments (i.e., the transmission device 10000, point cloud video encoder 10002, and transmitter 10003 in FIG. 1, the acquisition 20000/encoding 20001/transmission 20002 in FIG. 2, the encoder in FIG. 4, the transmission device in FIG. 12, the device in FIG. 14, the encoding in FIGS. 15 to 23, the encoding in FIGS. 27 to 29, the generation of a bitstream and parameters in FIGS. 33 to 36, the encoding in FIGS. 37 and 40 to 42, and the transmission method in FIG. 43, and the like).

Each component of the device in FIG. 37 may correspond to hardware, software, a processor, and/or a combination thereof.

An embodiment of detailed functional components for encoding/transmitting PCC data will be described with reference to FIG. 37. Once the point cloud data is input, the encoder may encode position information (geometry data) (e.g., XYZ coordinates, phi-theta coordinates, etc.) and attribute information (attribute data) (e.g., color, reflectance, intensity, grayscale, opacity, medium, material, glossiness, etc.), respectively. The compressed data is divided into units for transmission. The data may be divided by a sub-bit-stream generator into units suitable for selecting necessary information in a bitstream unit based on layering structure information for packing.

In some embodiments, when different types of bitstreams are included in a single slice, the encoder may separate the generated bitstreams (AEC bitstream and DC bitstream) according to their purpose. Then, depending on the layer-group information, the respective slices or neighboring information may be included in one slice. Then, information such as a bitstream type, bitstream_offset, bitstream_length, and bitstream direction, along with layer-group information, layer information included in the layer-group, the number of nodes, layer depth information, the number of nodes included in the sub-group, may be delivered by a metadata generator according to each slice ID.

Referring to FIG. 37, the geometry encoder may encode geometry data of the point cloud data. The attribute encoder may encode attribute data of the point cloud data. The sub-bitstream generator may receive a (oc) tree-coded geometry bitstream, a direct-coded geometry bitstream, and a coded attribute bitstream and generate slices based on the sub-bitstreams. The encoder (i.e., the transmission device) may multiplex and transmit the slices and metadata related thereto.

Regarding the sub-bitstream generator, the transmission device (or processor) may segment the (oc) tree-coded geometry bitstream. Also, it may segment the direct-coded geometry bitstream. Further, it may segment the coded attribute bitstream. The transmission device may generate sub-bitstreams on a per-layer group basis. The sub-bit-streams may be generated by combining segmented geometry bitstreams. The geometry bitstream and segmented attribute bitstream may be generated as slices. The above process may be performed based on information related to the layer-group structure. In connection with the operation of generating segmented slices, the metadata generator may receive information related to the layering structure and generate and deliver relevant metadata to the receiving side.

In some embodiments, the slice-subgroup segmentation operation may be performed prior to the encoder. For example, the subgroup division process in FIG. 29 may be performed by the layer-group structure generator. The layer-group structure generator may receive the point cloud data and perform the subgroup division. Based on the generated subgroups and subgroup-related information, the encoder may encode the point cloud data.

FIG. 38 illustrates a point cloud data reception device according to embodiments.

FIG. 38 is a block diagram illustrating a device corresponding to the point cloud data reception method/device according to the embodiments (i.e., the reception device 10004, receiver 10005, and point cloud video decoder 10006 in FIG. 1, the transmission 20002/decoding 20003/rendering 20004 in FIG. 2, the decoder in FIGS. 10 and 11, the reception device in FIG. 13, the device in FIG. 14, the decoding in FIGS. 15 to 23, the decoding in FIGS. 27 to 29, the bitstream parsing in FIGS. 33 to 36, the decoding in FIG. 38, the decoding in FIGS. 40 to 42, the reception method in FIG. 44, and the like).

The device in FIG. 38 corresponds to the transmission device in FIG. 37, and may decode point cloud data through corresponding operations or a reverse process to the operations of the transmission device.

Each component of the device in FIG. 38 may correspond to hardware, software, a processor, and/or a combination thereof.

An embodiment of detailed functional components for receiving/decoding PCC data will be with reference to FIG. 38. When a bitstream is input, the receiver may classify and process the bitstream for position information and the bitstream for attribute information. Then, a sub-bitstream classifier may pass the bitstreams to appropriate decoders based on the information in the bitstream header. Alternatively, it may select layers required by the receiver in the process. Geometry data and attribute data may be reconstructed from the classified bitstreams by a geometry decoder and an attribute decoder, respectively, based on the characteristics of the data, and then transcoded to a format for final output by a renderer.

When different kinds of geometry bitstreams are included, each bitstream may be decoded separately through a bit-stream splitter, as shown in FIG. 38. An octree coding-based arithmetic entropy coded bitstream and a direct coded bitstream may be distinguished and processed by the geometry decoder. They may be separated based on information about the bitstream type, bitstream_offset, bitstream_length, and bitstream direction. For the separated bitstreams, an operation of concatenating bitstream segments of the same type may be included. It may be included as a process for processing bitstreams separated by layer-group into a contiguous bitstream, and the bitstreams may be arranged in order based on the layer-group information. When the bitstreams are processible in parallel, they may be processed by the decoder without the concatenation operation.

Referring to FIG. 38, the reception device (or decoder) may receive a bitstream (see FIG. 33) containing point cloud data through a receiver. Demultiplexing may distinguish bitstreams into slices and metadata. The sub-bitstream classifier may classify bitstreams and slices containing point cloud data. The slice selector may select the slice to be decoded. The bitstream splitter may split the bitstream included in the slice into sub-bitstreams. The bitstream may include a (oc) tree coded geometry bitstream and a direct coded geometry bitstream. The attribute bitstream may be decoded by the attribute decoder. The (oc) tree coded geometry bitstream and the direct coded geometry bitstream may be separated by the splitter. The bitstream segment concatenator may combine segmented bitstreams. The geometry decoder may decode segments, combined segments, and the like. The renderer may render the decoded geometry data and decoded attribute data.

Figure 39:
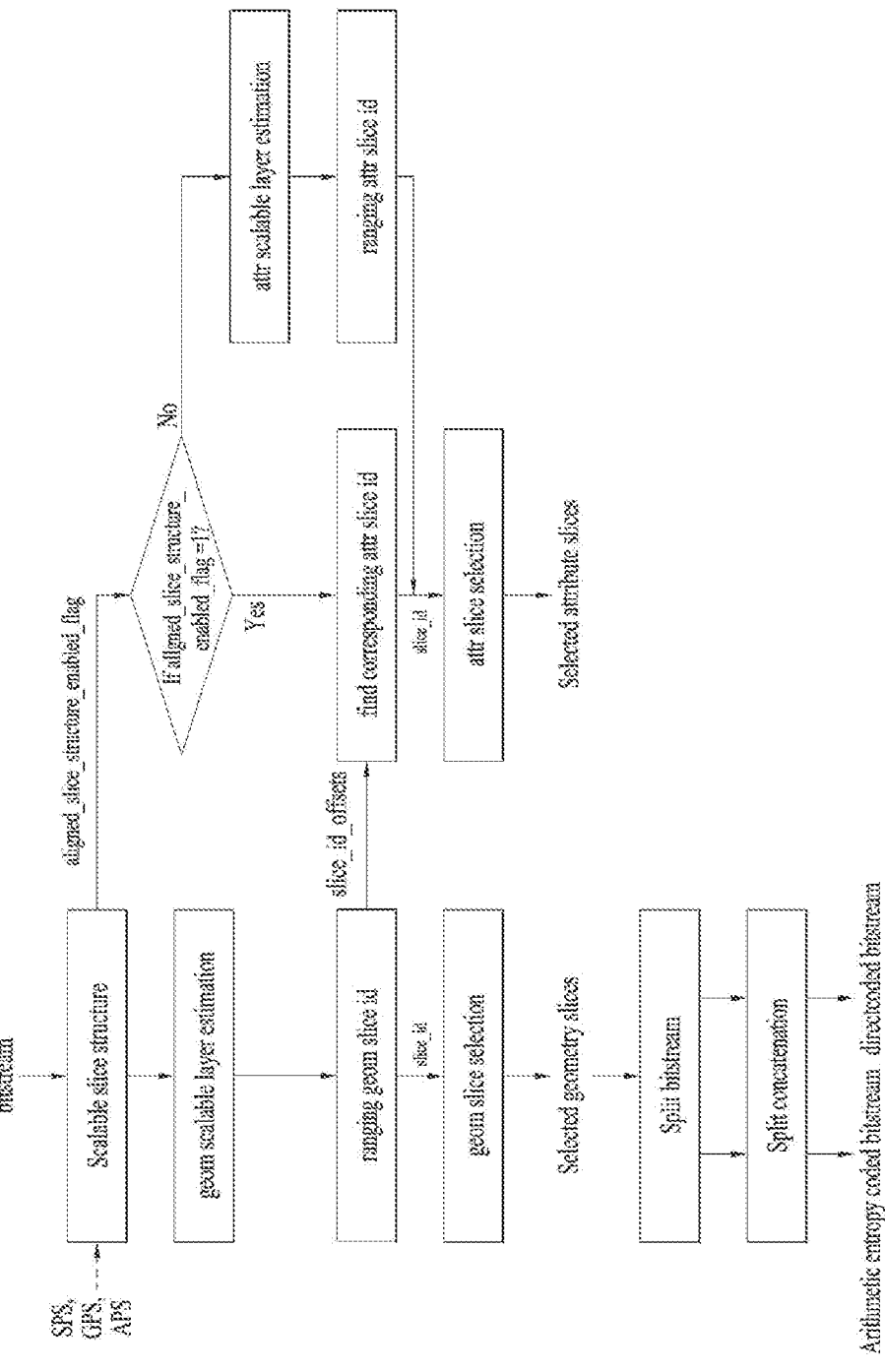
FIG. 39 illustrates a sub-bitstream classification method according to embodiments.

FIG. 39 illustrates a sub-bitstream classification method according to embodiments. FIG. 39 illustrates the operations of FIG. 38 in more detail.

Referring to FIG. 39, the operation of the sub-bitstream classifier is specified in a flowchart. When received data is input in on a slice-by-slice basis, the metadata parser delivers parameter set information such as SPS, GPS, APS, and TPS. Based on the delivered information, scalability may be determined. When scalable transmission is allowed to be performed, the slice structure for scalable transmission is identified according to the flowchart in FIG. 39. First, the geometry slice structure may be identified based on information such as num_scalable_layers, scalable_layer_id, tree_depth_start, tree_depth_end, node_size, num_nodes, num_slices_in_scalable_layer, and slice_id, which are transmitted through the GPS. If aligned_slice_structure_enabled_flag is equal to 1, the attribute slice structure may also be identified in the same way. For example, the geometry may be encoded based on the octree, the slice (attribute) may be encoded based on scalable LoD or scalable RAHT, and a geometry/attribute slice pair generated through the same slice partitioning may have the same number of nodes for the same octree layer. In this case, the range of the geometry slice ID is determined according to the target scalable layer. The range of the attribute slice ID is determined based on slice_id_offset, and a geometry/attribute slice is selected according to the determined range. If aligned_slice_structure_enabled_flag is equal to 0, the attribute slice structure may be separately identified based on information such as num_scalable_layers, scalable_layer_id, tree_depth_start, tree_depth_end, node_size, num_nodes, num_slices_in_scalable_layer, and slice_id, which are transmitted through the APS, and the range of the required attribute slice ID may be limited according to the purpose of the scalable operation. Based on the range, a required slice may be selected through each slice ID before reconstruction. The geometry/attribute slice selected through the above process is delivered to the input of the decoder.

In the description above, the decoding process according to the slice structure has been described based on scalable transmission or scalable selection by the receiver. When scalable_transmission_enabled_flag is equal to 0, the scheme may be used even in a non-scalable process by omitting the operation of ranging geometry/attribute slice ID (geom/attr slice id) and selecting the entire slice. Even in this case, information about the preceding slice (e.g., a slice belonging to a higher layer or specified through ref_slice_id) may be used through the slice structure information delivered through a parameter set such as SPS, GPS, APS, or TPS.

As in the embodiments, when there are different types of geometry bitstreams, all slices included in the range for the different bitstreams may be selected during the slice selection. If different types of bitstreams are included in one slice, each bitstream may be separated based on offset and length information, and the separated bitstreams may be processed according to layer-group order for decoding.

Referring to FIG. 39, a reception device (or decoder) according to embodiments may receive a bitstream and acquire a scalable slice structure based on parameter information contained in the bitstream, for example, SPS, GPS, APS, or the like. The geometry scalable layer may be estimated. The range of the geometry slice ID may be determined. A geometry slice for a slice ID within the slice ID range may be selected. The bitstream may be split based on the selected geometry slice(s). Split bitstreams may be concatenated. An arithmetic entropy coded bitstream and a direct coded bitstream containing scalably selected point cloud data may be output. When aligned_slice_structure_enabled_flag is equal to 1, the corresponding attribute slice ID may be searched for based on the slice ID offset. An attribute slice may be selected based on the attribute slice ID. The selected attribute slice(s) may be output. When the flag is not equal to 1, the attribute scalable layer may be estimated. The range of the attribute slice ID may be determined.

Referring to FIG. 15, the point cloud data transmission device according to the embodiments may provide the following effects.

For the point cloud data, compressed data may be divided and transmitted according to criteria according to embodiments. For example, when layered coding is used, the compressed data may be divided and transmitted according to layers. In this case, storage and transmission efficiency at the transmitting side may increase.

FIG. 15 illustrates an embodiment of providing service by compressing the geometry and attributes of point cloud data. In a PCC-based service, the compression rate or number of data may be adjusted and transmitted depending on the receiver performance or transmission environment. If point cloud data is bundled on a slice-by-slice basis, the receiver performance or transmission environment may change. In this case, it is necessary to 1) pre-transcode the bitstreams into a form suitable for each environment, store the same separately, and select a bitstream at the time of transmission, or to 2) perform transcoding prior to the transmission. In this case, if the number of receiver environments to be supported increases or the transmission environment frequently changes, issues related to the storage space or a delay resulting from transcoding may be raised.

dividing the compressed data according to layers for transmission may enable only the necessary parts of the pre-compressed data to be selectively delivered at the bitstream stage without a separate transcoding operation. This is efficient in terms of storage space because only one storage space is needed per stream. It is also efficient in terms of bitstream selector bandwidth because only the necessary layers are selected before transmission.

The method/device for receiving point cloud data according to the embodiments may provide the effects disclosed below.

FIG. 40 illustrates a point cloud data transmission/reception method according to embodiments.

The method/device for transmitting point cloud data according to the embodiments (i.e., the transmission device 10000, point cloud video encoder 10002, and transmitter 10003 in FIG. 1, the acquisition 20000-encoding 20001-transmission 20002 in FIG. 2, the encoder in FIG. 4, the transmission device in FIG. 12, the device in FIG. 14, the encoding in FIGS. 15 to 23, the encoding in FIGS. 27 to 29, the generation of a bitstream and parameters in FIGS. 33 to 36, the encoding in FIGS. 37 and 40 to 42, and the transmission method in FIG. 43) and the method/device for receiving point cloud data according to the embodiments (i.e., the reception device 10004, receiver 10005, and point cloud video decoder 10006 in FIG. 1, the transmission 20002-decoding 20003-rendering 20004 in FIG. 2, the decoder in FIGS. 10 and 11, the reception device in FIG. 13, the device in FIG. 14, the decoding in FIGS. 15 to 23, the decoding in FIGS. 27 to 29, the bitstream parsing in FIGS. 33 to 36, the decoding in FIG. 38, the decoding in FIGS. 40 to 42, and the reception method in FIG. 44) may transmit and receive point cloud data by segmenting the same as shown in FIG. 40. Each component in FIG. 40 may correspond to hardware, software, a processor, and/or a combination thereof.

FIG. 41 illustrates a point cloud data transmission/reception method according to embodiments.

The method/device for transmitting point cloud data according to the embodiments (i.e., the transmission device 10000, point cloud video encoder 10002, and transmitter 10003 in FIG. 1, the acquisition 20000-encoding 20001-transmission 20002 in FIG. 2, the encoder in FIG. 4, the transmission device in FIG. 12, the device in FIG. 14, the encoding in FIGS. 15 to 23, the encoding in FIGS. 27 to 29, the generation of a bitstream and parameters in FIGS. 33 to 36, the encoding in FIGS. 37 and 40 to 42, and the transmission method in FIG. 43) and the method/device for receiving point cloud data according to the embodiments (i.e., the reception device 10004, receiver 10005, and point cloud video decoder 10006 in FIG. 1, the transmission 20002-decoding 20003-rendering 20004 in FIG. 2, the decoder in FIGS. 10 and 11, the reception device in FIG. 13, the device in FIG. 14, the decoding in FIGS. 15 to 23, the decoding in FIGS. 27 to 29, the bitstream parsing in FIGS. 33 to 36, the decoding in FIG. 38, the decoding in FIGS. 40 to 42, and the reception method in FIG. 44) may transmit and receive point cloud data by segmenting the same as shown in FIG. 41. Each component in FIG. 41 may correspond to hardware, software, a processor, and/or a combination thereof.

Embodiments include a method of dividing and transmitting compressed data according to specific criteria for point cloud data. When layered coding is used, the compressed data may be divided and transmitted according to layers, which may increase the efficiency of the receiving side.

FIG. 41 illustrates the operations at the transmitting side and receiving side in the case where point cloud data consisting of layers is transmitted. If information that enables the entire PCC data to be reconstructed is transmitted regardless of the performance of the receiver, the receiver needs to select data corresponding to a required layer (i.e., perform data selection or sub-sampling) after reconstructing the point cloud data through decoding. In this case, since the delivered bitstream has already been decoded, a delay may occur in the receiver targeting low delay, or decoding may not be performed depending on the receiver performance.

According to embodiments, when the bitstream is divided into slices and delivered, the receiver may selectively deliver a bitstream to the decoder according to the decoder performance or the density of the point cloud data to be represented depending on the application field. In this case, by performing selection before the decoding, the decoder efficiency may increase and decoders with various performances may be supported.

Various elements of the devices of the embodiments may be implemented by hardware, software, firmware, or a combination thereof. Various elements in the embodiments may be implemented on a single chip, for example, a single hardware circuit. According to embodiments, embodiments may optionally be implemented on separate chips. According to embodiments, at least one of the components of the embodiments may be implemented within one or more processors that include instructions to perform operations according to the embodiments.

The operations according to the embodiments described above may be performed by a transmission device and/or a reception device according to embodiments. The transmission/reception device may include a transmitter/receiver configured to transmit or receive media data, a memory configured to store instructions (program code, algorithms, flowcharts, and/or data) for the processes according to embodiments, and a processor configured to control the operations of the transmission/reception device.

The processor may be referred to as a controller or the like, and may correspond to, for example, hardware, software, and/or a combination thereof. The operations according to the embodiments described above may be performed by the processor. Further, the processor may be implemented as an encoder/decoder or the like for the operations of the embodiments described above.

FIG. 42 illustrates a layer group slice according to embodiments.

The method/device for transmitting point cloud data according to the embodiments (i.e., the transmission device 10000, point cloud video encoder 10002, and transmitter 10003 in FIG. 1, the acquisition 20000-encoding 20001-transmission 20002 in FIG. 2, the encoder in FIG. 4, the transmission device in FIG. 12, the device in FIG. 14, the encoding in FIGS. 15 to 23, the encoding in FIGS. 27 to 29, the generation of a bitstream and parameters in FIGS. 33 to 36, the encoding in FIGS. 37 and 40 to 42, and the transmission method in FIG. 43) and the method/device for receiving point cloud data according to the embodiments (i.e., the reception device 10004, receiver 10005, and point cloud video decoder 10006 in FIG. 1, the transmission 20002-decoding 20003-rendering 20004 in FIG. 2, the decoder in FIGS. 10 and 11, the reception device in FIG. 13, the device in FIG. 14, the decoding in FIGS. 15 to 23, the decoding in FIGS. 27 to 29, the bitstream parsing in FIGS. 33 to 36, the decoding in FIG. 38, the decoding in FIGS. 40 to 42, and the reception method in FIG. 44) may slice, encode, and decode point cloud data based on the layer group, as shown in FIG. 42.

The method/device according to embodiments may support high-resolution ROI based on scalability and spatial accessibility of hierarchical slicing.

Referring to FIG. 42, the encoder may generate a bitstream slice of an octree layer group or a spatial sub-group of each layer group. According to the request, a slice matching the ROI of each resolution may be selected and transmitted. Since detailed information other than the requested ROI is not included in the bitstream, the entire bitstream size may be smaller than in the tile-based approach. The decoder of the receiver may combine the slices to generate three outputs. For example, 1) the high-level view output may be generated from layer-group slice 1; 2) the mid-level view output may be generated in layer-group slice 1 and the selected sub-group of layer group 2; 3) low-level views of fine detailed outputs may be generated in layer group 1 and the selected sub-groups of layer groups 2 and 3. Since the output may be generated progressively, the receiver may provide a viewing experience, such as magnification/reduction. Resolution may gradually increase from a high level of view to a low level of view.

The encoder 42000 may correspond to a geometry encoder and an attribute encoder as a point cloud encoder according to embodiments, which. The encoder may slice the point cloud data based on a layer group (or group). The layer may be referred to as a depth of a tree, a level of a layer, or the like. As shown in part 42000-1, the depth of the octree of the geometry and/or the level of the attribute layer may be divided into a layer group (or a sub-group).

The slice selector 42001, in conjunction with the encoder 42000, may select a split slice (or sub-slices) and selectively and partially transmit data such as layer group 1 to layer group 3.

The decoder 42002 may decode the selectively and partially transmitted point cloud data. For example, it may decode a high-level view for layer group 1 (which has a high depth/layer/level or an index of 0, or is close to root). Thereafter, the mid-level view may be decoded by increasing the index of the depth/level over layer group 1 alone based on layer group 1 and layer group 2. The low-level view may be decoded based on layer group 1 to layer group 3.

FIG. 43 illustrates a method of transmitting point cloud data according to embodiments.

A method of transmitting point cloud data according to embodiments may include encoding point cloud data (S4300).

The encoding operation according to the embodiments may include the operations o of the transmission device 10000, point cloud video acquirer 10001, and encoder 10002 in FIG. 1, the acquisition 20000-encoding 20001 of FIG. 2, the encoder of FIG. 4, the transmission device of FIG. 12, the XR device 1430 of FIG. 14, the point cloud data encoding of FIG. 15, the encoding in FIGS. 16 to 28, the division and encoding of subgroups containing point cloud data in FIG. 29, the encoding after selection of a bounding box and points in FIGS. 31 and 32, the generation of parameters and a bitstream in FIGS. 33 to 36, the layer group-based bitstream generation in FIG. 37, and the partial and scalable encoding of point cloud data in FIGS. 40 to 42.

The method for transmitting point cloud data according to the embodiments may further include transmitting a bitstream containing the point cloud data (S4301).

The transmission according to the embodiments may include the operations of the transmission device and transmitter 10003 in FIG. 1, the transmission 20002 in FIG. 2, the geometry/attribute bitstream transmission of FIG. 4, the transmission processor 12012 of FIG. 12, the point cloud transmission of the XR Device 1430 of FIG. 14, the bitstream partial transmission of FIG. 15, point cloud data transmission according to the encoding in FIGS. 16 to 32, the parameter and bitstream transmission in FIGS. 33 to 36, the layer group-based bitstream transmission in FIG. 37, and partial scalable point cloud data transmission in FIGS. 40 to 42.

FIG. 44 illustrates a method of receiving point cloud data according to embodiments.

The reception method may include a corresponding process and reverse process to the transmission method in FIG. 43.

The method of receiving point cloud data according to the embodiments may include receiving a bitstream containing point cloud data (S4400).

The reception according to the embodiments may include the operations of the reception device 10004 and receiver

10005 in FIG. 1, the reception according to the transmission 20002 in FIG. 2, the reception of a geometry/attribute bitstream in FIGS. 10 and 11, the receiver 13000 in FIG. 13, receiving point cloud data by the XR device 1430 in FIG. 14, the partial/scalable reception in FIG. 15, the parameter and bitstream parsing in FIGS. 33 to 36, the receiver in FIG. 38, the reception operation in FIG. 39, and the reception of point cloud data in FIGS. 40 to 42.

The method of receiving point cloud data according to the embodiments may further include decoding the point cloud data (S4401).

The decoding operation according to the embodiments may include the operations of the decoder 10006 in FIG. 1, the decoding 20003 in FIG. 2, the decoder in FIGS. 10 and 11, decoding of the reception device in FIG. 13, the decoding by the XR device 1430 in FIG. 14, the decoding in FIGS. 15 to 28, the subgroup-based decoding in FIGS. 29 to 32, the parameter-based decoding in FIGS. 33 to 36, the sub-bitstream-based decoding in FIGS. 38 and 39, and the partial/scalable decoding in FIGS. 40 to 42.

Referring to FIG. 1, the transmission method may include encoding point cloud data, and transmitting a bitstream containing the point cloud data.

Referring to FIG. 27, in relation to a subdivision that generates an adaptive subgroup bounding box, the encoding of the point cloud data may include dividing a bounding box containing the point cloud data into subgroup bounding boxes. The subgroup bounding boxes may be divided based on an axis related to the bounding box based on the number of points included in the bounding box. The axis may include one of an X-axis, a Y-axis, and a Z-axis, and the number of points included in the subgroup bounding boxes may be less than a threshold. The number of the subgroup bounding boxes may be less than a threshold. Here, the thresholds may be set depending on the system, may have the same or different values, and may be transmitted to the decoder as signaling information (parameters).

Referring to FIG. 29, the dividing may include, based on that the number of points included in the bounding box is greater than the threshold, selecting one of subdivision for dividing the bounding box along the X-axis, subdivision for dividing the bounding box along the Y-axis, or subdivision for dividing the bounding box along the Z-axis based on the number of points related to the subdivision, based on that the number of points included in the selected subdivision is greater than a threshold, selecting one of subdivisions for dividing the selected subdivision along an unselected axis based on the number of points related to the subdivisions, and based on that the number of points included in the selected subdivision is greater than the threshold, dividing the selected subdivision along the unselected axis, wherein sizes of the subdivisions may be the same or different from each other. Here, the thresholds may be set depending on the system, may have the same or different values, and may be transmitted to the decoder as signaling information (parameters). Considering the number of points and the number of subdivisions (subgroup bounding boxes), various numbers of subgroup bounding boxes may be created. Split point cloud data may allow the data to be compressed and reconstructed more efficiently.

Referring to FIG. 31, regarding the subgroup bounding box restricted to the node scan order, the encoding of the point cloud data may include scanning points included in the subgroup bounding box in Morton order.

Referring to FIG. 32, regarding deviating from the boundary (referencing the parent node) or deviating from the Morton order (in the case of rotation), the encoding of the point cloud data may include based on that a point deviates from a boundary during scanning of the points included in the subgroup bounding boxes according to a Morton order, scanning points included in an upper node (parent node) of the point, and based on that the subgroup bounding boxes are generated based on a specific axis, rotating the subgroup bounding boxes 90 degrees on a plane related to the specific axis. The rotation angle may be determined through comparison with the scanning order of the subgroup boxes divided along the axis, and the position of the box may be rotated based on one plane to match the scanning order.

Referring to FIGS. 33 to 36, regarding the bitstream and parameters, the bitstream may contain a sequence parameter set, a geometry data unit header, and layer-group structure information.

Referring to FIG. 34, the bitstream may contain information (non_cubic_subgroup_enabled_flag) indicating whether a subgroup bounding box has been used, and information (subgroup_bbox_max/min) related to the position of the subgroup bounding box.

Referring to FIG. 35, the bitstream may contain information (subgroup_bbox_rotation_enabled_flag) indicating whether the subgroup bounding box rotates and information (rotation_direction) indicating the rotation direction.

Referring to FIG. 36, the bitstream may contain information about the number, positions, and sizes of the subgroup bounding boxes.

The point cloud data transmission method according to the embodiments is carried out by a transmission device. The transmission device may include an encoder configured to encode point cloud data; and a transmitter configured to transmit a bitstream containing the point cloud data. The transmission device may include a memory and an encoder including a processor.

Referring to FIG. 1, the reception method may include receiving a bitstream containing point cloud data, and decoding the point cloud data. The reception method may carry out a corresponding or reverse process to the transmission method.

The decoding of the point cloud data may include decoding subgroup bounding boxes into which a bounding box containing the point cloud data is divided. The subgroup bounding boxes may be divided based on an axis related to the bounding box based on the number of points included in the bounding box. The axis may include one of an X-axis, a Y-axis, and a Z-axis, and the number of points included in the subgroup bounding boxes may be less than a threshold. The number of the subgroup bounding boxes may be less than a threshold.

The dividing may include, based on that the number of points included in the bounding box is greater than the threshold, selecting one of subdivision for dividing the bounding box along the X-axis, subdivision for dividing the bounding box along the Y-axis, or subdivision for dividing the bounding box along the Z-axis based on the number of points related to the subdivision, based on that the number of points included in the selected subdivision is greater than a threshold, selecting one of subdivisions for dividing the selected subdivision along an unselected axis based on the number of points related to the subdivisions, and based on that the number of points included in the selected subdivision is greater than the threshold, dividing the selected subdivision along the unselected axis, wherein sizes of the subdivisions may be the same or different from each other.

The decoding of the point cloud data may include scanning points included in the subgroup bounding boxes according to a Morton order.

The reception method may be performed by a reception device. The reception device may include a receiver configured to receive a bitstream containing the point cloud data, and a decoder configured to decode the point cloud data. Additionally, it may include a memory and a decoder including a processor.

Accordingly, embodiments may provide the following effects. Using a fixed subgroup size may make it easier to determine the range of a required region from a spatial random access perspective, but may not allow the points to be evenly divided. Embodiments may address this issue.

Some subgroups having more points than the number of points that can be processed by the decoder (i.e., the level limit). Embodiments may address this issue.

In other words, to avoid this issue, a method of dividing subgroups is proposed. By comparing the number of points and costs when dividing subgroups, compression performance and accuracy may be increased.

According to embodiments, slices may be selectively coded, transmitted, and reconstructed based on the region of interest. According to embodiments, slices may be generated considering the density of cloud data. A slice containing a split subgroup bounding box may be selectively coded. Additionally, point cloud data may be flexibly sliced using a fixed subgroup size and subgroup division.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device includes a transmitter/receiver configured to transmit and receive media data, a memory configured to store instructions (program code, algorithms, flowcharts and/or data) for a process according to embodiments, and a processor configured to control operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

As described above, related contents have been described in the best mode for carrying out the embodiments.

As described above, the embodiments may be fully or partially applied to the point cloud data transmission/reception device and system.

It will be apparent to those skilled in the art that various changes or modifications can be made to the embodiments within the scope of the embodiments.

Thus, it is intended that the embodiments cover the modifications and variations of this disclosure provided they come within the scope of the appended claims and their equivalents.

The invention claimed is:

1. A method of encoding point cloud data, the method comprising:
    encoding partial geometry data for a point of a geometry subgroup in a geometry layer group; and
    encoding partial attribute data for a point of an attribute subgroup in an attribute layer group,
    wherein point cloud data includes geometry data based on geometry subgroups in the geometry layer group, and attribute data based on attribute subgroups in the attribute layer group,
    wherein the geometry layer group and the attribute layer group include one or more geometry tree depths; and
    wherein the partial geometry data and the partial attribute data are included in a bitstream,
    wherein the bitstream includes a flag for representing whether or not the layer group includes plurality of geometry subgroups, and
    wherein the bitstream further includes, based on the flag, size information on a x axis for a bounding box of the geometry subgroup, size information on a y axis for a bounding box of the geometry subgroup, and size information on a z axis for a bounding box of the geometry subgroup.

2. The method of claim 1,
    wherein the number of points included in the geometry subgroup is less than a threshold; and
    the number of the geometry subgroup is less than a threshold.

3. The method of claim 2,
    based on that the number of points included in the geometry subgroup is greater than the threshold,
    wherein the geometry subgroup is divided based on at least one of a x-axis, a y-axis, or a z-axis.

4. The method of claim 2, wherein the encoding of the point cloud data comprises:
    scanning points included in the subgroup bounding boxes according to a Morton order.

5. The method of claim 2,
    based on that a point is out of a boundary of the geometry subgroup during scanning of the points included in the geometry subgroup according to a Morton order, wherein points in an upper node of the geometry subgroup is scanned, based on that the geometry subgroup are generated based on a specific axis, the geometry subgroup is rotated 90 degrees on a plane related to the specific axis.

6. A device for encoding point cloud data, the device comprising:
    a memory; and
    at least one processor connected to the memory, the at least one processor configured to:
    encode partial geometry data for a point of a geometry subgroup in a geometry layer group; and
    encode partial attribute data for a point of an attribute subgroup in an attribute layer group,
    wherein point cloud data includes geometry data based on geometry subgroups in the geometry layer group, and attribute data based on attribute subgroups in the attribute layer group,
    wherein the geometry layer group and the attribute layer group include one or more geometry tree depths; and
    wherein the partial geometry data and the partial attribute data are included in a bitstream,
    wherein the bitstream includes a flag for representing whether or not the layer group includes plurality of geometry subgroups, and
    wherein the bitstream further includes, based on the flag, size information on a x axis for a bounding box of the geometry subgroup, size information on a y axis for a bounding box of the geometry subgroup, and size information on a z axis for a bounding box of the geometry subgroup.

7. A method of decoding point cloud data, the method comprising:
    receiving a bitstream containing point cloud data,
    wherein the point cloud data includes geometry data based on geometry subgroups in a geometry layer group, and attribute data based on attribute subgroups in an attribute layer group,
    wherein the geometry layer group and the attribute layer group include one or more geometry tree depths;
    decoding partial geometry data for a point of the geometry subgroups in the geometry layer group; and
    decoding partial attribute data for the point of the attribute subgroups in the attribute layer group,
    wherein the bitstream includes a flag for representing whether or not the layer group includes plurality of geometry subgroups, and
    wherein the bitstream further includes, based on the flag, size information on a x axis for a bounding box of the geometry subgroup, size information on a y axis for a bounding box of the geometry subgroup, and size information on a z axis for a bounding box of the geometry subgroup.

8. The method of claim 7,
    wherein the number of points included in the geometry subgroup is less than a threshold; and
    the number of the geometry subgroup is less than a threshold.

9. The method of claim 8,
    based on that the number of points included in the geometry subgroup is greater than the threshold,
    wherein the geometry subgroup is divided based on at least one of a x-axis, a y-axis, or a z-axis.

10. The method of claim 8, wherein the decoding of the point cloud data comprises;
    scanning points included in the subgroup bounding boxes according to a Morton order.

11. A device for decoding point cloud data, the device comprising:

a memory; and at least one processor connected to the memory, the at least one processor configured to:

receive a bitstream containing point cloud data, wherein the point cloud data includes geometry data based on geometry subgroups in a geometry layer group, and attribute data based on attribute subgroups in an attribute layer group, wherein the geometry layer group and the attribute layer group include one or more geometry tree depths;

decode partial geometry data for a point of the geometry subgroups in the geometry layer group; and decode partial attribute data for the point of the attribute subgroups in the attribute layer group, wherein the bitstream includes a flag for representing whether or not the layer group includes plurality of geometry subgroups, and wherein the bitstream further includes, based on the flag, size information on a x axis for a bounding box of the geometry subgroup, size information on a y axis for a bounding box of the geometry subgroup, and size information on a z axis for a bounding box of the geometry subgroup.

12. A transmission apparatus of data for a video, comprising:

at least one processor configured to obtain a bitstream generated by an image encoding method; and a transmitter configured to transmit the data for the video comprising the bitstream;

wherein the image encoding method comprising:

encoding partial geometry data for a point of a geometry subgroup in a geometry layer group; and encoding partial attribute data for a point of an attribute subgroup in an attribute layer group, wherein point cloud data includes geometry data based on geometry subgroups in the geometry layer group, and attribute data based on attribute subgroups in the attribute layer group, wherein the geometry layer group and the attribute layer group include one or more geometry tree depths; and wherein the partial geometry data and the partial attribute data are included in the bitstream, wherein the bitstream includes a flag for representing whether or not the layer group includes plurality of geometry subgroups, and wherein the bitstream further includes, based on the flag, size information on a x axis for a bounding box of the geometry subgroup, size information on a y axis for a bounding box of the geometry subgroup, and size information on a z axis for a bounding box of the geometry subgroup.

* * * * *